US006247780B1

(12) United States Patent
Matsubara et al.

(10) Patent No.: US 6,247,780 B1
(45) Date of Patent: Jun. 19, 2001

(54) SHADING CORRECTION PROCESSING FOR AN IMAGE FORMING APPARATUS

(75) Inventors: Miyuki Matsubara, Tokyo; Yoshiaki Takayanagi, Yokohama; Akio Suzuki, Yokohama; Kiyohisa Sugishima, Yokohama; Hiroshi Tajika, Yokohama; Noribumi Koitabashi, Yokohama; Takayuki Matsuo, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/898,842

(22) Filed: Jul. 22, 1997

Related U.S. Application Data

(62) Division of application No. 07/925,623, filed on Aug. 6, 1992, now Pat. No. 5,712,666.

(30) Foreign Application Priority Data

Aug. 9, 1991 (JP) .................................................. 3-200272
Aug. 9, 1991 (JP) .................................................. 3-200274
Aug. 9, 1991 (JP) .................................................. 3-200276

(51) Int. Cl.[7] ...................................................... B41J 2/01
(52) U.S. Cl. ............................................. 347/19; 347/15
(58) Field of Search ................................. 347/15, 19, 12; 358/504, 406, 298

(56) References Cited

U.S. PATENT DOCUMENTS

| 4,313,124 | 1/1982 | Hara ................................. 346/140 R |
| 4,345,262 | 8/1982 | Shirato et al. .................... 346/140 R |
| 4,459,600 | 7/1984 | Sato et al. ........................ 346/140 R |
| 4,463,359 | 7/1984 | Ayata et al. ........................... 346/1.1 |
| 4,516,135 | 5/1985 | Todoh ................................... 347/184 |
| 4,540,991 | 9/1985 | Kariya et al. ........................ 347/191 |
| 4,558,333 | 12/1985 | Sugitani et al. ................. 346/140 R |
| 4,673,303 * | 6/1987 | Sansone et al. ...................... 347/103 |
| 4,723,129 | 2/1988 | Endo et al. ............................. 346/1.1 |
| 4,740,796 | 4/1988 | Endo et al. ............................. 346/1.1 |
| 4,769,696 * | 9/1988 | Utsuda et al. ......................... 358/527 |
| 4,851,923 | 7/1989 | Abe et al. ............................. 358/296 |
| 4,872,024 * | 10/1989 | Nagai et al. ............................... 347/4 |
| 4,872,027 | 10/1989 | Buskirk et al. ......................... 347/19 |
| 4,959,669 | 9/1990 | Haneda et al. ........................ 347/115 |
| 5,038,208 | 8/1991 | Ichikawa et al. .................. 358/751 J |
| 5,049,898 | 9/1991 | Arthur et al. ........................... 347/19 |
| 5,278,459 | 1/1994 | Danzuka et al. ........................ 347/19 |
| 5,285,220 * | 2/1994 | Suzuki et al. .......................... 347/14 |
| 5,530,460 * | 6/1996 | Wehl ..................................... 347/19 |
| 5,736,996 * | 4/1998 | Takada et al. .......................... 347/19 |

FOREIGN PATENT DOCUMENTS

| 0 317 268 | 5/1989 | (EP) . |
| 0 399 668 | 11/1990 | (EP) . |
| 0 430 075 | 6/1991 | (EP) . |
| 0 452 157 | 10/1991 | (EP) . |
| 54-56847 | 5/1979 | (JP) . |
| 59-123670 | 7/1984 | (JP) . |
| 59-138461 | 8/1984 | (JP) . |
| 60-71260 | 4/1985 | (JP) . |
| 2-167755 | 12/1988 | (JP) . |
| 3-169640 | 7/1991 | (JP) . |

\* cited by examiner

*Primary Examiner*—John Barlow
*Assistant Examiner*—Craig A. Hallacher
(74) *Attorney, Agent, or Firm*—Fitzpatrick, Cella, Harper & Scinto

(57) ABSTRACT

When a reduction recording is made by using a portion of a plurality of recording elements and a test pattern is recorded, a recording element of one end of a recording element array is positioned next to a recording element of the other end. As a result, in a recording apparatus by using a recording head provided with a plurality of the recording elements, a suitable correction of shading is made in a reduction recording mode.

26 Claims, 64 Drawing Sheets

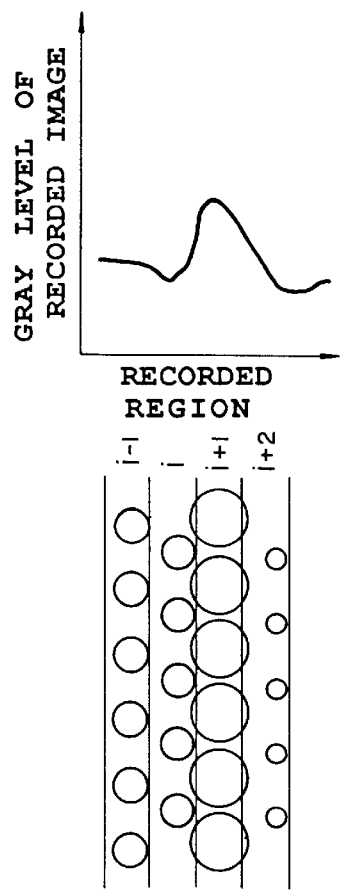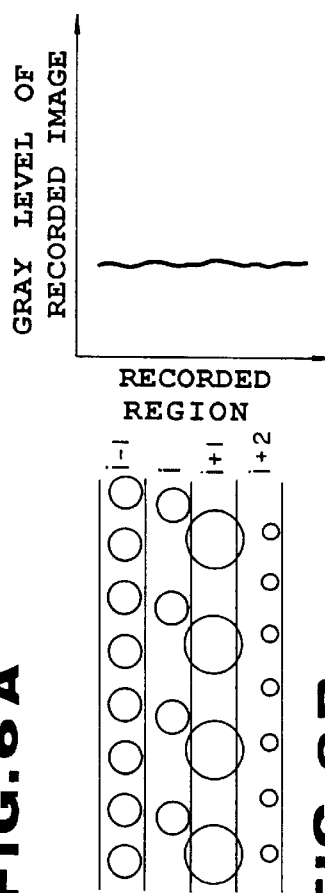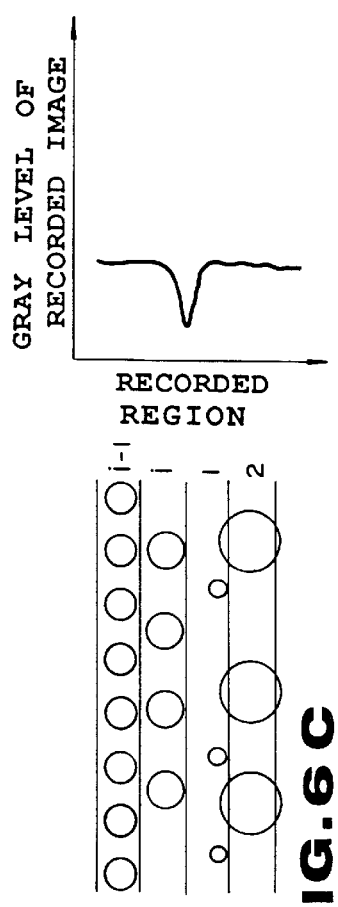
FIG.6A BEFORE CORRECTING
FIG.6B ORDINARY RECORDING AFTER CORRECTING
FIG.6C REDUCED RECORDING AFTER CORRECTING

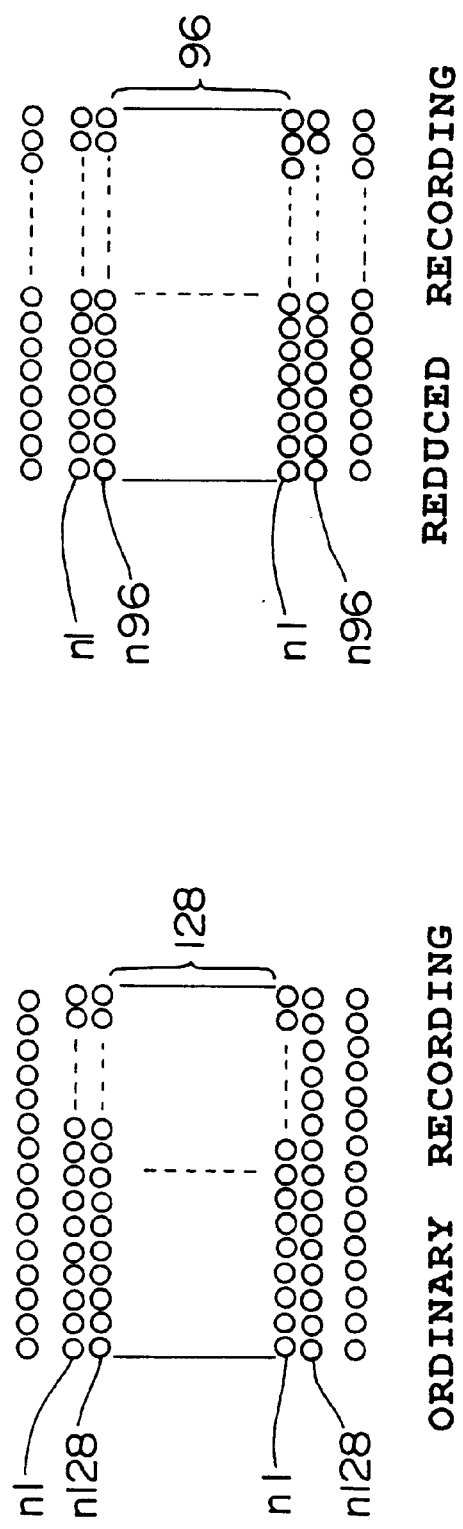

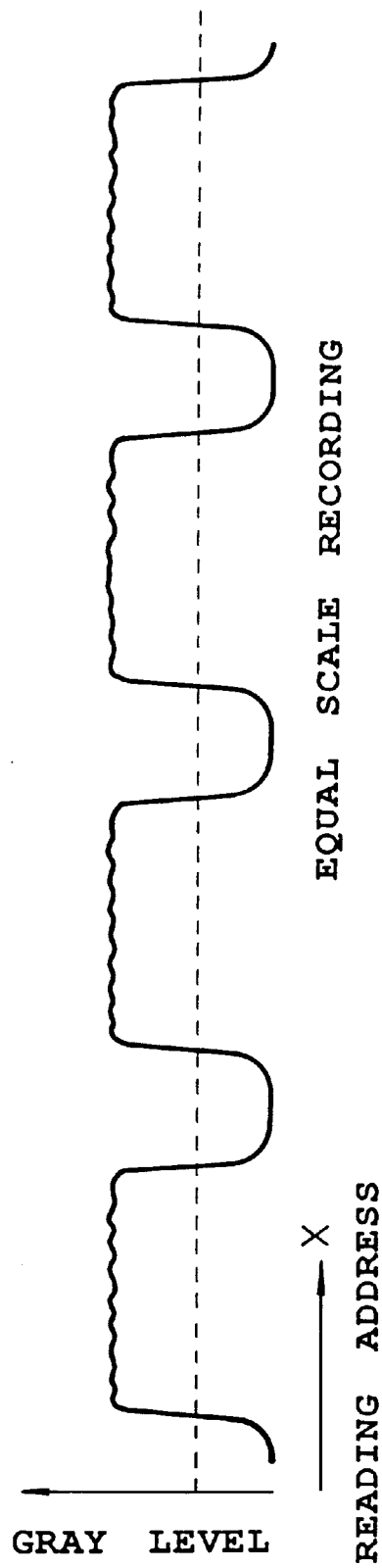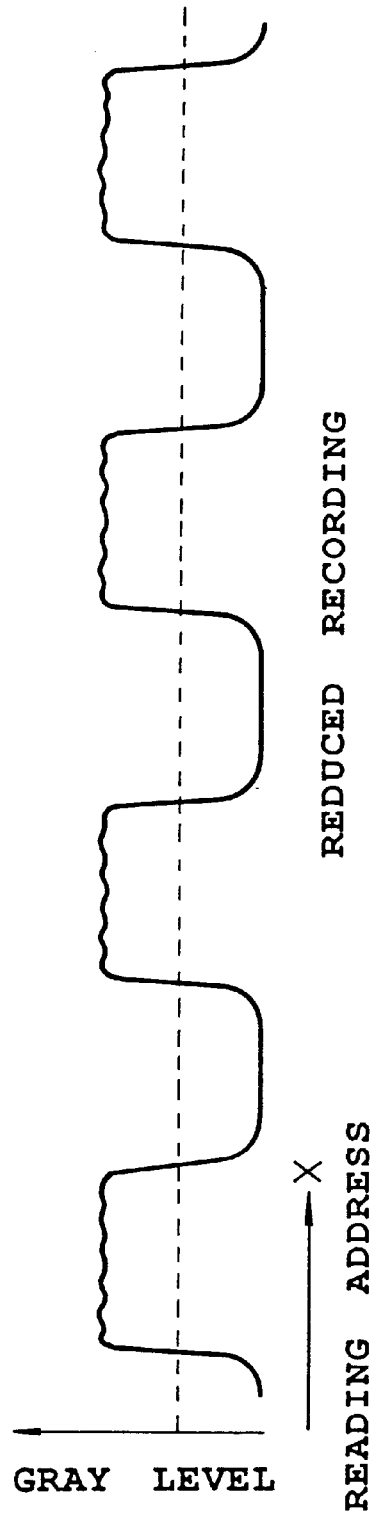

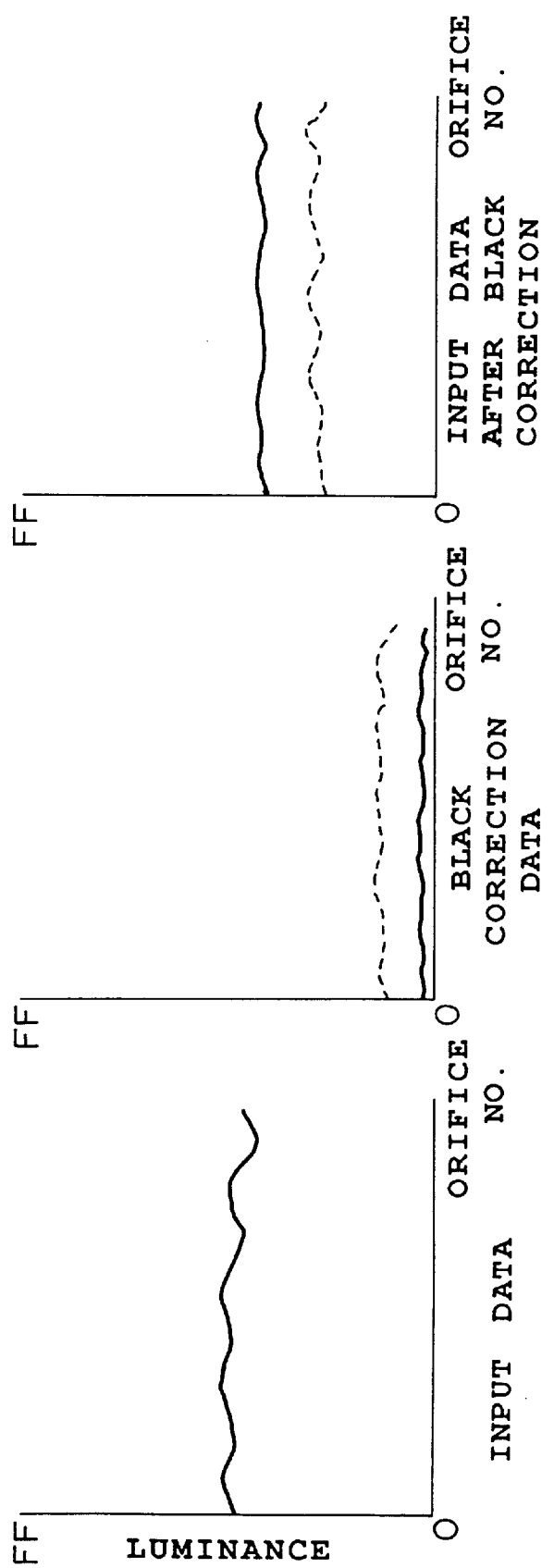

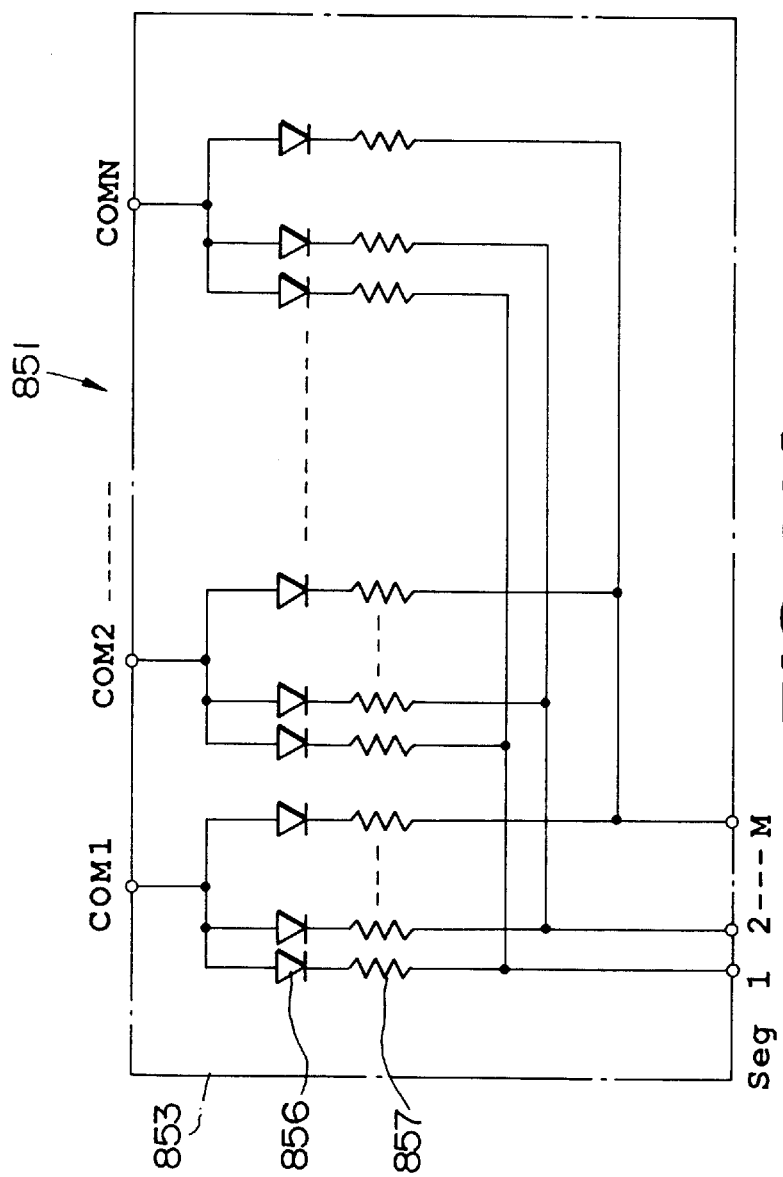
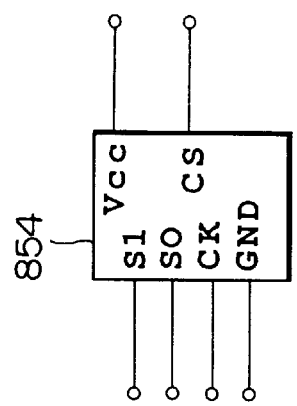
FIG. 31A
FIG. 31B

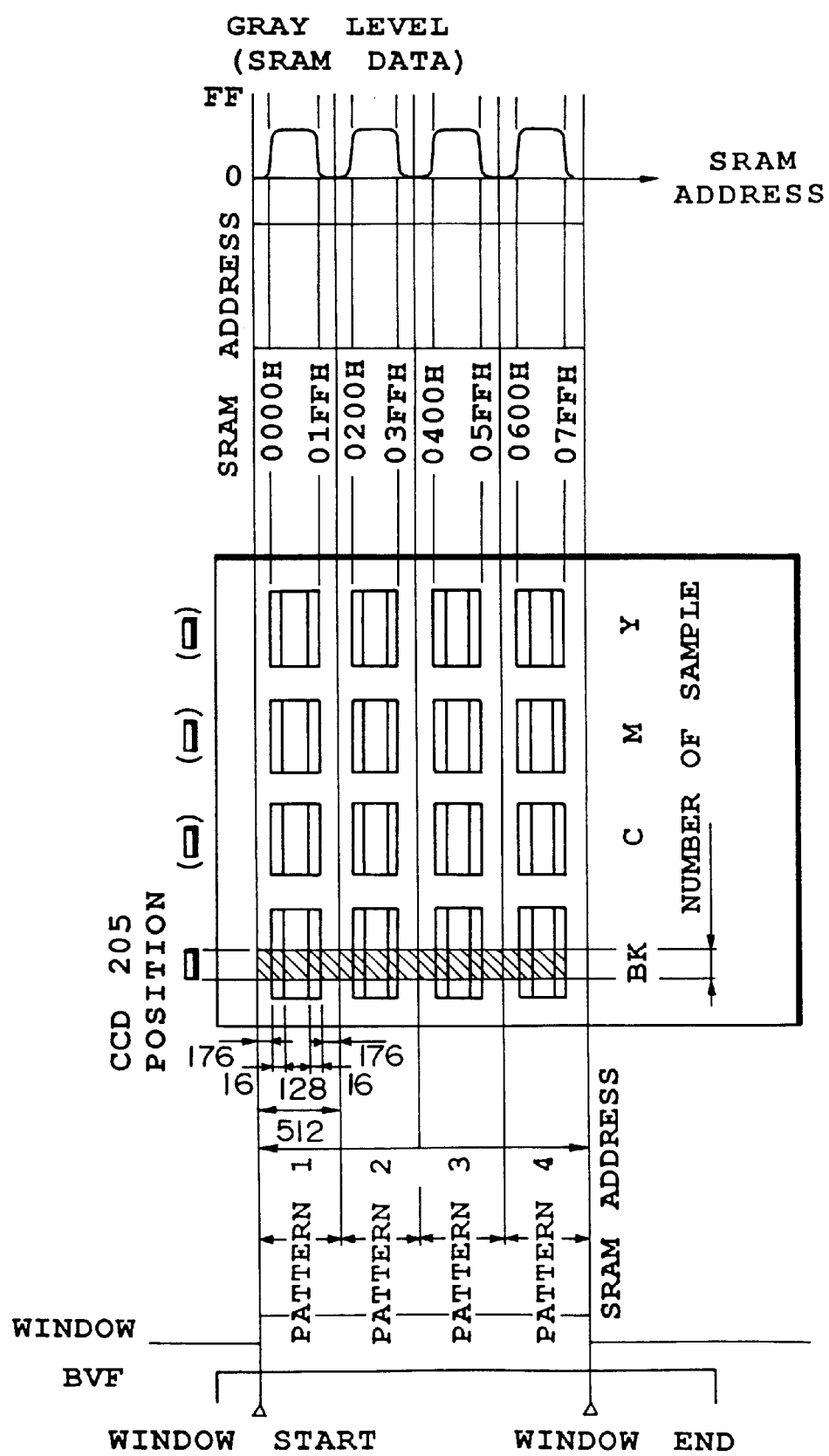

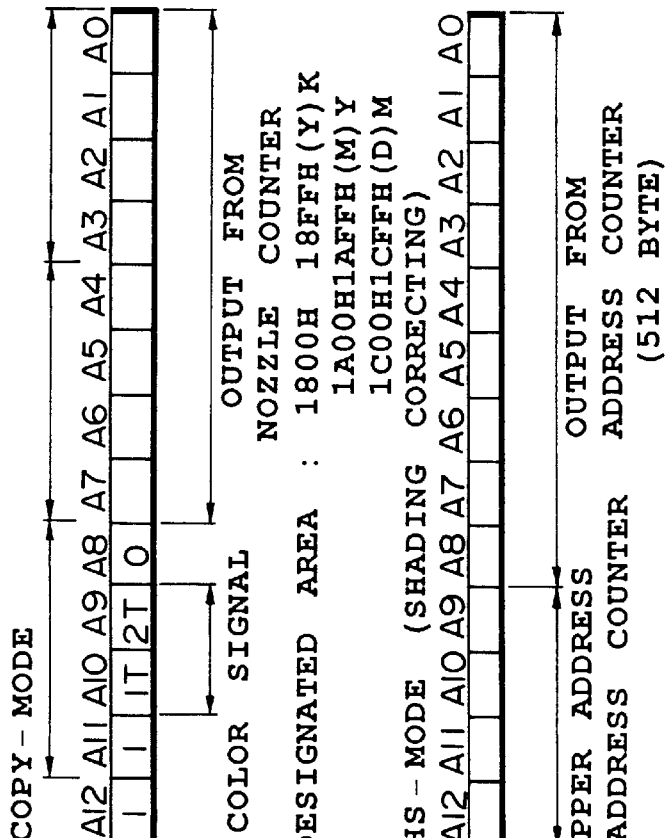
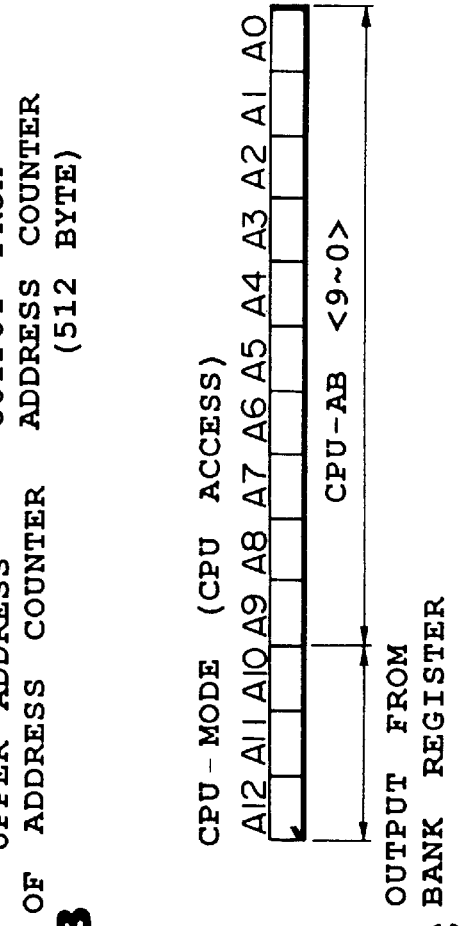
FIG. 66A
FIG. 66B
FIG. 66C

SHADING CORRECTION PROCESSING FOR AN IMAGE FORMING APPARATUS

This application is a division of application Ser. No. 07/925,623, filed Aug. 6, 1992, now U.S. Pat. No. 5,712,666.

BACKGROUND OF THE INVENTION

1. Field of the Invention

The present invention relates to a recording apparatus, and particularly a recording apparatus in which shading correction processing can be performed.

2. Description of the Prior Art

In the widespread use of computers and communication apparatus, recording apparatus outputting information of these apparatus by enabling recording heads to form digitized dots has been generally used. In addition, such digitized recording apparatus is generally applied into copy machines. In a recording apparatus using recording heads, in order to increase the recording speed, it is a general habit to use a multi-head including a plurality of recording elements. However, it is rather difficult to fabricate a plurality of recording elements in an individual multi-head in a uniform quality and hence, the characteristic of fabricated recording elements may not be stabilized. As a result, shading or density shading (density ununiformity of an image which is recorded on a recording medium by the reading head which has a plurality of recording elements) occurs in the recorded image which causes the reduction of the image quality. By repetitive use of recording elements, recording elements suffer from aged deterioration which also causes characteristic instability and shading.

In order to solve above problems, what is proposed is a method for correcting characteristic of recording elements by means that a specific read-out part for reading out shading at an arbitrary time is placed in the recording apparatus and shading correction data are generated according to the read-out data.

FIG. 1 shows a diagrammatic picture illustrating an example of such a method for reading out shading as described above.

In FIG. 1, a reference numeral 121 is a recording sheet, 122 a recording head, 123 a recording element placed in the recording head 122, 124 a read-out head composed of CCD, 125 a read-out element installed in the read-out head 124, and 126 a test pattern obtained by scanning in the X direction the recording head 122 including recording elements 123 which are arranged in the Y direction relative to the recording sheet in order to record one line pattern. The number of the read-out elements in the read-out head 124 is equivalent to that of the recording elements of the recording head 122. By scanning the read out head 124 in the direction of an arrow B in FIG. 1, the density of the pattern 126 is read out. In this configuration shown in FIG. 1, the number of density data read-out by each read-out element 125 in a single scanning operation is equal to the number of the recording elements 123 of the recording head 122, and the average of these density data is used as an ideal density to be realized by individual recording elements.

Even if input signals to all the recording elements 123 of the recording head 122 are identical to one another, in case that the read out density has shading property, the input signals should be corrected. For example, with respect to the recording element giving lower density, the input signal is corrected so as to be larger, and with respect to the recording element giving higher density, the input signal is corrected so as to be smaller. So far, the density defined by individual recording elements can be corrected to be uniform. In case that shading occurs as the recording apparatus is used, further shading correction is performed in order to establish uniform density. The modification of input signal values described above is performed by referring conversion tables.

By referring to FIGS. 2 and 3, an outline process of the shading correction processing is described below.

Now assume that the relationship between the input (driving) signal to a certain recording element n and the density of the recorded (outputted) image or dot is one shown in FIG. 2. It can be stated that the recording element n recording an image with the density $OD_n$ with respect to the input signal S. If the average density over all the recording elements with respect to the driving signal S is assumed to be $\overline{OD}$, in other words, the correction density is assumed to be $\overline{OD}$, the recording element n records an image with higher density. In order to correct the density of the recording element n from $OD_n$ to $\overline{OD}$, the intensity of the input signal to the recording element n is modified from S to S' by referring to the conversion table.

FIG. 3 is a graph illustrating a content of the conversion table. The table shown in FIG. 3 contains 64 correction curves or straight lines, each of which corresponds to a couple of an input signal S and its corresponding output signal, each signal formed in 255 gray level data. In FIG. 3, only two out of 64 lines, A and B, are shown. Information about which correction curve is selected to an individual recording element are separately stored and referred in responsive to the read-out density data in order to select a desirable correction curve. When the input signal S is inputted with respect to one recording element, this element giving the density according to the correction curve or line selected. For example, with respect to the recording element accepting the input signal S and outputting the density $OD_n$, correction line B is selected and input signal is modified to S' so that the density recorded by that recording element is $\overline{OD}$.

The density distribution established in the configuration defined as in FIG. 1 is generally found to be one shown in FIG. 4, where the horizontal axis represents the position of recording elements in the recording head, and the vertical axis represents the recording density defined by individual recording elements. One problem in this situation is that the density by the recording elements at the end parts of the array of recording elements is different from the density by the recording elements at the rest part of the array. That is, a pixel recorded by the recording elements at the rest part of the array involves recorded parts by the adjacent recording elements, on the other hand, the pixel recorded by the recording elements of the end parts of the array involves a part of ground of the recording sheet. Therefore, in the case that the sheet color is white, as shown in FIG. 4, the density at the edge parts is formed n a gradually increasing or decreasing curve in which the measured density is estimated to be less than the actual density. If the density correction is performed in such a situation, the density at the connection parts between the recording lines repetitively developed by multiple scanning operations of the recording head may be modified to be greater than the actual density.

In order to solve the above problem, as described in U.S. Ser. No. 07/593,765 (filed on Oct. 4, 1990) and U.S. Ser. No. 07/711,648 (filed on Jun. 11, 1991), there is a correction method in which three lines (three time scan operations) are recorded and only the central line data are used for correction calculations. In the case of recording three lines, recording elements at the both end parts of the array of recording elements form pixels so as to be adjacent to each other so that the above described problem may be solved.

In either method for density shading correction, it is known that several problems specific to text-pattern read-out procedures still exist.

(1) The first problem relates to the density shading correction in recording images by using a multi-head, for example, in reduction recording in copy machines.

As for a method for reduction recording, what is well known is a method that, by selecting input signals defined to individual recording elements, recording is performed not by all the recording elements but by partial recording elements. This method is further categorized into two methods. Examples on these methods applied to reduction recording in the recording apparatus shown in FIG. 5 are described below.

FIG. 5 is an isometric view of the main part of the recording apparatus using an ink jet recording method. In FIG. 5, the recording head 4 has a plurality of orifices for ejecting ink fluids in an array extended in Y direction ejecting ink fluids corresponding to individual orifices. The recording head 4 is guided by the guide shaft 5 and scanned in X direction in the figure, and in response to this transport movement, the recording head ejects ink fluids and forms dots on the recording sheet 2. By the single scan movement of the recording head, one line recording is established. The recording sheet 2 is fed in Y direction by the feed roller 1 driven by the motor not shown, which establishes a plurality of line recordings continuously. The paper press board 3 is installed near the recording area developed by the recording head 4 in order to make the recording area on the recording sheet 2 flat.

In the first method of reduction recording, the rotational movement of the feel roller 1 is controlled in an ordinary manner, and the scan operation of the recording head 4 is performed several times in responsive to a single rotational movement of the feed roller 1. At each scan operation, orifices used for recording operation are altered by blocks. This means that, in a multi-head having N orifices, in the first scan, orifices from the edge to n1 are used, and in the second scan, orifices from (n1+1) to n2 are used, and in the K-th scan, orifices from n(k-1)+1 to N are used for recording, respectively. Owing to this sequence, reduction recording with 1/k magnification can be performed. After terminating the recording at the K-th scan, the feed roller 1 is rotated in order to move the recording sheet in the transport distance equivalent to the N pitches of orifices. So far, reduction recording is repeated in the same manner.

In the second method of reduction recording; the rotational movement of the feed roller 1 and the scan operation of the recording head 4 are altered mutually, or the rotational angles of the feed roller 1 which determines the transport displacement of the recording sheet 2 is controlled in responsive to the recording magnification. For example, in recording by using $L(L \leq N)$ orifices in the multi-head having N orifices, reduction recording with L/N magnification can be performed, in which the transport displacement of the recording sheet is equivalent to the L pitches of orifices.

In the above two methods, the number of reduction patterns obtained by the second method is greater than that obtained by the first method. In the first method, as recording is performed by K times sheet feed operations, in each time of which N orifices are used, K must be a divisor of N and the number of reduction patterns is limited to the number of divisors of N. On the other hand, in the second method only if the condition, $L \leq N$, is satisfied, the number of reduction patterns is theoretically taken to e the number of orifices. This is the reason why the second method is usually used for reduction recording.

However, even in the above described method for reduction recording, if the conventional method for density shading correction is adopted, the following problems exist.

As described above, the density of a specific pixel to be read is affected the density of pixels adjacent to the specific pixel. In the example of a multi-head having n orifices (recording elements), the correction data for the i-th recording element includes the effect by the (i−1)th and (i+1)th recording elements. In other words, the correction data for the i-th recording element is most effective when a pixel is recorded by the i-th recording element between pixels defined by the (i−1)th and (i+1)th recording elements.

FIGS. 6A and 6B are recorded pixels and density distributions in an ordinary recording condition without density shading correction and with density shading correction, respectively. Without density shading correction as shown in FIG. 6A, density shading is found to be to a relatively large extent. In contrast, in the example shown in FIG. 6B, by altering the number of pixels at individual recording elements instead of varying the values of input signals, density shading in a designated region can be reduced.

However, in case of reduction recording by using orifices from 1 to i out of n orifices, recording is performed in the following manner.

At first, the recording head is moved in X direction in FIG. 5 while recording one line using recording elements from 1 to i. Next, at the time when the recording head is moved back to the home position, the recording sheet is moved in Y direction by the i pitches of recording elements which is i/n of an ordinary transport displacement of the recording sheet. And one line is recorded by using recording elements from 1 to i. In recorded images in an ordinary magnification ratio, pixels adjacent to the pixel defined by the i-th recording element are those defined by the (i−1)th and (i+1)th recording ratio, as the i-th recording element is defined as a recording element at the edge part, the pixel defined by this i-th recording element is located between the (i−1)th recording element and the 1st recording element. Recorded pixels and density distribution in reduction recording after density shading correction are shown in FIG. 6C. Density shading correction applied in FIG. 6B is also applied to individual recording elements in reduction recording in FIG. 6C. In this case shown in FIG. 6C, if density shading correction is performed without considering the mutual effect between recording elements "i" and "1" which form a connection part of recorded images, density shading correction is not sufficient enough and density shading may be contained in the density distribution which is found to be a black or white line noise in a recorded image. In the prior art, due to above described density shading, there is a problem that the quality of reduced recorded images is worse than that of ordinary recorded images.

(2) The second problem relates to above described density shading in a recording apparatus for recording images with a plurality of different ink colors.

In reading out a test pattern recorded with a plurality of different ink colors, the density levels of individual ink colors are generally different from one another. Therefore, the levels of density shading found in read-out data changes in every individual color image. If an identical density shading correction is applied commonly to individual ink colors, density shading for specific color tones may not resolved.

In order to solve this problem, a method in which a distinctive correction procedures is applied to a specific color tone is possible. However, this method requires a complex apparatus structure and control process which may lead to another new problem.

This problem is not specific to the recording apparatus using an ink jet recording method but found in a recording apparatus using a plurality of recording elements and a plurality of ink colors, for example, a thermal printer.

(3) The third problem is that, in case of using an exchangeable recording head, density shading correction may give a bad effect dependent of the characteristics of the recording head.

(4) The fourth problem is that, in case that a test pattern chart is not placed in a proper position the read-out data of the test pattern cannot be obtained precisely.

(5) The fifth problem is that, in case that a test pattern is not recorded in a good condition on the test pattern chart, the read-out data of the test pattern cannot be obtained precisely.

SUMMARY OF THE INVENTION

An object of the present invention is to provide a recording apparatus which can always make the optimum correction of shading according to a recording head to be used and recording mode.

Another object of the present invention is to provide a recording apparatus which can always make the optimum correction of shading by using a different shading correction process, respectively, when recorded by all recording elements of the recording head and when recorded by a portion of recording elements.

Further object of the present invention is to provide a recording apparatus which makes a recording by using a plurality of colors, in which the density shading of each recorded color is reduced with a simple construction.

Still further object of the present invention is to provide a recording apparatus which can correct and record input image data on the basis of density shading correction data made by read-out of an image pattern recorded by the recording head, and which can make and renew the correction data with a high reliability.

In a first aspect of the present invention, there provided a recording apparatus comprising:

a recording head having a plurality of recording elements;

a test pattern recording means for recording a test pattern;

a read-out means for reading out the test pattern recorded by the test pattern recording means;

a correction data setting means for setting shading correction data used when the recording head recording on the basis of the read-out data read by the read-out means; and a modification means for modifying the test pattern recording means and/or the correction data setting means in responsive to at least one of a recording mode of the recording apparatus, a state of the recording head and a state of the test pattern recording means.

In a second aspect of the present invention, there provided a recording apparatus for performing recording by a set of pixels comprising:

a recording head having a plurality of arrayed recording elements for forming the pixels;

a test pattern recording means for recording a test pattern by using the recording head, the means recording a test pattern by using only a part of the plurality of arrayed recording elements, the part of the plurality of arrayed recording elements being used for the recording; and a shading correction means for correcting a characteristic of each of the plurality of arrayed recording elements of the recording head in forming the pixel based on the test pattern recorded by the test pattern recording means.

Here, the test pattern recording means may record a test pattern so that a pixel defined by one end part in the plurality of arrayed recording elements used for the recording may be adjacent to a pixel defined by the other end part of the plurality of arrayed recording elements.

The shading correction means may correct the characteristic on the basis of a read-out result of a read-out means for reading out the test pattern.

Each of the recording elements may have an orifice for ejecting ink fluid and a thermal energy generation element for generating thermal energy for ejecting the ink fluid from the orifice, may generate a bubble by the thermal energy, and may eject the ink fluid accompanied by generation of the bubble.

In a third aspect of the present invention, there provided a recording apparatus for performing recording by using a recording head having a plurality of recording elements with a plurality of recording colors comprising:

a read-out means for reading out data of an image recorded by the recording head;

a density changing means for changing a density level of the read-out data by changing a reference data used for transferring the read-out data in converting the data read out by the read-out means into a recording data for the recording head; and a shading correction means for correcting a density recorded by each of the plurality of recording elements of the recording head based on the changed density level by the density changing means.

Here, the density changing means may have a CPU, the CPU changing a reference data of an A/D conversion circuit for converting the read-out data into a digital signal.

The density changing means may change black data in applying a black correction process to the read-out data.

The density changing means may change black data by changing a black shading plate read for sampling black data in responsive to the recording color.

In a fourth aspect of the present invention, there provided a recording apparatus recording by using a recording head having a plurality of recording elements, the recording head having a means for storing an identification information of the recording head and a first shading correction data specific to the recording head, the first density shading correction data being referred in recording, the apparatus comprising:

a first memory means for reading the identification information and the shading correction data and storing both with one being corresponding to the other;

a shading correction data making means for making a second shading correction data by using the first shading correction data read from the first memory means;

a second memory means for storing the second shading correction data made by the shading correction data making means and the identification information corresponding to the first shading correction data in a coupled form;

a storing means for reading the identification information and the first shading correction data from an installed recording head in a designated timing and storing both into the first memory means; and a recording head driving means for comparing the identification information read out from the second memory means and a recording head identification information stored in the first memory means, the recording head driving means driving the recording head by using the second shading correction data read out from the second memory means if the both identification informations equal to each other, or the recording head driving means driving the recording head by using the first shading correction data read out from the first memory means if the both identification information do not equal to each other.

Here, the designated timing may be a time when an electric power supply to the apparatus is turned on.

The designated timing may be time when a door installed for opening an inside of the apparatus and accepting a work for exchanging the recording head is opened or closed during an electric power supply to the apparatus is turned on.

A recording apparatus may further comprise a battery for backing up the first memory means and the second memory means.

The second density shading correction data may be stored in the second memory means only by the shading correction data making means.

The shading correction data making means may have a means for making a new second shading correction data by correcting the second shading correction data and for revising a content of the second memory means.

A recording apparatus may further comprise:

recording means for recording a designated test pattern on a recording medium repetitively in a plurality of times;

a read-out means for reading the designated test pattern;

a density determination means for obtaining a density or a density ratio for each of said plurality of recording elements with respect to each of a plurality of said read-out test patterns and for determining an average value of the density or the density ratio over the plurality of the read-out test patterns as a density or a density ratio for each of the plurality of recording elements.

In a fifth aspect of the present invention, there provided a recording apparatus forming an image by using a recording head having a plurality of recording elements, the recording apparatus having a correction means for avoiding a generation of shading in the formed image by correcting at least one image processing condition of the plurality of recording elements, the apparatus comprising:

a forming means for forming a designated test pattern on a recording medium by the recording head;

a read-out means for reading the test pattern;

a shading correction data making means for making data for the correction by using the read-out result; and a judging means for judging whether the recording medium on which the test pattern is formed is placed in a proper read-out position with respect to the read-out means in making the correction data.

Here, the judging means may judge that the read-out position is not correct in case that the displacement between a position of an edge part of the test pattern detected by the read-out means and a position of an edge part of the test pattern at a time when forming the test pattern is greater than a designated value.

The judging means may judge that the read-out position is not correct in case that the difference between a width of the test pattern detected by the read-out means and an actual width of the test pattern.

A recording apparatus may further comprise a memory means for storing the made shading correction data, wherein the shading correction data making means revises a content of the memory means every time when the shading correction making means making a shading correction data.

The test pattern may be formed repetitively a plurality of times on the recording medium; and the density shading correction data making means may determine the density or the density ratio for each of the plurality of recording elements with respect to each of the plurality of read-out test patterns, and may determine an average value of the density or the density ratio over the plurality of test patterns as a density or a density ratio for each of the plurality or recording elements.

In a sixth aspect of the present invention, there provided a recording apparatus forming an image by using a recording head having a plurality of recording elements, the recording apparatus having a correction means for avoiding a generation of shading in the formed image by correcting at least one image processing condition of said plurality of recording elements, the apparatus comprising:

a forming means for forming a designated test pattern on a recording medium by the recording head;

a read-out means for reading the test pattern;

a shading correction data making means for making data for the correction by using the read-out result; and a judging means for judging whether the test pattern is formed in a proper state or not from the read-out result.

Here, the judging means may judge that the test pattern is not formed in the proper state in case that the test pattern read out by the read-out means contains a part with its density being lower than a designate absolute density value.

A recording apparatus may further comprise a memory means for storing the made shading correction data, wherein the shading correction data making means revises a content of the memory means every time when the shading correction making means making a shading correction data.

The test pattern may be formed repetitively a plurality of times on the recording medium; and the density shading correction data making means may determine the density or the density ratio for each of the plurality of recording elements with respect to each of the plurality of read-out test patters, and determines an average value of the density or the density ratio over the plurality of test patterns as a density or a density ratio for each of the plurality of recording elements.

In a seventh aspect of the present invention, there provided a recording apparatus performing recording by using a recording head having a plurality of recording elements, the recording head storing an identification information and shading correction data specific to the recording head, the apparatus comprising:

a first storing means for reading out the identification information and the shading correction data and storing both into a first memory area when the recording head is installed; and a second storing means for revising the shading correction data in the first memory area and storing the revised shading correction data into a second memory area together with the identification information stored in the first memory area, wherein by comparing said identification information stored in said first memory area and the identification information stored in the second memory area in a designated timing, the shading correction data stored in the second memory area is used for recording, if the both identification informations equal to each other, or the shading correction data stored in the first memory area is used for recording, if the both identification information do not equal to each other.

In an eighth aspect of the present invention, there provided a recording method comprising the steps of:

providing a recording head having a plurality of recording elements;

recording a test pattern by using the recording head;

reading out the recorded pattern;

setting shading correction data used when the recording head recording on the basis of the read-out data;

modifying the test pattern recording and/or the shading correction data setting in responsive to at least one of a recording mode of the recording apparatus, a state of the recording head and a state of the recording of the test pattern; and performing recording on the basis of the shading correction data obtained by the modification of the test pattern recording and/or the shading correction data setting.

In a ninth aspect of the present invention, there provided a recording apparatus for performing recording by a set of pixels, the apparatus being able to perform reduction recording, comprising:

a recording head having a plurality of arrayed recording elements for forming the pixels;

a test pattern recording means for recording a test pattern by using the recording head, the means recording a test pattern by using only a part of the plurality of arrayed recording elements, the part of the plurality of arrayed recording elements being used for the reduction recording;

a read-out means for reading out the test pattern recorded by the test pattern recording means; and a shading correction means for correcting a characteristic of each of the part of the plurality of arrayed recording elements of the recording head in forming the pixel based on the test pattern.

Here, the test pattern recording means may record a test pattern so that a pixel defined by one end part in the part of the plurality of arrayed recording elements used for the reduction recording may be adjacent to a pixel defined by the other end part of the plurality of arrayed recording elements.

A recording apparatus may further comprise:

an original read-out means for reading an original; and a signal processing means for performing reduction processing of the read original and for supplying the result of the reduction processing to the part of the plurality of arrayed recording elements.

Here, the original read-out means and the read-out means may use a portion of the recording apparatus in common.

In a tenth aspect of the present invention, there provided a reduction recording method in a recording method for performing recording by a set of pixels, comprising the steps of:

providing a recording head having a plurality of arrayed recording elements for forming the pixels;

recording a test pattern by using the recording head, the recording of a test pattern being performed by using only a part of the plurality of arrayed recording elements, the part of the plurality of arrayed recording elements being used for reduction recording;

reading out the recorded test pattern; and correcting a characteristic of each the part of the plurality of arrayed recording elements of the recording head in forming the pixel based on the read out test pattern.

The above and other objects, effects, features and advantages of the present invention will become more apparent from the following description of embodiments thereof taken in conjunction with the accompanying drawings.

BRIEF DESCRIPTION OF THE DRAWINGS

FIGS. 6A, 6B and 6C each are explanatory diagrams illustrating the relation between the correction of shading and reduction recording;

FIGS. 11A and 11B are diagrammatic views each of which illustrates relation between orifices and the respective test patterns of ordinary recording and reduction recording according to embodiment 1 of the present invention;

FIGS. 12A and 12B are graphs showing the density distribution of the each test pattern of both the recording illustrated in FIGS. 11A and 11B, respectively;

FIGS. 26A, 26B and 26C are graphs illustrating influence of black-correction data upon black-correction processing;

FIGS. 31A and 31B are circuit diagrams of a heater board in the recording head and an EEPROM of embodiment 3, respectively;

FIG. 50 is an explanatory diagram illustrating the test pattern for measuring shading according to the present embodiment and the reading method thereof;

FIGS. 66A, 66B and 66C are schematic diagrams showing an address selector of a SRAM in each control mode of the control part.

DETAILED DESCRIPTION OF PREFERRED EMBODIMENTS

Embodiments of the present invention will be explained hereinafter with reference to the drawings.

Embodiment 1

Figure 1:
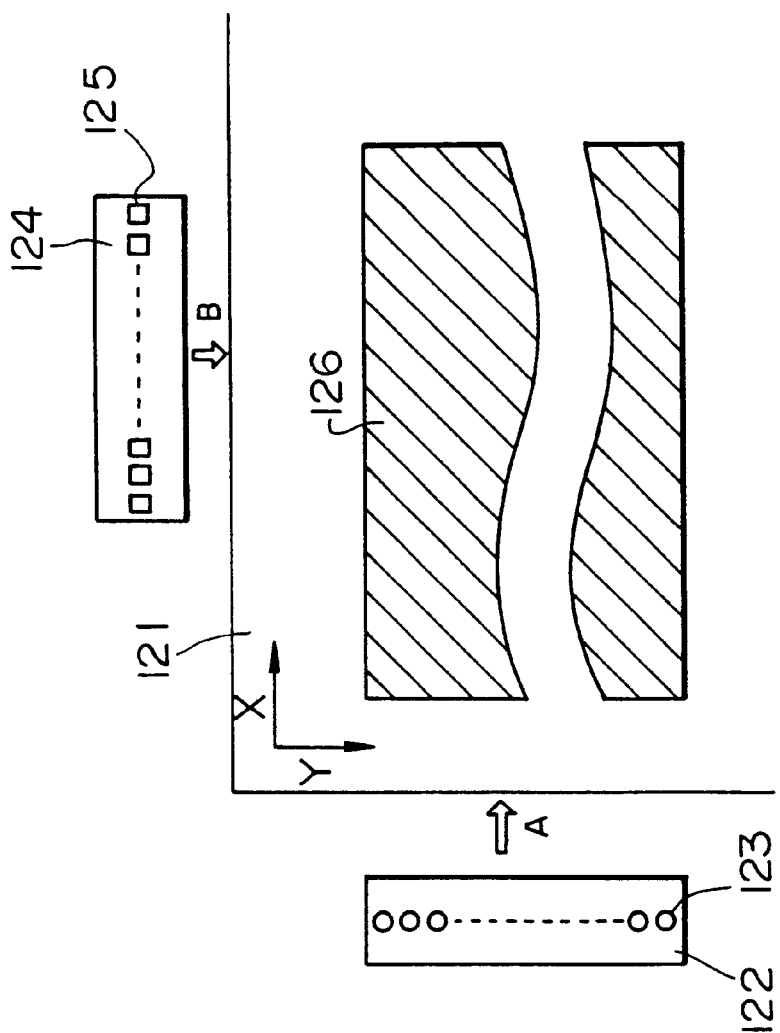
FIG. 1 is a diagram illustrating recording of a test pattern by a multiple head and reading of the test pattern by a reading head.
Figure 2:
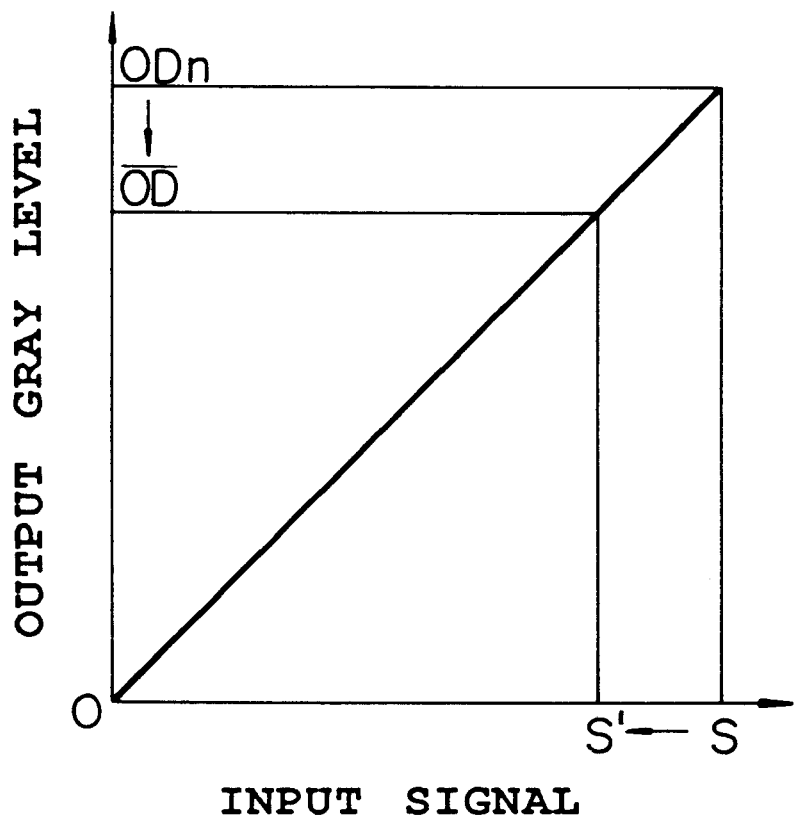
FIG. 2 is a graph illustrating correction of shading.
Figure 3:
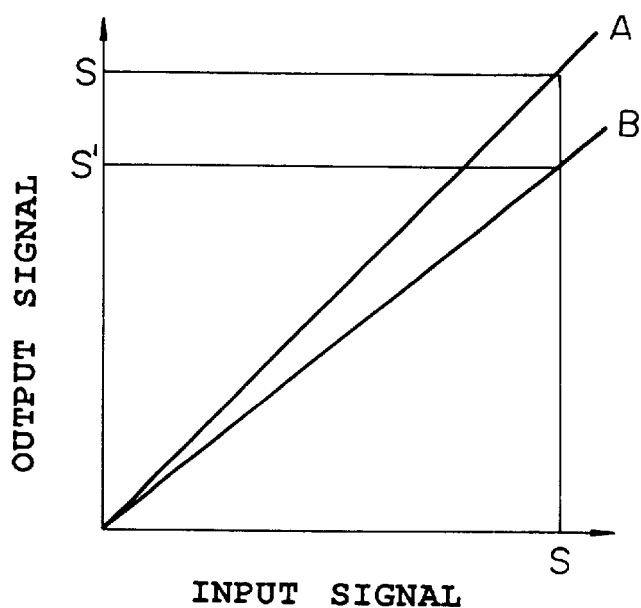
FIG. 3 is a graph illustrating the correction of shading.
Figure 4:
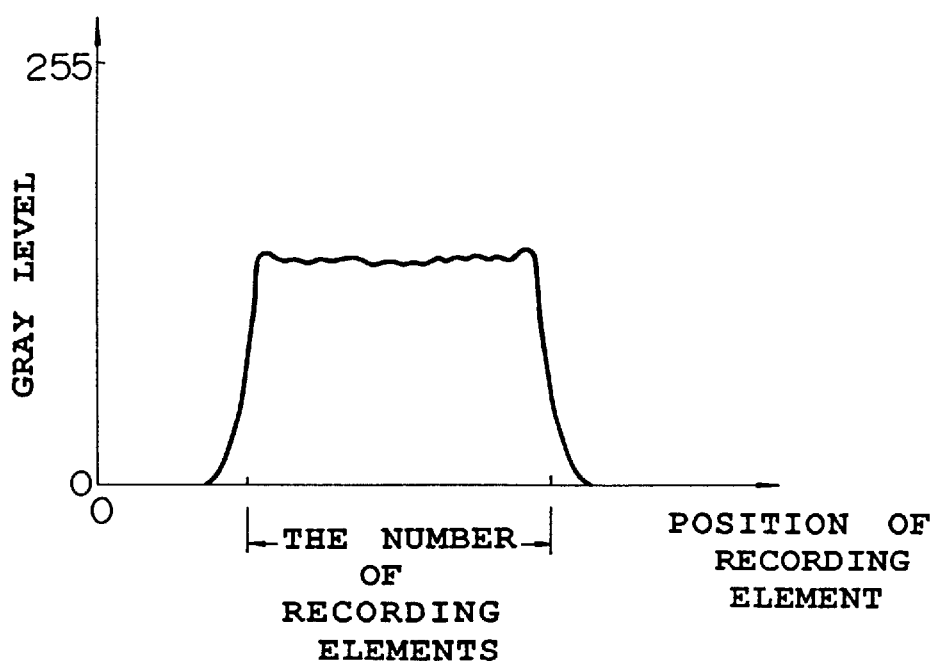
FIG. 4 is a graph showing density (gray level) distribution of the test pattern which is read in the reading illustrated in FIG. 1.
Figure 5:
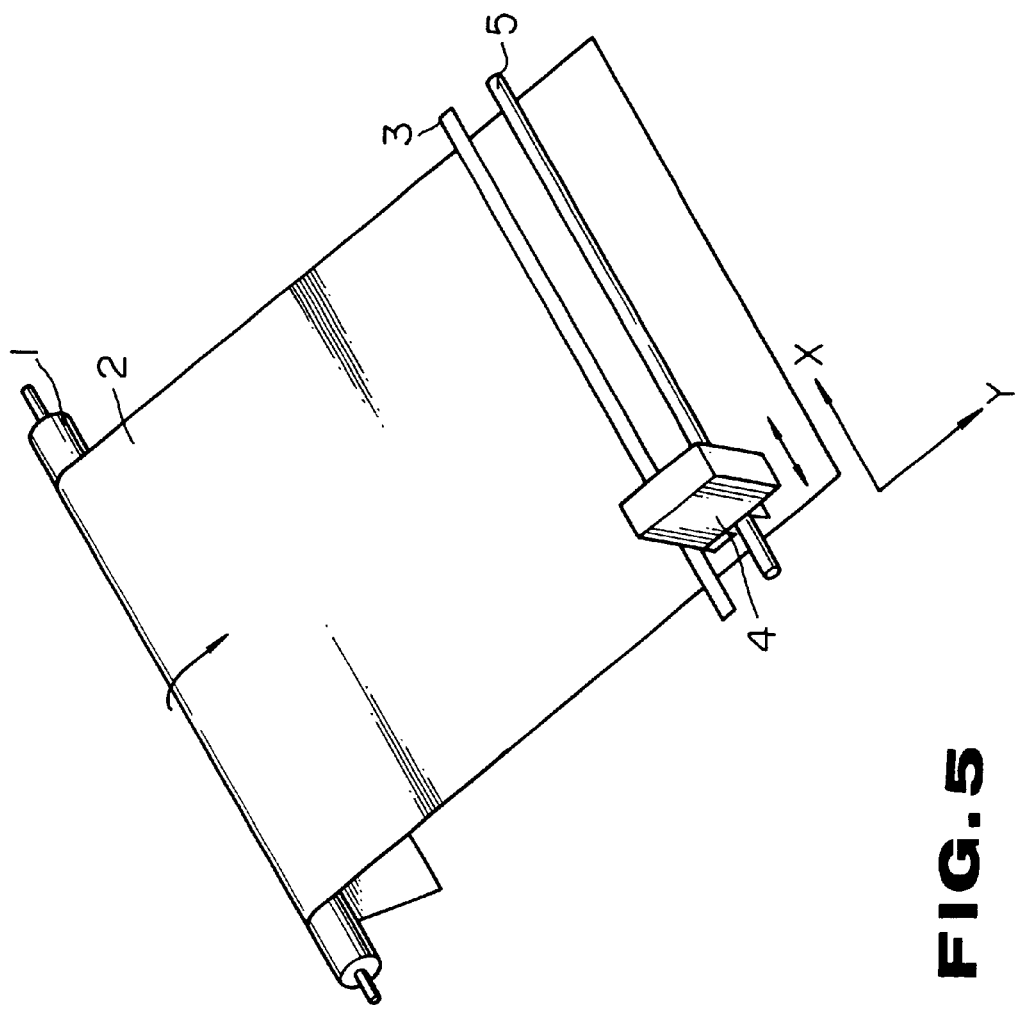
FIG. 5 is a schematic perspective view showing an example of an ink jet recording apparatus.
Figure 7:
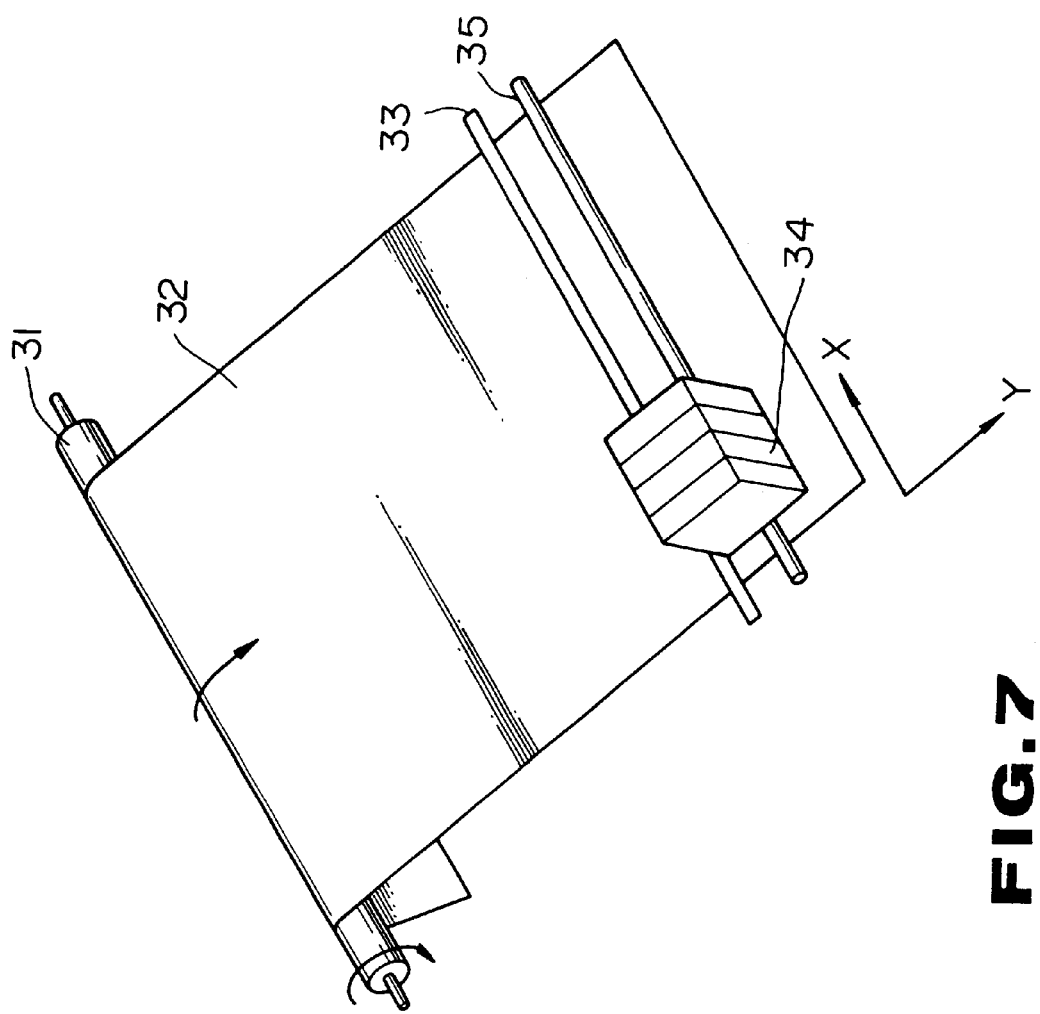
FIG. 7 is a schematic perspective view showing a recording part of a copy machine according to embodiment 1 of the present invention.

As embodiment 1, an ink-jet type color copy machine with five kinds of reduction magnification will be described hereinafter. FIG. 7 is a schematic perspective view showing a recording part of the color copy machine.

A recording head 34 is a removable head of a cartridge type with an integrated ink reservoir, which is movable along a guide bar 35 in an X direction shown in FIG. 7 by using driving means (not shown). A recording paper 32 is transported in a Y direction by rotating a paper feeding roller 31 in a direction of an arrow. The ink is ejected as the recording head 34 moves in the X direction, thereby, the whole face of the recording paper can be recorded. At this time, a paper press 33 presses the recording paper 32 in order to maintain it flat. The color copy machine of the present embodiment is provided with four recording heads 34 each corresponding to black, cyan, magenta and yellow ink.

Figure 8:
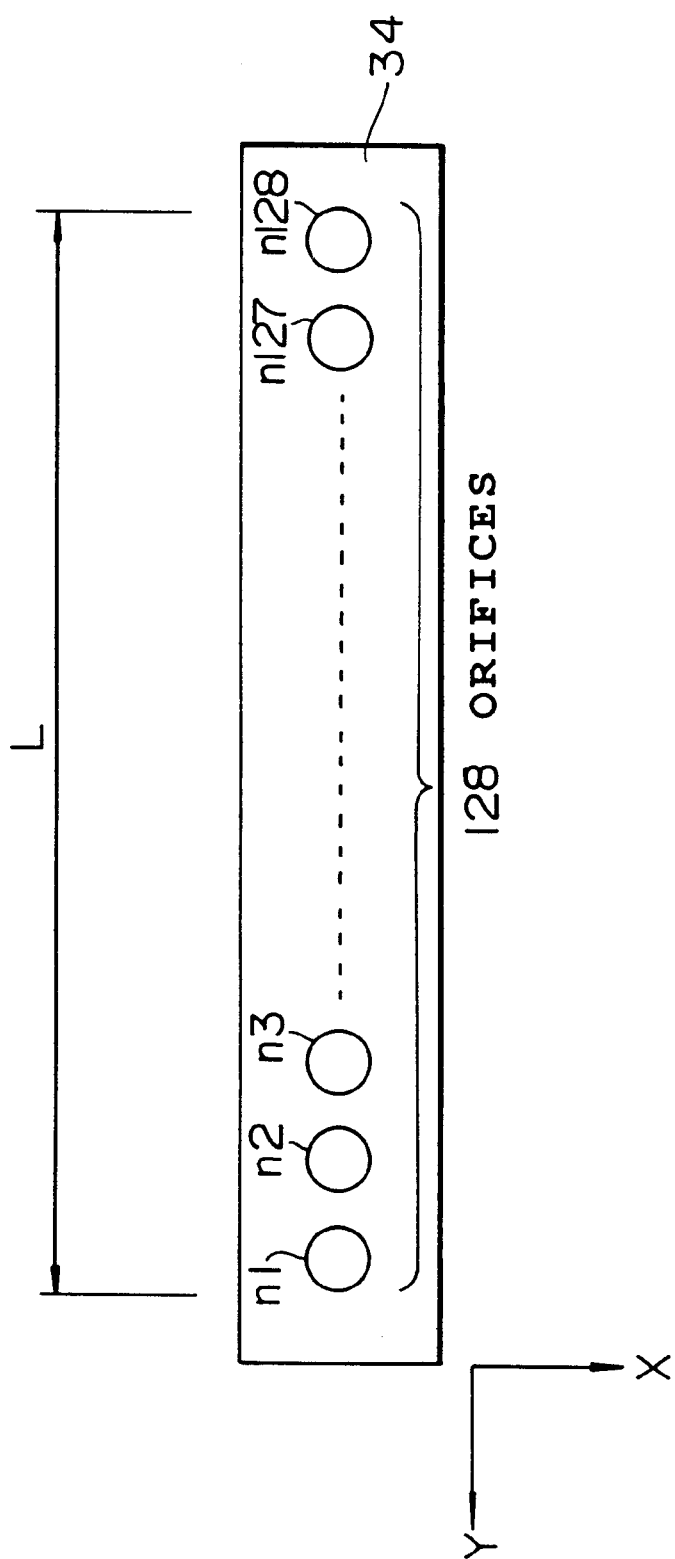
FIG. 8 is a diagrammatic view showing an orifice disposed surface of a recording head shown in FIG. 7.

FIG. 8 is a diagrammatic view showing an orifice disposed surface of orifices of the recording head 34.

Each of the recording heads 34 is provided with 128 orifices n 1 through n 128. In order to generate thermal energy for ejecting the ink, an electro-thermal converting element is provided in a portion communicated in fluid to each orifice. A pixel is formed by the ink ejected from each of these orifices. In every one scanning cycle in which the recording head 34 ejects the ink while it moves in the X direction shown in FIG. 7 and returns to the original position, the recording paper 32 is transported to the extent of recording width for one line, and is recorded in order.

When it is identically (equal) sizing recording, namely ordinary recording, all the 128 orifices are used, therefore, the length of paper transportation equals to the length L corresponding to the 128 orifices. However, if it is reduction (reduced) recording, the orifices are used, which is less than 128 from the orifice at the end of the orifice array shown in FIG. 8, therefore, the length of the paper transportation equals to that corresponding to these orifices. For example, with respect to 75 percents (%) reduction recording, the orifices to be used orifices n 1 through n 96 shown in FIG. 8, and the length of the paper transportation is L×0.75.

Figure 9:
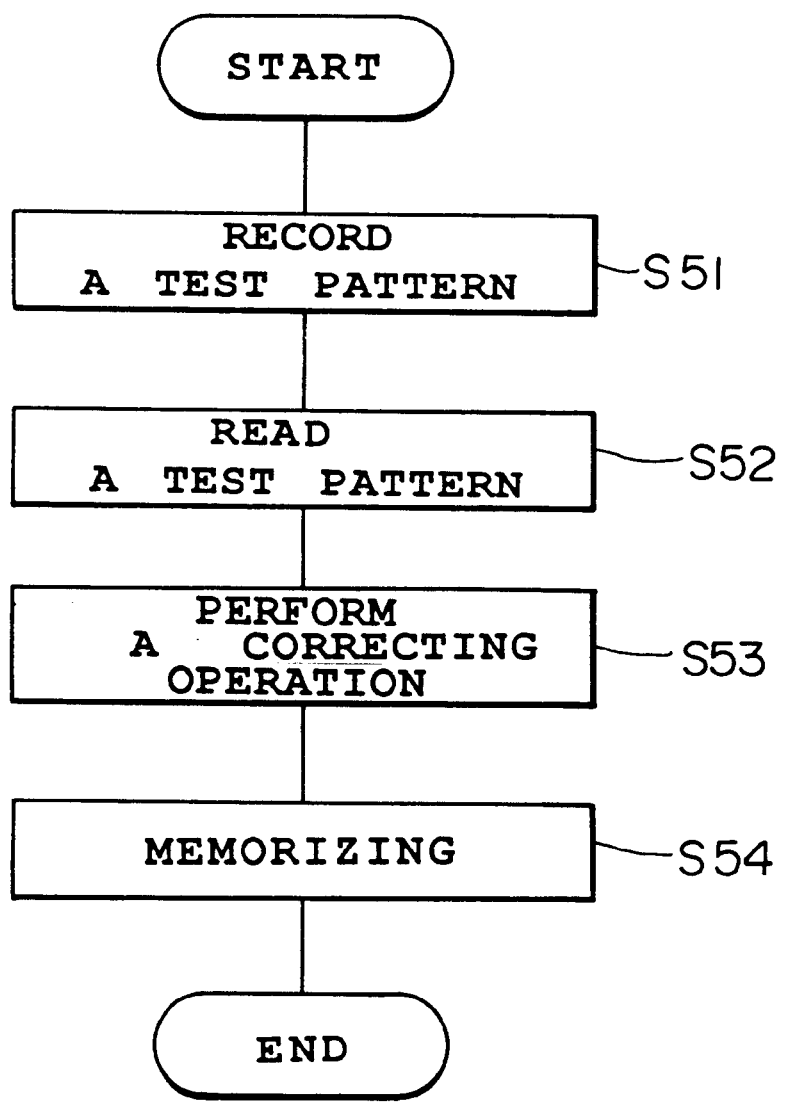
FIG. 9 is a flow chart illustrating shading correcting procedure in accordance with embodiment 1 of the present invention.

Referring to the flow chart shown in FIG. 9, a shading correcting mode will be explained as an example in which the 75% reduction recording is compared with the identically sizing recording.

First, when it is in a shading correction mode, in step S51, a test pattern is recorded by the recording part of FIG. 7.

Figure 10:
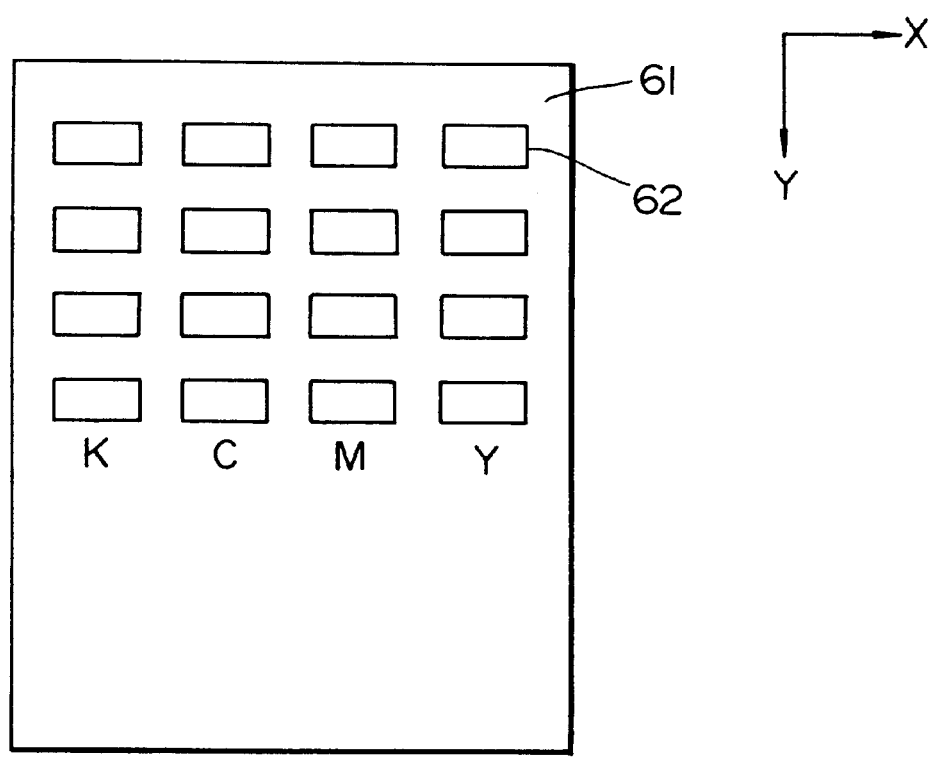
FIG. 10 is a diagrammatic view showing the test pattern according to embodiment 1 of the present invention.

This test pattern is recorded with a constant gray level (density) of each color as shown in FIG. 10, wherein a reference numeral 61 designates a recording paper, and 62 a recording area. As described above, when the shading of each orifice is corrected by reading the sample in the test pattern, the recording of the test pattern by the endmost orifice must be made under the same condition as other orifices, taking into consideration the effect of next orifices on both sides. That is, in the ordinary recording, a pixel recorded by the orifice n 128 should be positioned in front of a pixel by the orifice n 1, and the pixel recorded by the orifice n 1 should be positioned next to the pixel by the orifice n 128. While in the 75% reduction recording, a pixel recorded by the orifice n 96 should be positioned in front of a pixel by the orifice n 1, and the pixel by the orifice n 1 should be positioned next to the pixel by the orifice n 96. FIGS. 11A and 11B show in detail the above-mentioned matter, in which in order to record the test pattern, it is necessary to scan three times.

In the above recording of the test pattern, the test pattern of the reduction recording occupies a recording area smaller than that of the ordinary recording. Further, in the pattern recording shown in FIGS. 11A and 11B, several pixels are respectively recorded next to the respective side pixels recorded by orifices at a both end portions, thereby the effect of the secondary reflection can be prevented, which is derived from a ground of the surface of the recording paper when the test pattern is read out. It is, therefore, possible to allow shading correction conditions of the orifices at the end portions to approach closer to those of other orifices.

Next, the test pattern is read out in step S52.

In the present embodiment, a chart which the test pattern is recorded is put on an original (manuscript) stand and read out in the same manner as the read-out in the ordinary operation of the copy machine. At this time, the test pattern should be positioned such that the direction of a recording scanning of the test pattern may be at right angles to that of a reading scanning of a reading head. In this embodiment, the scanning direction of the reading head is the direction designated arrow Y in FIG. 10. Thereby, equalized can be the variation of read-out characteristic of each sensor in the recording head.

FIGS. 12A and 12B show gray level (density) distribution which was read out during one scanning of the reading head (sensor). FIG. 12A shows the density distribution of the identically sizing recording, and FIG. 12B that of the 75% reduction recording. FIG. 12A further shows the shading made by the orifices n 1 through n 128, and FIG. 12B further shows that made by the orifices n 1 through n 96. The shading data on one color is obtained by one scanning of the reading head, the test pattern is then scanned as the reading head moves to an X direction shown in FIG. 10, and the test pattern with a next color is read out. When the shading data is obtained with respect to four colors, the read-out of the test pattern is completed.

Next, in a correcting operation of step 53, the shading data read out as mentioned above is divided into recording areas and non-recording areas. That is, as shown by dotted lines in FIG. 12, areas above the dotted lines each of which means a threshold level fixed to a certain absolute gray level are set to the recording areas and other areas the non-recording areas. Next, the central position of the recording area is obtained from a step-up position and a step-down position of the recording area distinguished in the above manner. The central position is set to that of the orifices used in the recording. In the present embodiment, the position between an orifice n 64 and an orifice n 65 and the position between an orifice n 48 and n 49 are determined as the central position in identically sizing recording and 75% reduction recording, respectively. The correspondence between each orifice and the reading density data is taken on the basis of the central position. Next, the ratio of the density data assigned to each orifice to the average density is calculated. The correcting operation of step 53 is in detail explained below.

Figure 13:
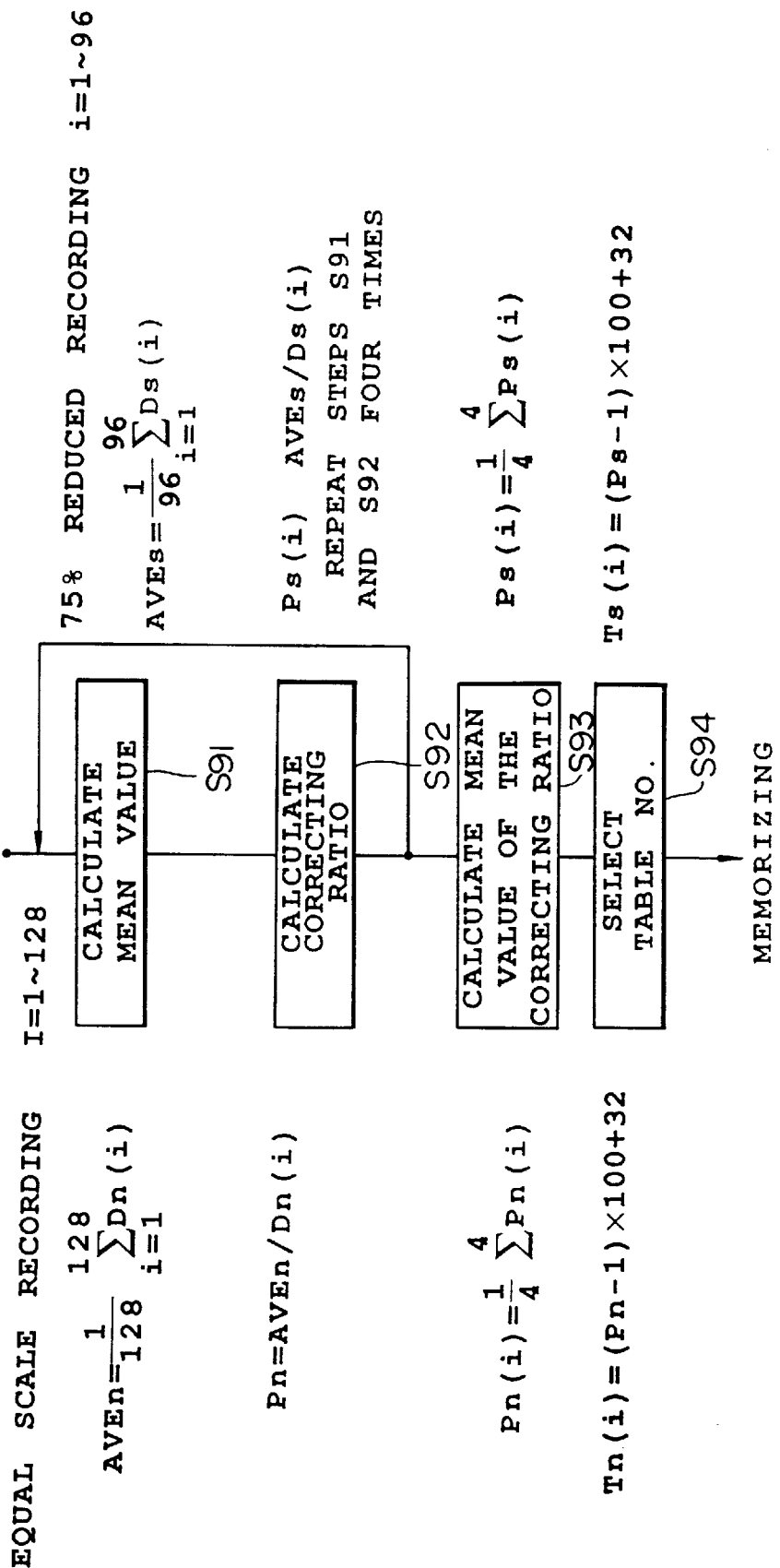
FIG. 13 is a flow chart illustrating an operation of the shading correcting according to embodiment 1 of the present invention.

Now, the density of each of the orifices from n 1 to n 128 in the identically sizing recording is set to as Dn (i), where i=1 through 128, and that in the 75% reduction recording is set to as Ds (i), where i=1 through 96. After that, the calculation which uses those density is performed on the basis of a flow chart shown in FIG. 13. First, in step S91, when in an identically sizing recording mode, the average density is calculated about all the orifices, 128 orifices, and when in a 75% reduction recording mode, that is calculated about 96 orifices from n 1 to n 96. Next, a correction ratio of each orifice is calculated in step S92, where the correction ratio is a reciprocal of the ratio of its density to the average density. In other words, the correction ratio means how much correction is required to its orifice. The value of the correction ratio becomes lower as the density becomes higher. Next, the processing is returned to the calculation of the average value in step S91, because the recording areas of the test pattern are four about every color as shown in FIG. 10 and in FIGS. 12A and 12B and it is necessary to perform one by one the calculation processing. Due to the processing like this, the number of the density data to be read is increased and as a result, the reliability of the correction is increased. In addition, the reading errors of the density is decreased, which is produced by putting the test pattern on a slant against the reading sensor. As described above, in steps S91 and S92, four units of the correction ratio are obtained to each orifice. Next, in step S93, these correction ratio are averaged and the final correction ratio is obtained. Next, in step S94, the optimum correction table for each orifice is selected from among predetermined 64 correction tables on the basis of the final correction ratio.

Where, the correction table is provided for determining the relation between the recording duty of an input signal and that of an output signal. The number of pixels (dots) to be recorded to the predetermined area is increased or decreased according to the density by using this correction table. Accordingly, if the correction table is suitably selected on the basis of the above correction ratio, the duty of the orifice of which density is higher than the average density is reduced by the duty correction, and the number of the dots to be recorded is decreased. On the other hand, in the orifices of which the recording density is relatively low, the reverse is performed. The present embodiment includes 64 correction tables, in which the No. 32 table does not give any correction to the input signal, and 64 tables are set at equal interval of 1% correction ratio around the No. 32 table centered. The numbers, 1, 2, . . . 64, are given in order from the first table with the smallest slope. These number are selected in a table No. selection processing of step S94 shown in FIG. 13.

This selection processing will be concretely explained. First, the value subtracted 1 from the correction ratio Pn (or Ps) is that which represents increase or decrease in the output signal to the input signal by using plus sign (+) and minus sign (−) and its magnitude. The value multiplied the above value by 100 represents a direction and a distance from the center of the table which is set every 1%. The final table number of the orifice is selected by adding the central table number, 32 to this value. As described above, after the 128 table numbers corresponding to the 128 orifices are obtained in the identically sizing recording, and similarly, after the 96 table numbers are obtained in the reduction recording, the correction operation in step S53 of FIG. 9 is completed, and then, the processing transfers to the next step S54, or memorization step.

A memory for the correction table number is renewed every correction. However, when the recording with different magnification is made, like the present embodiments, the table number data is stored in different areas according to the magnification without erasing the memory. That is, there is provided memories corresponding to the number of the reduction magnification, and the table data is read out of the storage memory which is corresponding to the recording magnification.

Figure 15:
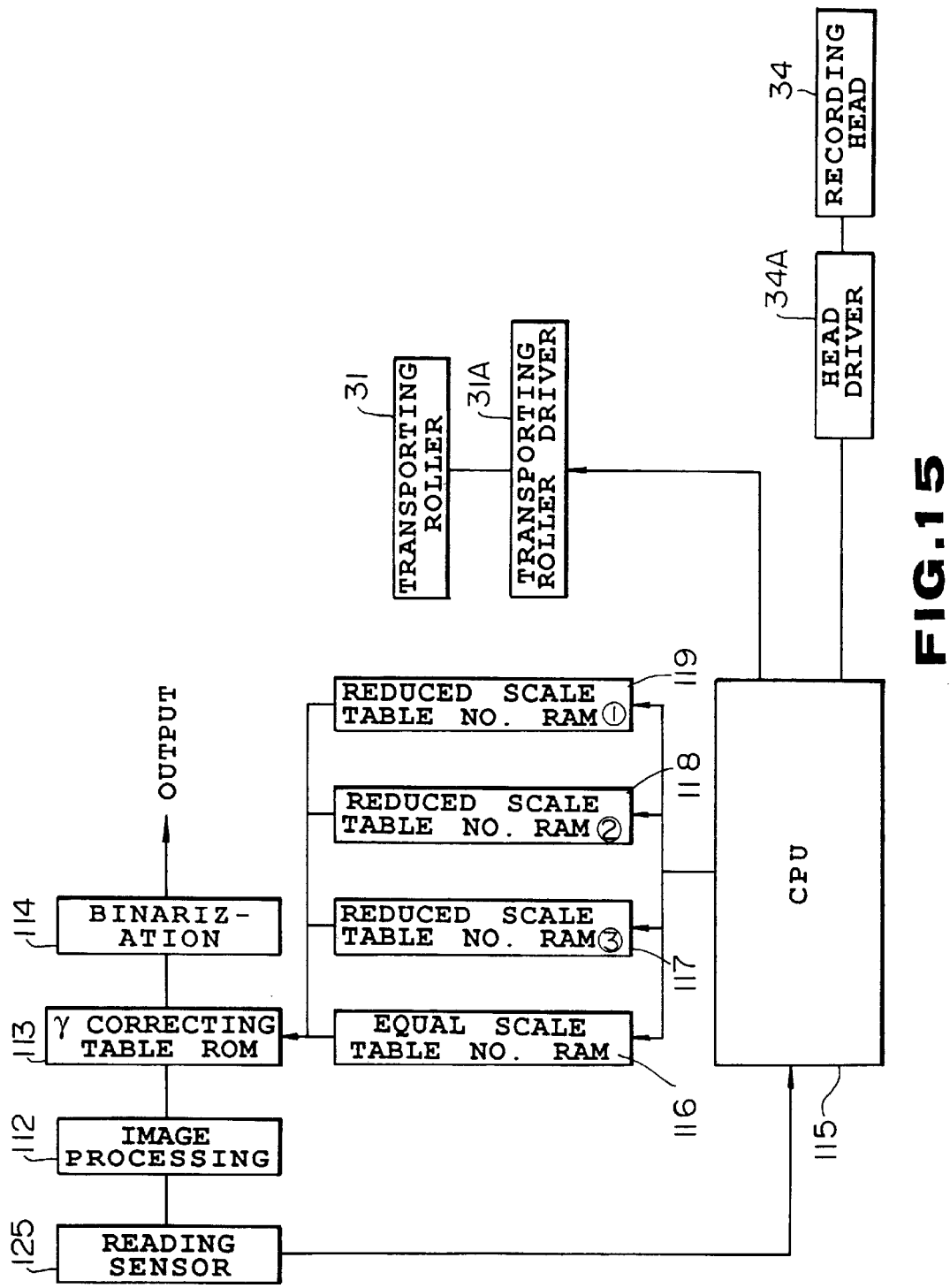
FIG. 15 is a block diagram showing the construction of the shading correcting processing according to embodiment 1 of the present invention.

FIG. 15 shows the control construction for the shading correction processing and a series of recording of the test pattern as explained above.

Figure 14:
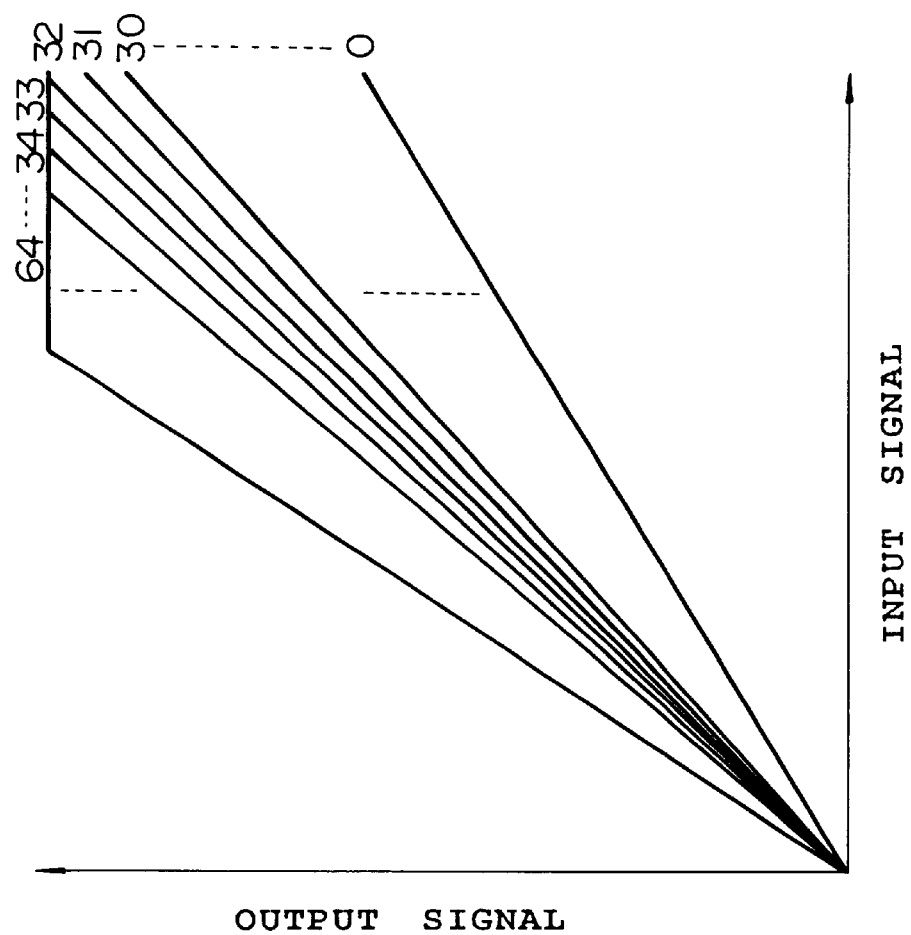
FIG. 14 is a graph illustrating a correction table according to embodiment 1 of the present invention.

In FIG. 15, a reference numeral 125 designates a recording sensor, 121 image processing circuit for performing a series of image processing when a copy machine is effectively used for masking, edge enhancement and so on, 113 a read only memory (ROM) in which the 64 correction tables shown in FIG. 14 are written, 114 a binarizing circuit for performing binarizing processing when the recording is made, 115 a central processing unit (CPU) for carrying out the processing of the whole copy machine, such as the correction operation in the shading correction mode, reference numerals 116 through 119 each designates a random access memory (RAM) in which the table number data is written corresponding to each magnification. There are provided only three reduction correction table in this embodiment, however, any reduction magnification may be performed by combination of the orifices less than 128.

When the test pattern of a reduction recording is recorded, the driving data of the orifices n 1 through n 96 in the recording head 34 are switched "on" and the orifices n 97 through n 128 switched off. In addition, the rotation of a transporting roller 31 is controlled by the CPU 115 through a transporting roller driving part 31A, thereby the recording paper is transported by a distance that corresponds to the length of the orifice array from n 1 to n 96. It is therefore possible to record the test pattern of the reduction recording.

In the shading correction processing, the density data of the test pattern obtained by the reading sensor 125 is sent to the CPU 115. After step S53 of FIG. 9 is performed, the data are written into the RAM of its magnification mode. At this time, the original data written in the RAM are renewed.

When usually used as the copy machine, the manuscript data which is read by the reading sensor is transformed into a signal by using the correction tables of the ROM 113 corresponding to the orifices respectively when recording duty of each orifice is obtained through a series of the image processing. At this time, the table number is specified by the RAM in which the table number of each orifice is written in accordance with the reduction magnification. As described above, excellent images without the shading can be always recorded in the various magnification, by providing the density shading correction mode to every reduction magnification and storing those correction data in different areas to one another.

The above embodiment 1 was explained about the ink jet type apparatus with the recording head, but the present invention is not limited to such an application and may be applied to other apparatus such as the thermal type apparatus with the recording head.

Embodiment 2

Figure 16:
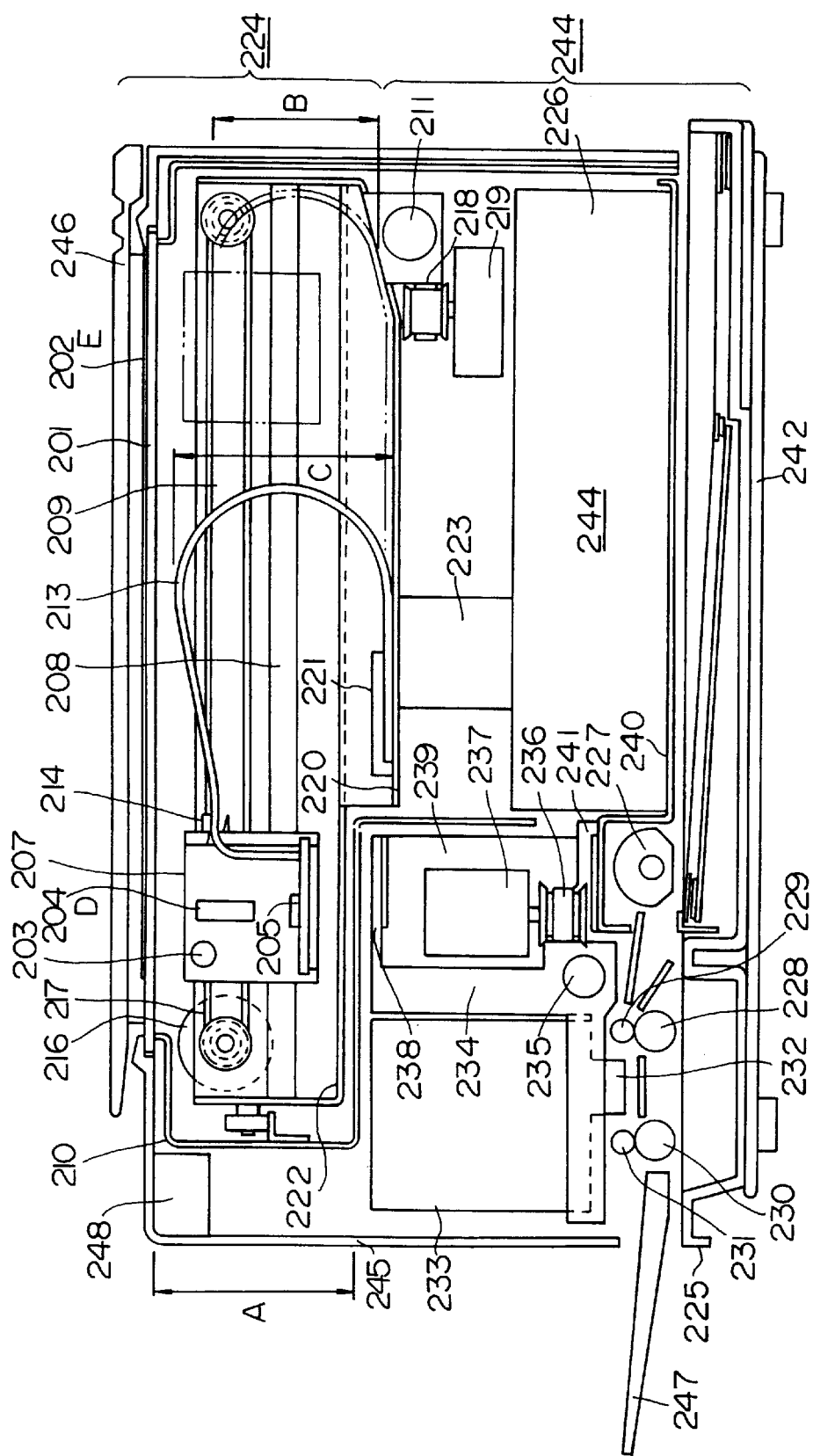
FIG. 16 is a sectional view of the copy machine according to embodiment 2 of the present invention.

FIG. 16 is a sectional side view of the color copy machine using the ink jet recording apparatus according to embodiment 2 of the present invention.

This color copy machine is mainly provided with an image reading and image processing part (hereinafter, both parts are referred to as a reader part 224) and printer part 244. The reader part 224 scans and reads the manuscript 202 put on a manuscript glass 201 by using a CCD line sensor 205 including three color filters, or R (red), G (green) and B (blue). The read data performed a predetermined processing by the image processing circuit is set as the recording data to be used in the printer part 244. In the printer part 244, the image is recorded on the recording paper by using four recording heads respectively corresponding to the four ink colors, a cyan (C), a magenta (M), a yellow (Y) and a black (B) on the basis of the recording data.

Hereinafter, the operation of the copy machine will be described in detail.

The reader portion 224 is composed of member or elements 201 through 223, and the printer part 244 members or elements 225 through 243. In this construction, the left and upper side of FIG. 16 corresponds to the front of the machine.

The printer part 244 is provided with four ink jet recording heads 232 which eject ink and make recording, in each of which 128 ink orifices are arranged in a vertical direction (or in a sub-scanning direction and in the right and the left directions of FIG. 16) at a pitch of 63.5 µm. Whereby, the recording with 8.128 mm width can be made by one main scanning. When recorded on the recording paper, repeated is the operation including the steps of; stopping transporting (paper transportation) the recording paper, carrying out the main scanning of the recording head, making the recording with 8.128 mm width, transporting the recording paper by 8.128 mm long, and making the recording with 8.128 mm width.

In the construction of the present embodiment, the main scanning direction of the recording head corresponds to the direction perpendicular to the surface of FIG. 16, and the sub-scanning direction its right and its left directions.

Also in the reader part 224, the reading of the manuscript 202 with 8.128 mm width is repeated in correspondence with the printer part 244. The moving direction for read-out of the reading head is called as the main scanning direction, the direction in which the reading head moves to the next reading line is called as the sub-scanning direction. In this embodiment, the main scanning direction is the right and the left direction of FIG. 16, the sub-scanning direction is the direction perpendicular to the surface of FIG. 16.

The operation of the reader part 224 will be explained below.

The manuscript on the glass of the manuscript stand is read out in order by the main scanning and sub-scanning of the reading head. That is, the reading head comprising of lens arrays 204 and light receiving elements 205 is provided on a main scanning carriage 7. The manuscript 202 is emitted by a lamp 203, the light reflected from the manuscript 202 is incident to the light receiving element 205 (CCD) through the lens arrays 204. The main carriage 207 engages to the main scanning rail 208 mounted on a sub-scanning unit 209 and is slidable to the rail 208. Further, the main scanning carriage 207 is connected to a main scanning belt 217 by an engagement member (not shown), and can move in the right and the left direction on the surface of FIG. 16 by the rotation of the main scanning motor. As the main scanning carriage moves, the lamp 203 emits the light to the manuscript and the main scanning for read-out is carried out.

The sub-scanning unit 209 engages to a sub-scanning rail 211 fixed to an optical frame and is slidable to the rail 211. Further the sub-scanning unit 209 is connected to a sub-scanning belt 218, therefore, the sub-scanning operation can be performed by the rotation of a sub-scanning motor 219.

The read-out data of an electric signal into which the light received by the CCD 205 is sent through a loop-like signal cable 213 to the printer part 244. That is, one of the end portions of the signal cable 213 is held in its neighborhood by a holding portion 214, and the other is fixed to a bottom surface 220 of the sub-scanning unit 209 by a member 221 and is bonded to a sub-scanning signal cable 223 connected to an electric control unit 226 of the printer part 244. The signal cable 213 follows the movement of the main carriage 209, and the sub-scanning signal cable 223 follows the movement of the sub-scanning unit 209.

The operation of the printer part 244 will be explained below.

The recording papers are transported from a recording paper cassette 225 one by one through a feeding paper roller 227 driven by a power source (not shown). On the paper, image is recorded by the main scanning of four recording heads 232 corresponding to four kinds of ink. The four heads 232 are arranged in the main scanning direction. Therefore, only one of the heads is shown in FIG. 16. Each recording head is integrated with an ink reservoir 233 and is mounted releasably on a carriage 234. These recording heads 232 are provided with the electro-thermal converting elements in the ink path connected to each of the orifices, and bubbles are produced in the ink by the thermal energy generated by the electro-thermal converting element. The ink is ejected substantially at the same time the bubbles are produced. The carriage 234 is engaged slidably to a main scanning rail 235 of the printer. The carriage 234 is connected to a main scanning belt 236 by an engagement member (not shown), thereby the main scanning can be carried out through the rotation of a main scanning motor 237.

The carriage 234 is provided with an arm portion 238 to which one end of a printer signal cable 239 for sending signals such as a driving signal to the recording head 232 is connected. The other end of the printer signal cable 239 is fixed to a mid-board 240 of the printer by a member 241, and is connected to the electric component unit 226. The line of the printer signal cable 239 follows the movement of the carriage 234, but it is arranged not so as to contact with the upper optical frame 210.

The sub-scanning of the printer part 244 is performed by rotating one pair of rollers 228 and 229 and the other pair of rollers 230 and 231 by a power source (not shown), and transporting the paper by 128 mm long. A reference numeral 242 designates a bottom board 245 of the printer part 244, 245 an outside board, 246 a manuscript press board, 247 a paper discharging tray, and 248 an electric component of an operational portion.

The fundamental factor of the production of the shading will be explained again.

Figure 17A:
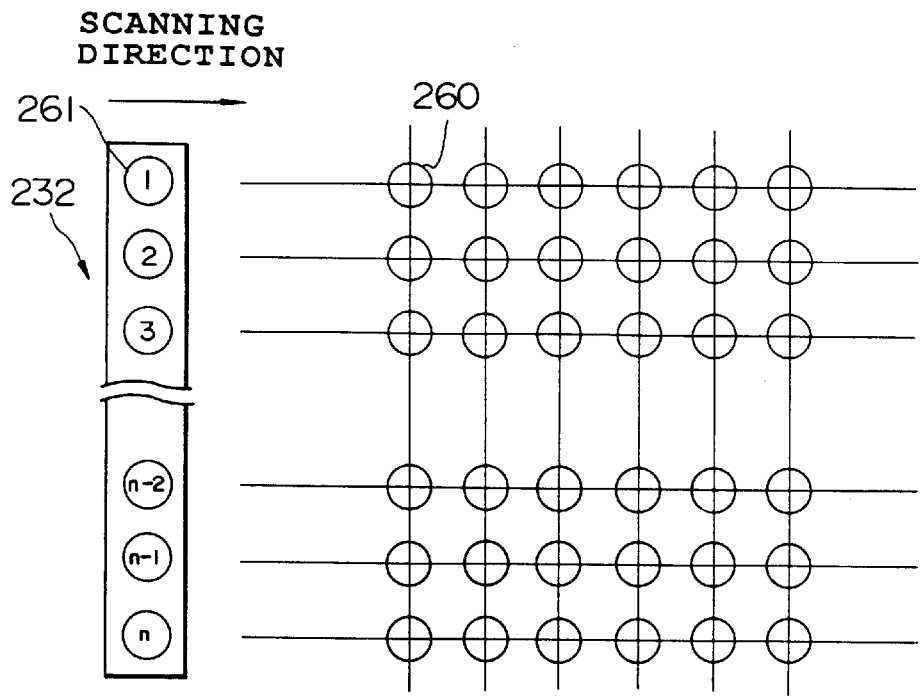
FIGS. 17A and 17B are diagrammatic views illustrating the shading in a recorded image.

FIG. 17A is a schematic enlargement diagram of the state recorded by an ideal recording head 232. A reference numeral 261 designates orifices for ejecting the ink. When recording is performed by using the recording head 232, ink dots 260 with identical diameter is formed on the recording paper. In such a case, the shading is not produced. Such the case that from all the orifices ink is ejected was described hereinbefore. However, it should be understood that the shading may not be produced also in a half-tone recording such as the recording at using 50% of orifices.

Figure 17B:
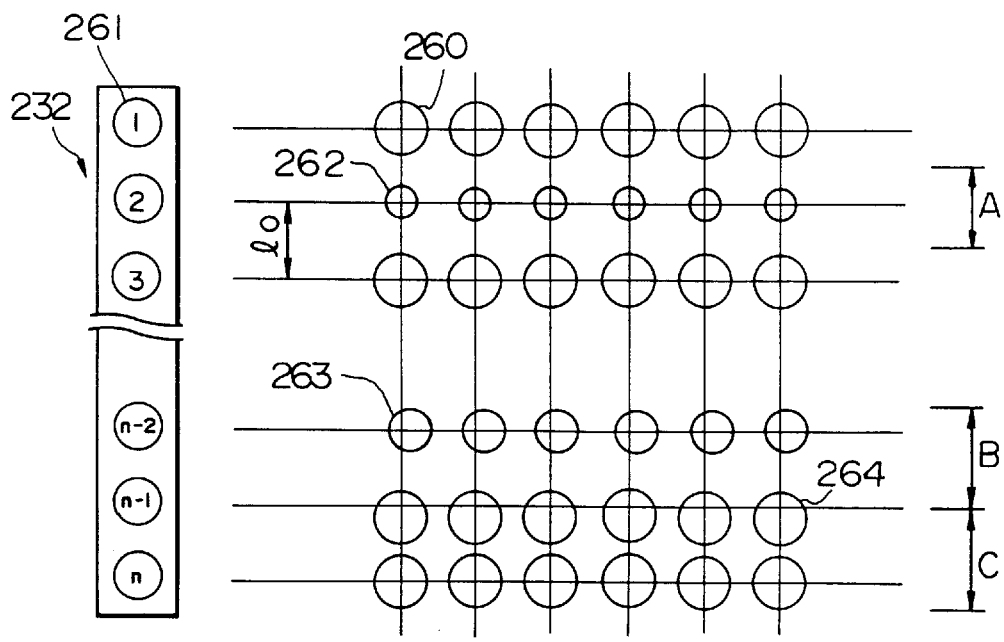

On the other hand, in the case of FIG. 17B, the diameters of dots 262 and 263 formed by the second and the (n−2)th orifices are less than the average diameter, and dots formed by the (n−2)th and (n−1)th orifices are out of the center. That is, the (n−2)th dot 263 is formed in the right and the upper direction of the center, and the (n−1)th dot 264 is formed in the left and the lower direction.

As a result of these recording, an A area shown in FIG. 17B appears as a light band, and a B area also appears as a substantial band lighter than other areas, because the distance between the center of the (n−1)th dot and that of the (n−2)th dot become longer than the average distance lo between the dots. On the other hand, the distance between the center of the (n−1)th dot and that of the n-th dot is shorter than the average distance lo, therefore, the C area appears as the band darker than other areas.

As described above, the shading is produced mainly due to the variation of the dot diameters and that of the difference from its central position.

The shading correction processing of the printer described above will be explained below.

As described hereinbefore, the shading is produced mainly due to two kinds of causes, (1) the variation of the shape of the orifices or the ink path, and/or the variation of the thermal characteristic of the electro-thermal converting elements, which are produced in the course of the manufacturing process, and (2) the variation of the characteristic of ejection which is produced by performing a recording operation, in other words, the variation of the characteristic of ejection which is produced as time passes. The variation of the characteristic of ejection which is produced in the course of the manufacturing process, can be corrected by a shipping inspection. However, it is difficult to take a countermeasure against the variation due to time-passing. It is considered that the variation due to the time-passing is caused by the variation of deterioration of the orifices, the change in a water head pressure, the invasion of foreign substances into the orifice, etc. However, the true cause is not known yet in detail.

As to such the shading produced mainly due to the time-passing, the apparatus itself detects the shading and resets a new correction curve, as described above.

Figure 18:
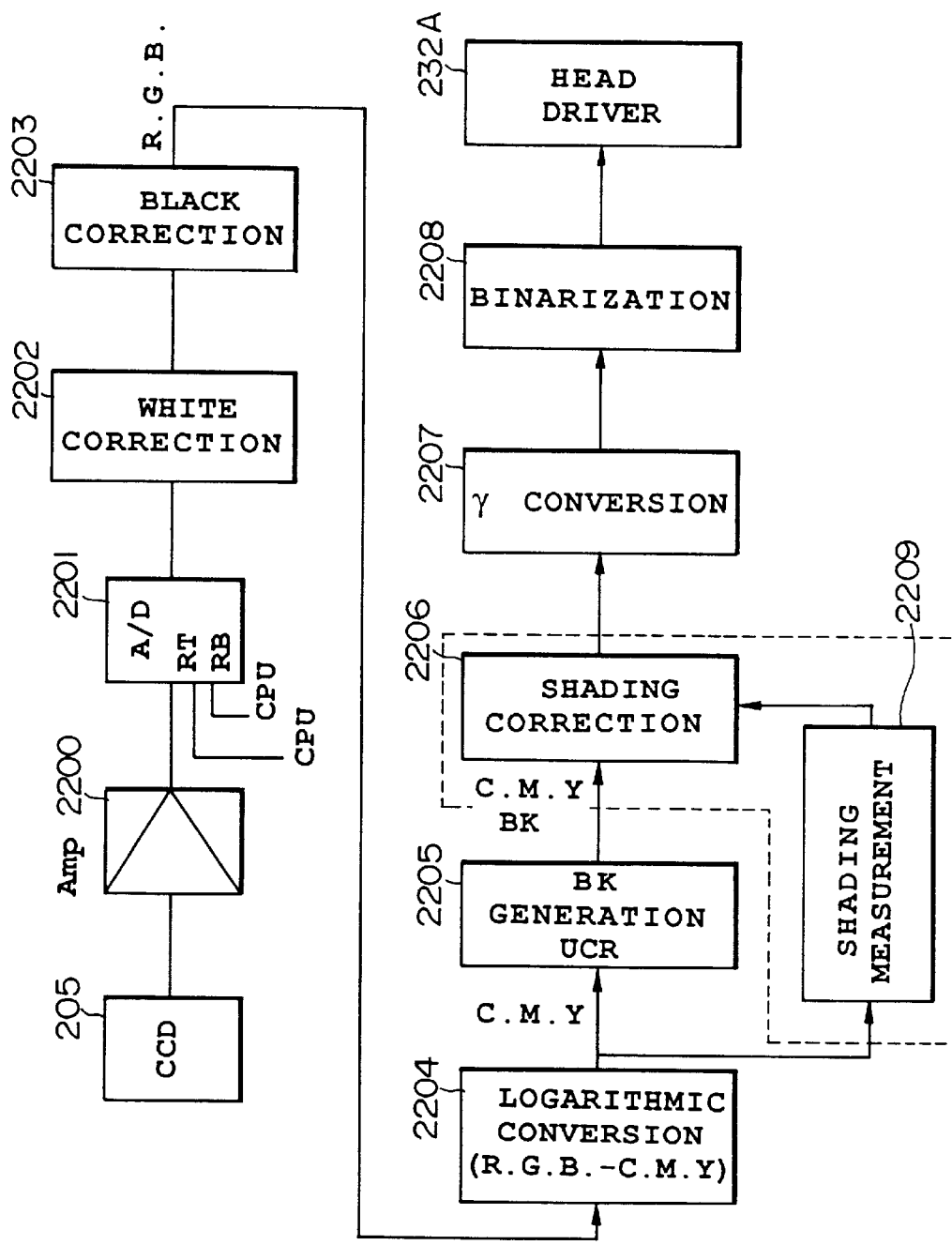
FIG. 18 is a block diagram of an image processing circuit according to embodiment 2 of the present invention.

FIG. 18 is a block diagram showing the process of the image processing in which the shading correction processing according to the present embodiment is performed.

Figure 19:
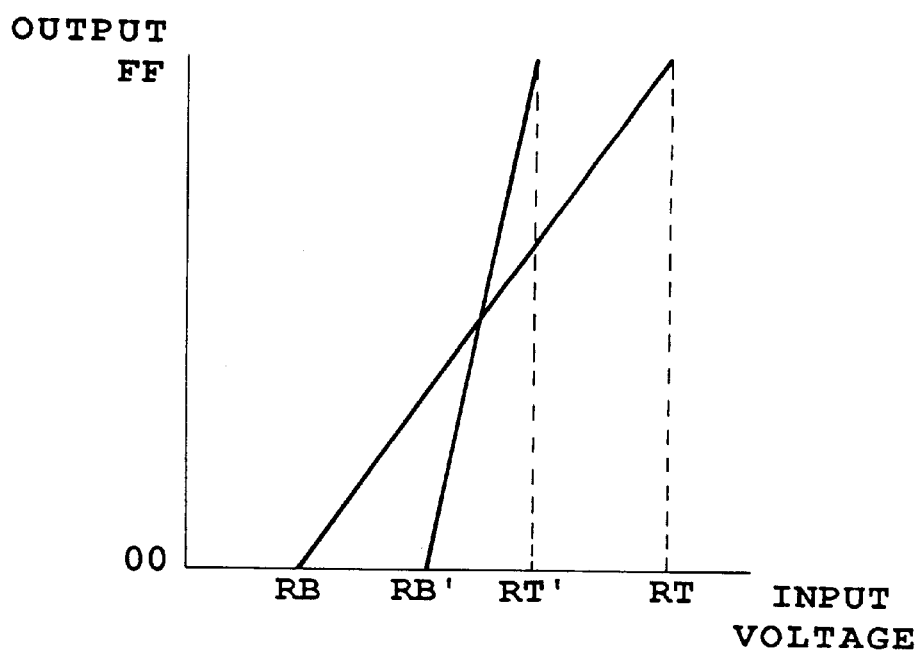
FIG. 19 is a graph illustrating change in an output corresponding to that in a reference voltage in an A/D converter shown in FIG. 18.

In FIG. 18, the reading data read out by the CCD 205 is amplified by an amplifier 2200, and transformed into 8-bit digital image signal by an A/D converter 2201. A reference voltages RT and RB of the A/D converter 2201 can be set by using a microcomputer (not shown). For example, as shown in FIG. 19, it is possible to extend the transform of a very small value of an input voltage into 8-bit value by changing the reference voltages RT and RB to RT' and RB', respectively.

The image signal converted by the A/D converter is corrected against a white signal by a white correction circuit 2202, and is corrected against a black signal by a black correction circuit 2203.

The corrected signal is transformed from the three primary colors of light, R(red), G(green) and B(blue) into that of recording colors C(cyan), M(magenta) and Y(yellow) by a LOG conversion circuit 2204. The Bk (black) portion of the C, M and Y signals is extracted as the common component, or a portion of the common component of those signals is extracted as a portion of black component. The extracted signal is input to a head shading circuit 2206 as C, M, Y and Bk signals.

In the head shading circuit 2206, γ-correction (shading correction) is made to the image signal corresponding to each orifice according to the ejection characteristic of each orifice of each of the four recording heads. The head shading circuit 2206 is comprised of a SRAM and an EPROM as described below. On the basis of the orifice corresponding to the data which is input to the SRAM, the table number to be stored in the SRAM is referred. Next, the data is corrected by using a γ-correction curve which stored in the EPROM and corresponds to the table number. A γ-conversion circuit 2207 has a plurality of function to calculate output data to the input data of the conversion circuit, and set the function suitable to the color tone which users like and to density balance of each recording color. Further, the function is set according to the characteristic of the recording paper and that of the ink to be used, too.

The output of the γ-conversion circuit 2207 is sent to a binarization circuit 2208. In the present embodiment, a mean density reservation method (MD method) is used for the binarizing processing. The output of the binarizing circuit 2208 is sent the recording head driving circuit 232A of the printer part 244, and the recording is made by the recording head 232 on the basis of the output data.

Figure 20:
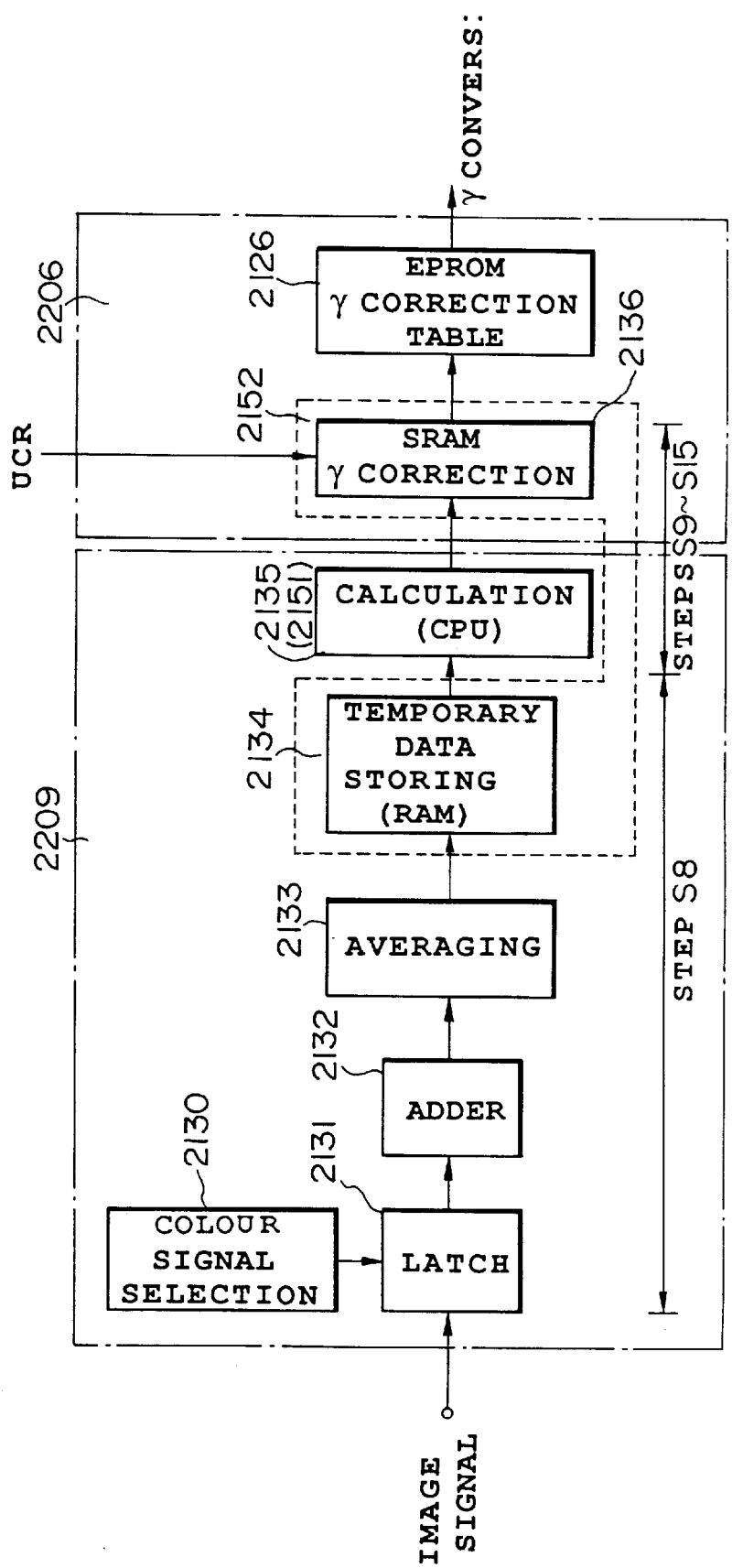
FIG. 20 is a block diagram showing in detail a head shading circuit and a shading measuring circuit both shown in FIG. 18.
Figure 21:
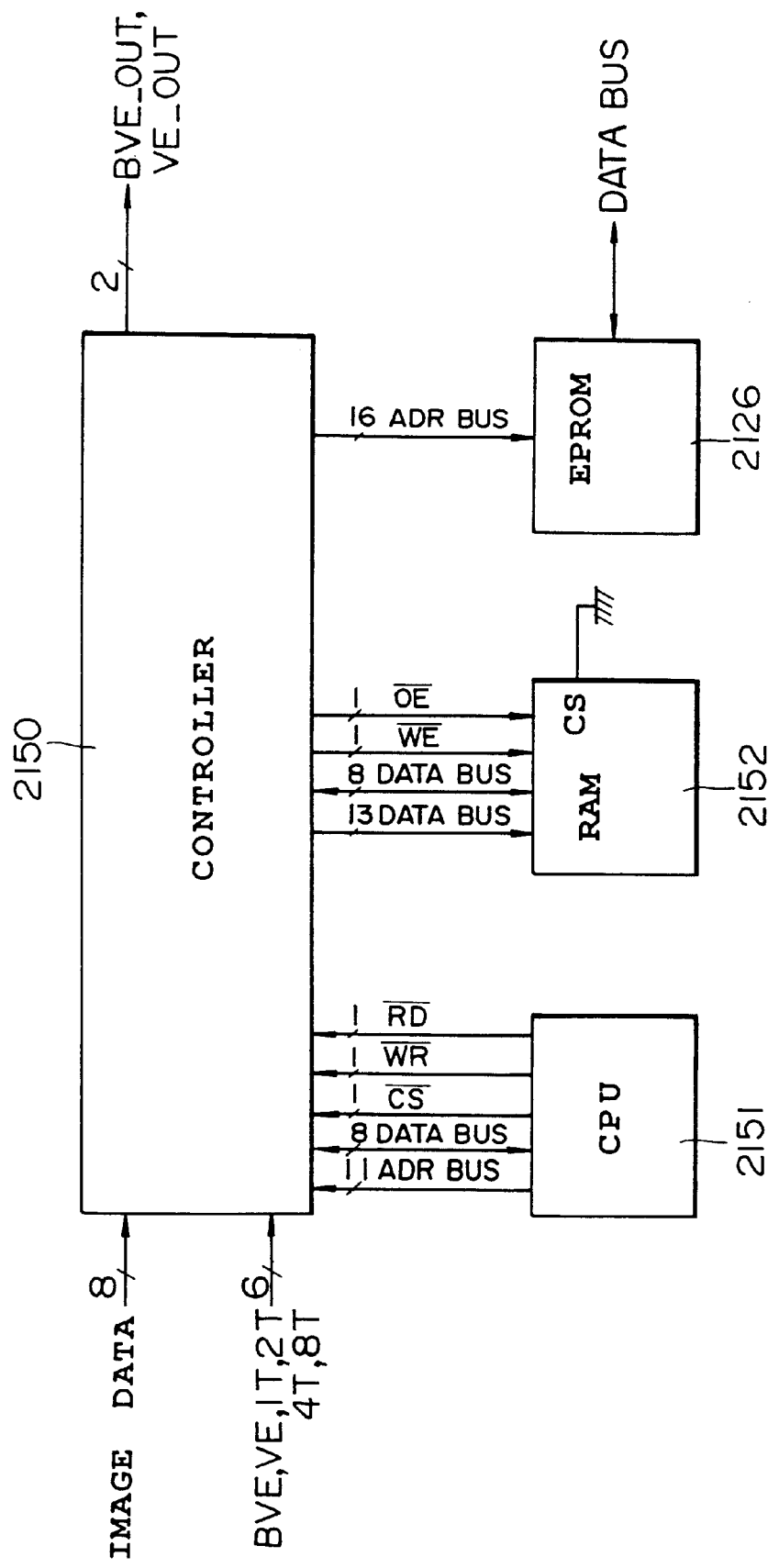
FIG. 21 is a block diagram of a circuit realizing the construction shown in FIG. 20.
Figure 22:
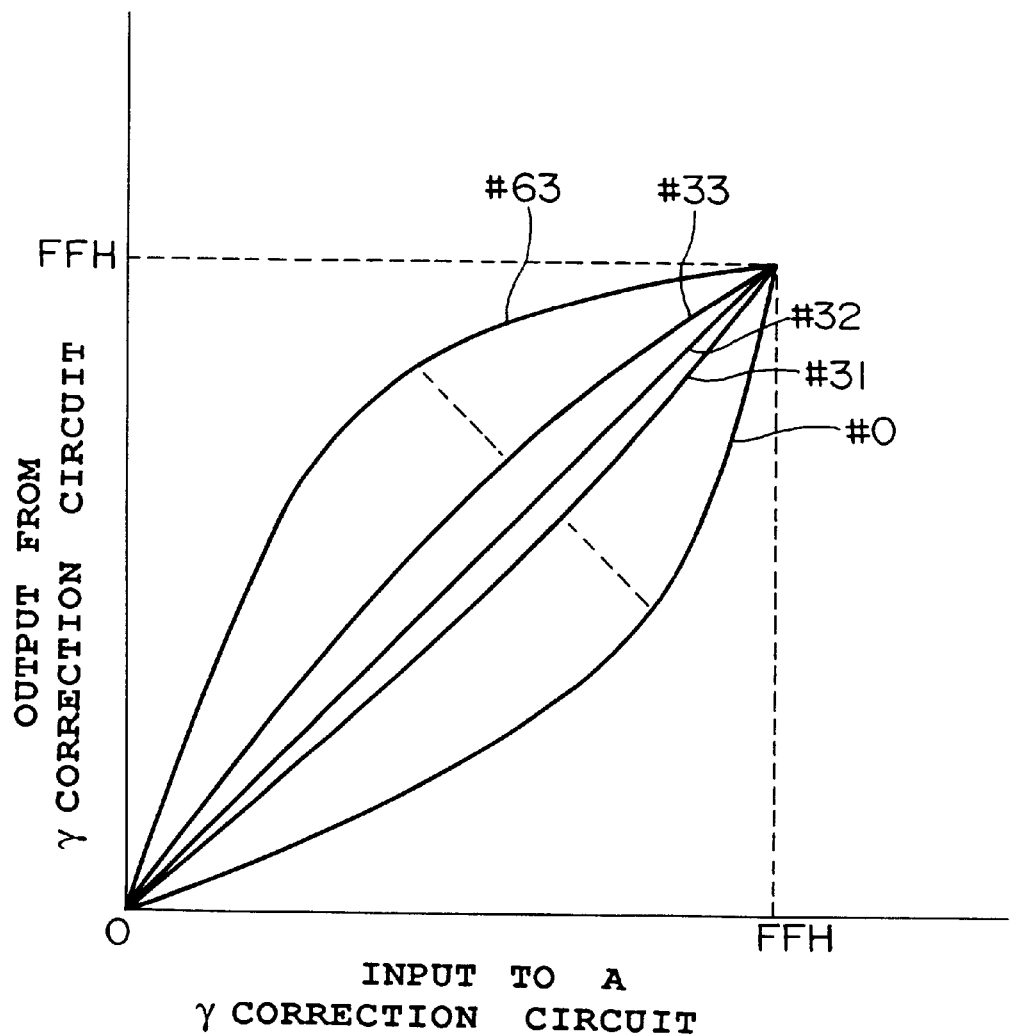
FIG. 22 is a graph illustrating a content of a γ-correction table shown in FIG. 20.

Referring again to FIG. 18, a reference numeral 2209 designates a density shading measuring circuit in which the gray level data (density data) of each orifice is calculated on the basis of the data from the LOG conversion circuit 2204. FIG. 20 shows in detail the head shading circuit 2206 and the shading measuring circuit 2209, and FIG. 21 shows an example of the concrete circuit realizing the blocks shown in FIG. 20. That is, a RAM 2152 shown in FIG. 21 owns jointly a temporary hold memory 2134 and γ-correction memory 2136 both shown in FIG. 20. The 64 kinds of γ-correction curve shown in FIG. 22 are stored in an EPROM 2126. An operational circuit 2135 shown in FIG. 20 is comprising of a CPU 2151 shown in FIG. 21.

Figure 23:
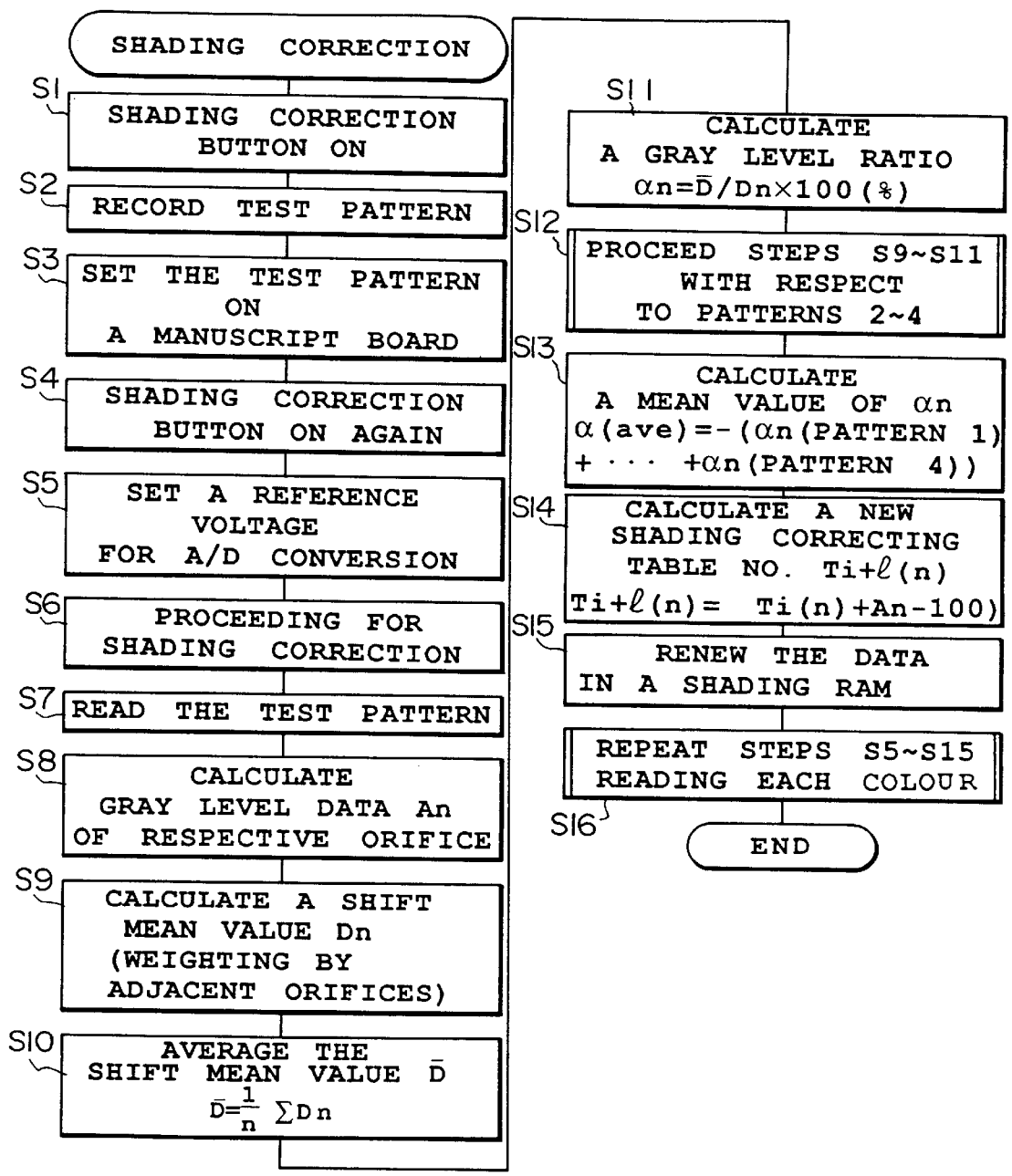
FIG. 23 is a flow chart illustrating shading correcting procedure according to embodiment 2 of the present invention.

FIG. 23 is a flow chart of the shading correction processing according to the present embodiment.

For example, when the user finds the production of the shading on the recorded picture image, the user pushes down the button for the shading correction provided in the operation portion (not shown) (step S1). In response to the action, the printer part 244 outputs the pattern shown in FIG. 24 for the shading measurement as a printed matter (step S2).

Figure 24:
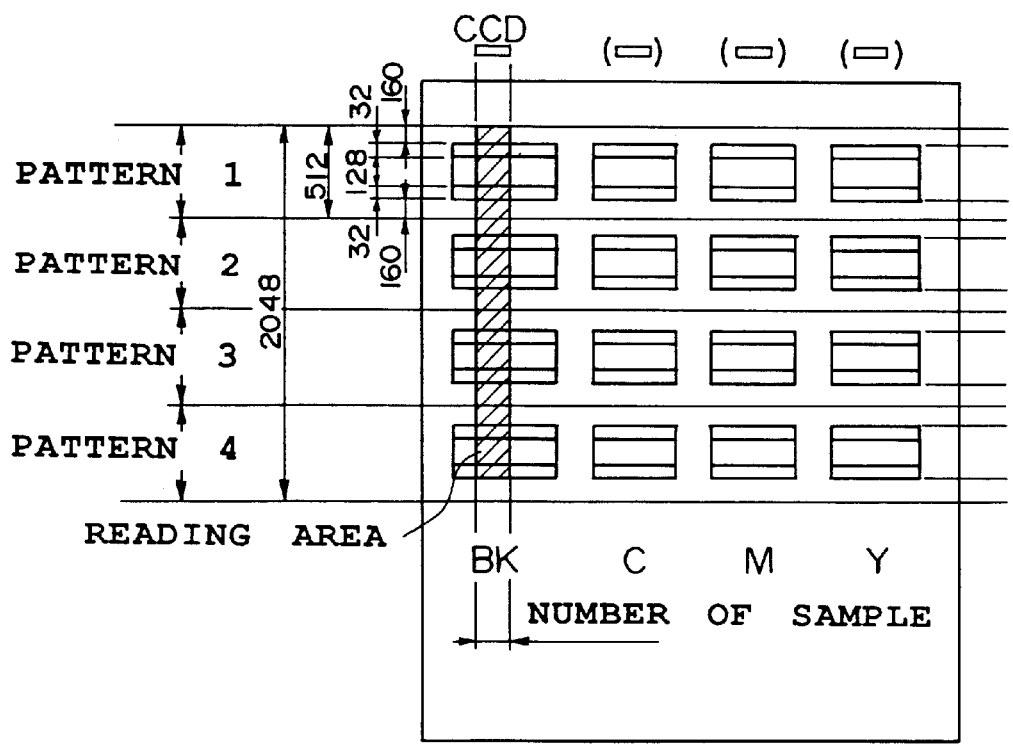
FIG. 24 is a diagrammatic view showing the test pattern according to embodiment 2 of the present invention.

Next, the user puts this recorded sample of the test pattern on the manuscript stand with the main scanning direction of the CCD 205 being perpendicular to the moving direction of the recording head with respect to the recorded sample as shown in FIG. 24 (step S3). And then the user pushes down again the correction button (step S4).

In response to this operation, the CPU sets the reference voltage of the A/D converter corresponding to its reading color (step S5). That is, if the A/D conversion is carried out at the reference voltage of the A/D converter 2201 in the ordinary read-out, namely at a constant reference voltage, the gray level of the read data is different depending on the recorded color even if the patterns recorded with the same density is read out, as shown in FIG. 25. If the extent of the shading (the width of the gray level change) of each recorded color equals to one another, with respect to, for example, yellow, the extent of the shading is read out in the state of shading smaller than that of other colors, because the level of the density of the read data is relatively low. Therefore, in such a construction that the correction is made by using the same algorithm for the shading as the different color, the extent of the correction of yellow becomes smaller. As a result, the shading is not eliminated, therefore, the shading of yellow becomes remarkable in the image to be recorded having combination color of yellow and other colors.

Figure 25B:
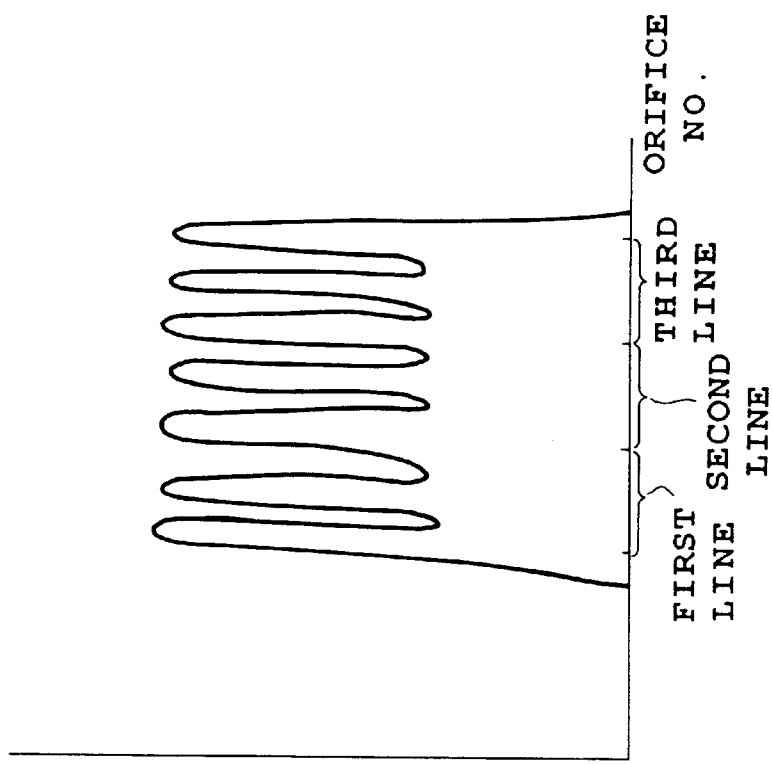
FIGS. 25A and 25B are graphs illustrating equalizing of a gray level of read data of each recorded color in accordance with embodiment 2 of the present invention.

According to the present embodiment, the read image in which the extent of the shading is equal to any recorded colors is obtained by changing the reference voltage of the A/D converter 2201 in accordance with the recorded color (see FIG. 25B). As the result, it is possible to use the identical algorithm to each of the recorded colors, and simplify the construction for the shading correction processing.

After setting the above reference voltage, the correction of the shading of the CCD 205 is made as follows; (1) reading out by the CCD in the state of light-off, (2) setting the value of the black correction such that the value of each pixel may be equal to the black level, (3) carrying out the main scanning, after setting white board in the state of light-on, and (4) read out the black test pattern by scanning of the CCD 205 (step S7). Next, in similar manner, the above process is performed in order with respect to cyan, magenta, and yellow.

The read result is stored in a SRAM 2136 (step S8) after it was processed in each of the circuits 2200 through 2204 and in the shading measurement circuit 2209. That is, in step S8, the average of the number of the sampling of the read data corresponding to each orifice is obtained by using the circuits 2131 through 2135 shown in FIG. 20.

Next, a shift mean value Dn of three pixels is calculated every orifice (step S9), which includes one pixel before and behind the read pixel corresponding to each element of the CCD 205. It is appreciated that the average of the total 9 pixels may be used as the shift mean value of this case, and the weighted pixels may be used. After the calculation of the shift mean values, the average value of all of the shift mean value Dn obtained in step S9 is calculated (step S10). The ratio αn (%) of the value obtained in step S10 to the average value obtained in step S9 is calculated, where n is an orifice number between 1 and 128. The above processing from step S9 to step S11 is performed on the test patterns 1 through 4 shown in FIG. 24 (step S12).

Next, the average value αn(ave) of the value αn in each pattern is obtained (step S13), and a new correction table number Ti+1 is obtained from the αn(ave) and a present correction table number Ti as follows (step S14), $$Ti+1(n)=Ti(n)+(\alpha n(ave)-100) \quad (1)$$

The newly obtained table number Ti+1(n) is written in a SRAM 2136 (step S15).

The above processing from step S5 to step S15 is performed to each color (step S16).

When the test pattern is read out, the output of the filter of green, red, green and blue are sampled to the patterns of black, cyan, magenta and yellow, respectively, where the former colors are the complementary colors of the latter, respectively. It is possible to use another color except green, instead of black.

As it is clear from the above description, in the present embodiment, the table data of the SRAM 2136 is renewed by the above processing to prevent the production of the shading due to the time-passing.

At this time, in order that the renewed data is stored even at power-off, the shading data is transferred to a RAM backed up by a battery (not shown) in the printer control portion.

In the above embodiment, the reference voltage of the A/D converter is set according to the ink color by using the CPU before reading out the test pattern. However, it may be possible that pattern is read at a normal reference voltage, the variation of the read data and the density at the time is detected, and the test pattern is read out again after setting the reference voltage on the basis of the detected result.

Embodiment 2A

In the above embodiment 2, the gray (density) level of the read data becomes equal between recorded colors by setting the reference voltage of the A/D converter according to each of the recorded colors. Accordingly, the actual shading is reflected equally to the read data of each recorded color.

On the other hand, in the present embodiment, the density level of the read data becomes equal by making a black correction according to the recorded colors in the black correction circuit shown in FIG. 18.

Embodiment 2A of the present invention will be explained below.

FIGS. 26A, 26B and 26C are graphs illustrating the black correction according to the present embodiment.

When the CCDs 205 read out a jet-black manuscript, not all of light receiving elements outputs the "0" level due to the variation produced in the course of the manufacturing process of each element. It is necessary to sample the black value read (in this embodiment, sampling during light-off) and store it in a memory, in which the black value is obtained by reading a black shading correction board painted jet-black, or by reading the manuscript after lighting off an illumination lamp for it.

In the ordinary recording, the black correction is made by subtracting the stored black read-out value from the read-out data of the manuscript, and by multiplying the subtracted value by the correction value. That is, by subtracting the black data (solid line) shown in FIG. 26B which was previously sampled from the read-out data shown in FIG. 26A, data (solid line) shown in FIG. 26C are obtained.

If the black correction data with relatively high brightness as shown in dotted line of FIG. 26B is obtained by sampling the shading board which is not jet-black, it is possible to reduce the brightness of the input data (increase the density) as shown at the dotted line of FIG. 26C when it is made the black correction.

As described in the above embodiment 2, when the density level decreased like yellow, it is possible to equalize the density level of the read-out data of each recorded color by using the data with relatively high brightness as the stored data (sampling data) in the black correction of yellow (Y).

Figure 27:
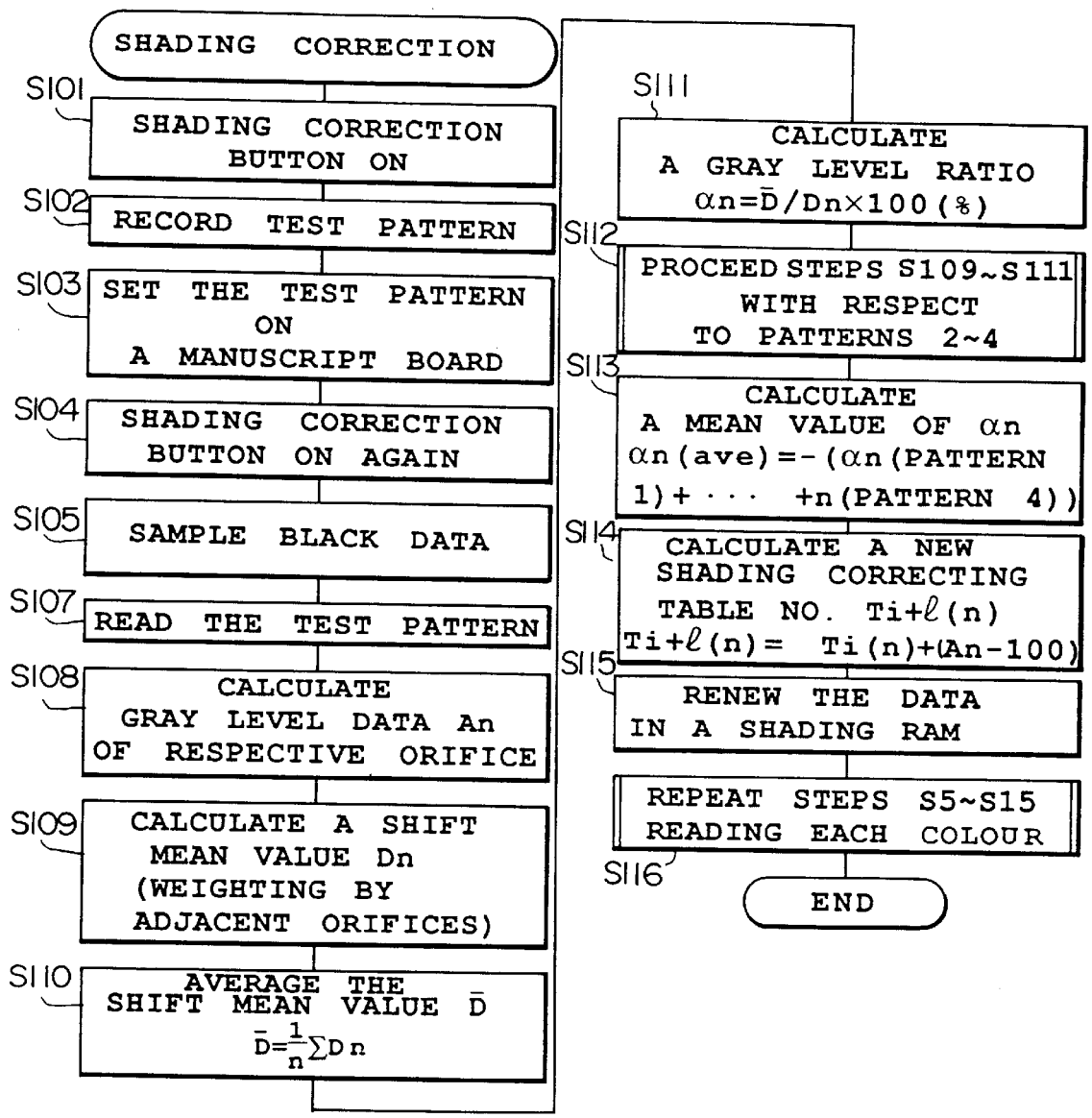
FIG. 27 is a flow chart illustrating shading correction procedure according to embodiment 2A of the present invention.

FIG. 27 is a flow chart of the shading correction processing according to the present embodiment. In this processing, only step S105 is different from the processing of embodiment 2 shown in FIG. 23. Therefore, only the processing of step S105 will be explained, and the description of the processing of other steps is omitted.

Figure 25A:
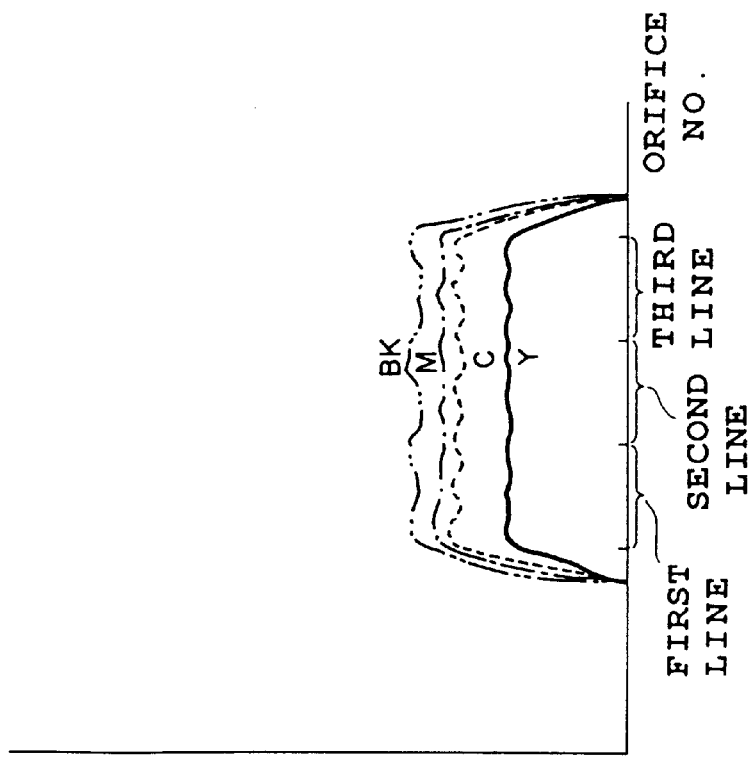

In step S105, the black data are sampled by reading out the black shading board corresponding to the recorded color to be read out at the time. That is, as usual, for example, when the data obtained by sampling after light-off is used in common as the black data of each recorded color, the density level of the read-out data is different according to the recorded color even if the pattern recorded by the ink with identical density is read out as shown in FIG. 25A, as explained in embodiment 2. For example, in the case of yellow (Y), the extent of the shading is rad out in the state of shading smaller than that of other colors, because the level of the density of the read-out data is relatively low. Therefore, in such a construction that the correction is made by using the same algorithm for the shading as the different color, the extent of the correction of yellow becomes smaller. As a result, the shading of yellow becomes remarkable in the image to be recorded having the combination color of yellow and other colors.

According to the present embodiment, the density level is increased according to each recorded color in the black correction processing, therefore, the actual shading is equally reflected to the density level after the block correction in each recorded color. Accordingly, the black shading board for sampling the black data is different according to the recorded color, thereby, the following shading correcting to other recorded colors can be made in a similar manner.

It should be understood that the actual board is not used as the black shading board for each recorded color of the present embodiment. In the present embodiment, the black correction colors for each color are painted out the side surface of the white shading correction portion in the operation area of the CCD which is outside of the manuscript glass, and the CCD samples after moving down to the portion where the necessary color is painted. The sampling method is well-known to a person skilled in the art, therefore, the detailed description will be omitted.

In the above embodiment, the copy machine provided with the manuscript read-out device has been explained as an example. However, it will be apparent that the present invention may be applied to a recording apparatus which records with a plurality of colors and can read out the recorded test pattern.

Further, the recording apparatus of the ink jet tape has been explained hereinabove. However, the present invention is applicable to a recording apparatus of the thermal transfer type. That is, it should be understood that the present invention is applicable to any apparatus which has a plurality of recording elements and records with a plurality of colors.

Embodiment 3

In this embodiment, the application of the present invention to the apparatus similar to the copy machine of embodiment 2 shown in FIG. 16 will be explained. Accordingly, like reference numerals identify similar elements of which the detailed description is omitted.

Figure 28:
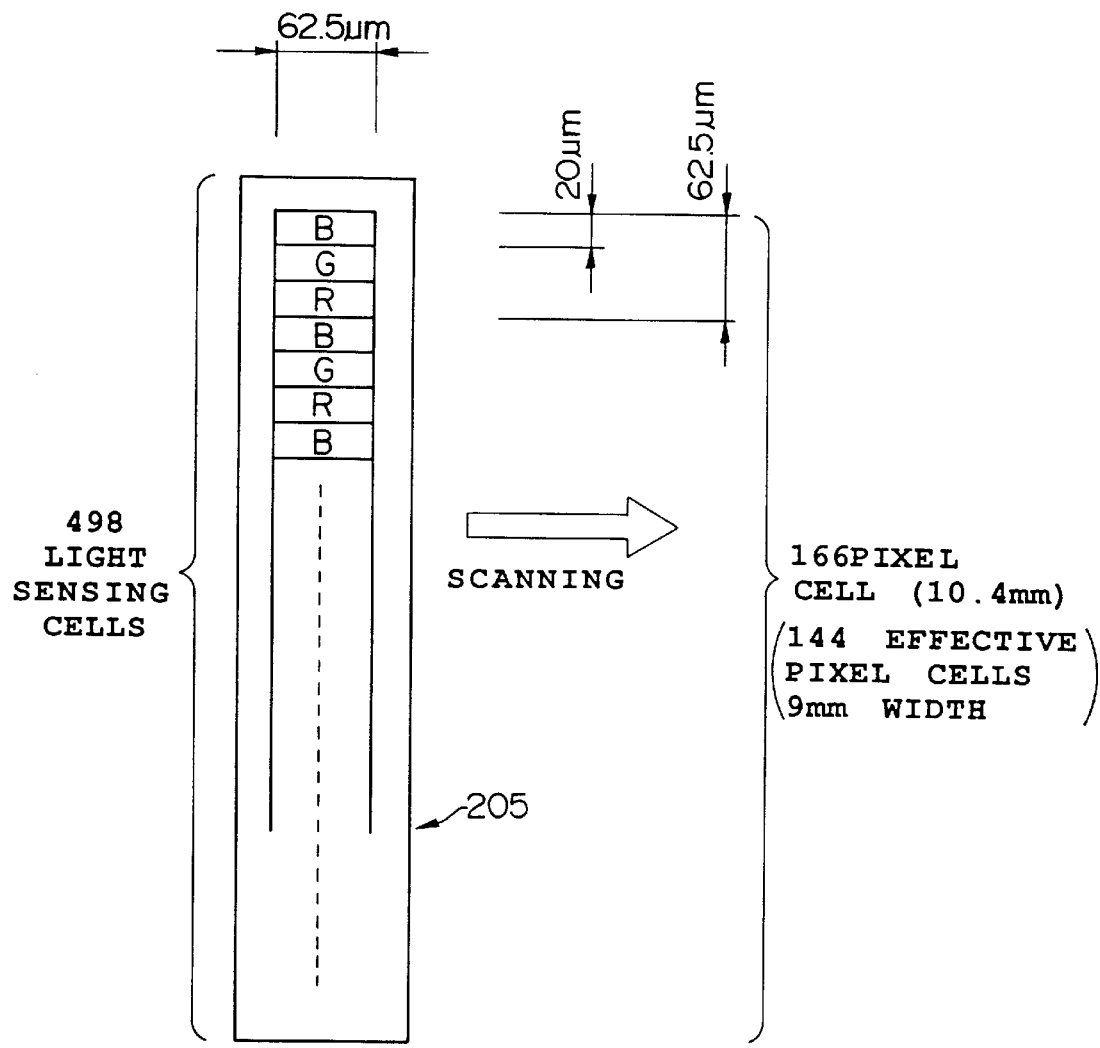
FIG. 28 is a diagram illustrating the construction of a CCD line sensor used in a color copy machine according to embodiment 3 of the present invention.

FIG. 28 is a diagrammatic view showing in detail a CCD line sensor 205 of the present embodiment. This line sensor is provided with a line of 498 light receiving cells. Three cells, R,G and B correspond to one pixel (hereinafter, referred these three cells to as one pixel cell). Therefore, 166 pixel are substantially read out by the 498 light receiving cells. The number of effective pixel cells is 144, and the pixel width of these 144 pixel cells is about 9 mm.

Figure 29:
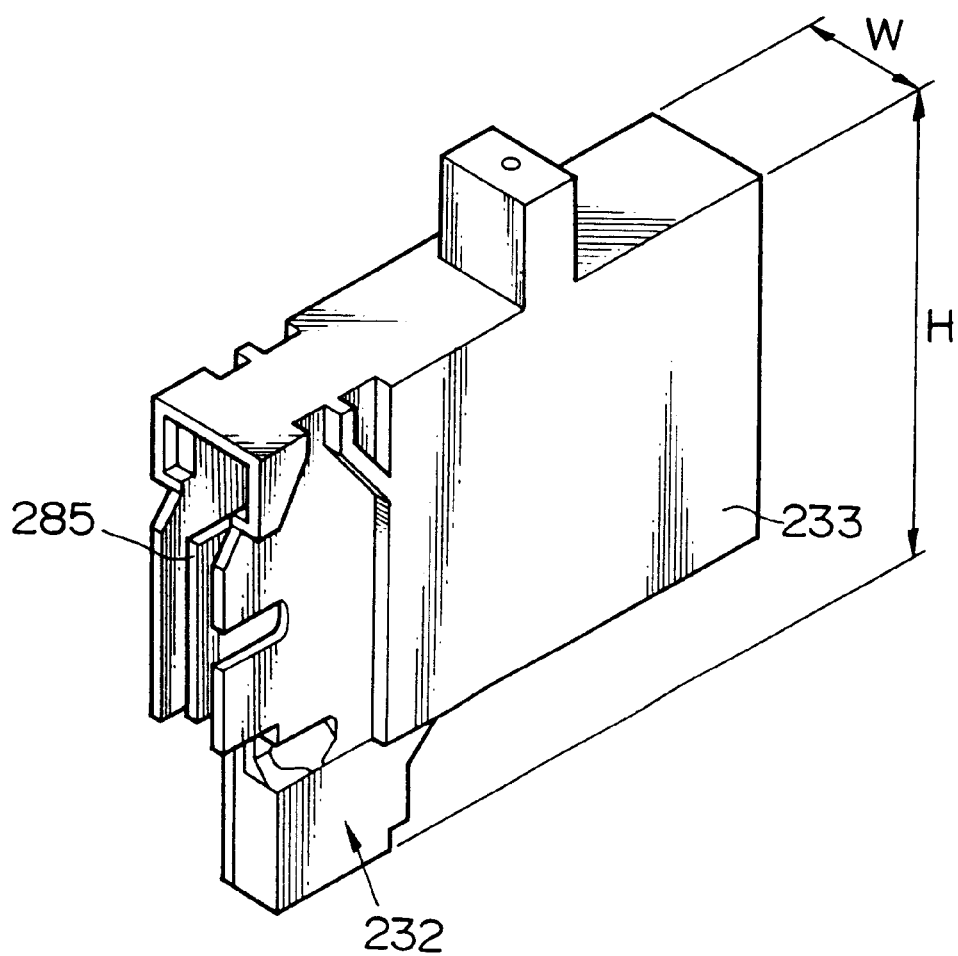
FIG. 29 is a perspective view showing the external appearance of an example of the ink jet recording head which is applicable to embodiment 3 of the present invention.

FIG. 29 is a perspective view showing the external appearance of an ink jet cartridge in the printer part 244 of the color copy machine of the present embodiment. And, FIG. 30 shows the details of a print board 285 of FIG. 29.

Figure 30:
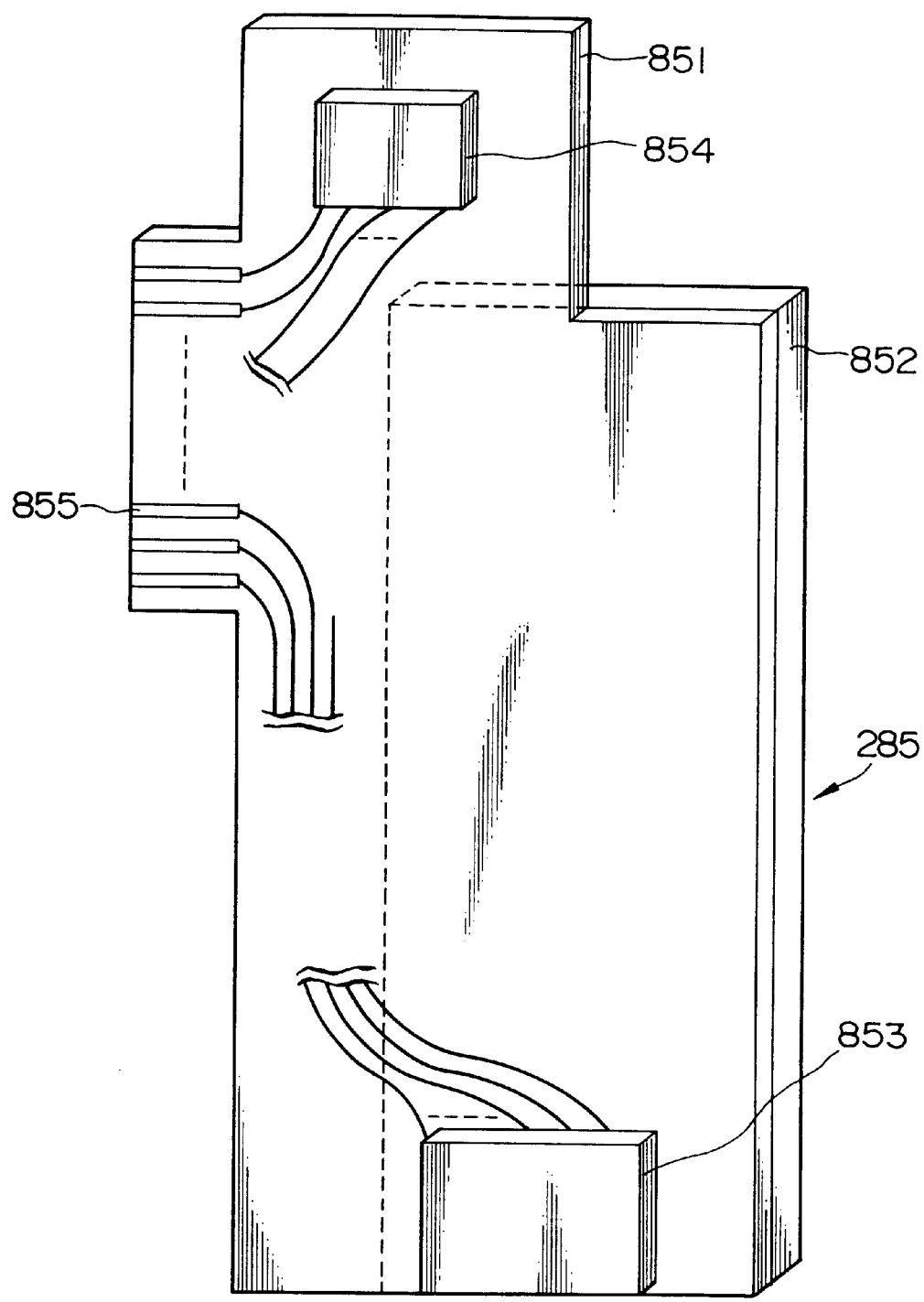
FIG. 30 is a perspective view showing an example of a substrate of the recording head shown in FIG. 21.

Referring to FIG. 30, a reference numeral 851 designates a print substrate, 852 an aluminum radiator plate, 853 heater board compressed of a heater element and a diode matrix, 854 memory means for preliminarily storing the density shading information, a non-volatile memory such as EEPROM, and other memories, 855 a contact electrode which forms a joint portion to a body. A line of orifices are not shown here.

As shown in FIG. 30, the EEPROM 854 in which shading data of respective recording heads are to be stored is equipped on the print substrate 851 including heater element of the recording head 232 and drive control part. The shading data or its correction data to respective orifice or orifice group, which is set on the basis of shading measurement data measured with respect to the respective recording head when produced.

Thereby, when the recording head 232 is attached to the main device, the information on the shading is read out of the recording head 232, and the predetermined control is performed in order to improve the shading. Accordingly, it is possible to maintain the improved image quality.

Figure 32:
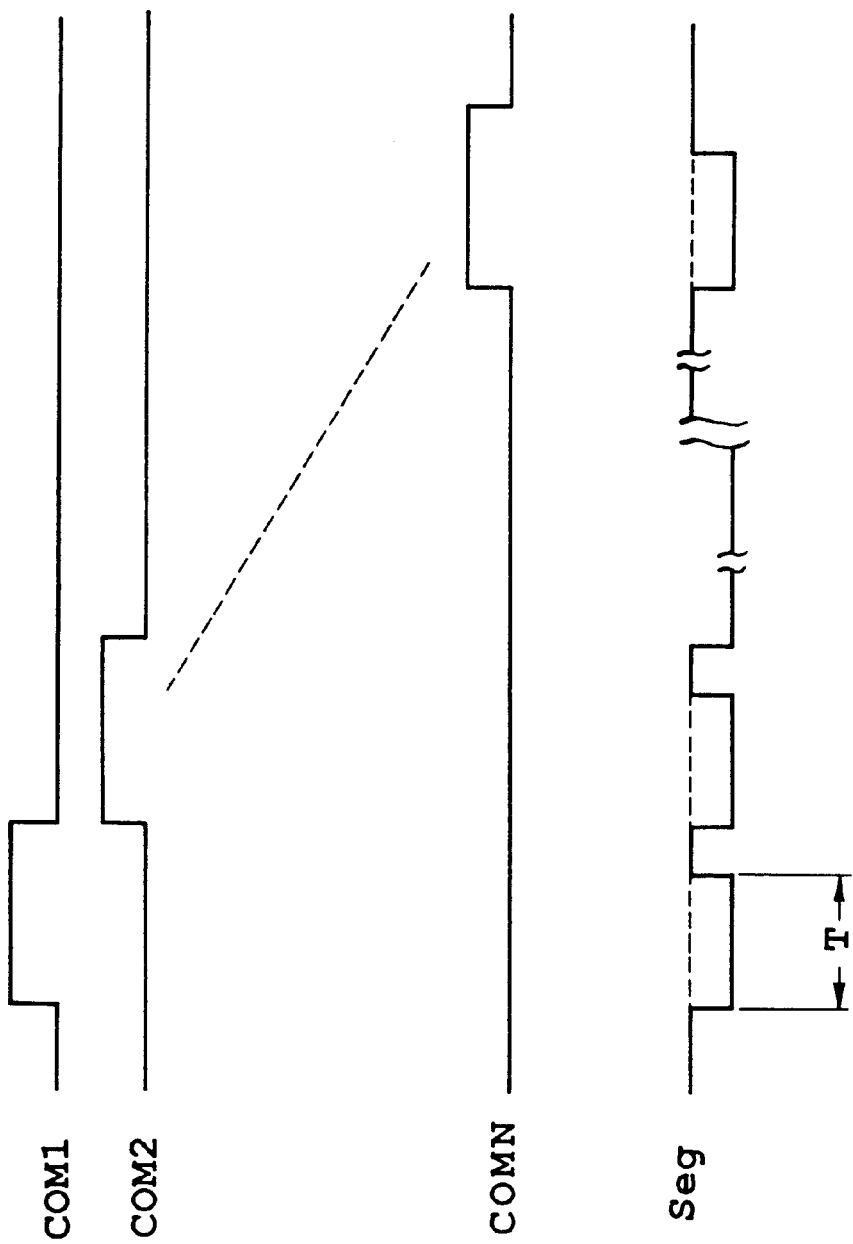
FIG. 32 is a timing chart of a driving signal in the circuit shown in FIG. 31A.

FIGS. 31A and 31B show an example of main circuit construction on the print substrate 851 shown in FIG. 30, where the circuit construction in the heater board 853 is at the inside of a dotted line block. The heater board 853 has N×M matrix structure of a circuit which connected in serial the heater element to a diode 856 for preventing a current flowing into. That is, these heater elements are driving in time sharing every block as shown in FIG. 32, and the supply of the driving energy is controlled by changing pulse width (T) applied to the segment (Seg) side.

FIG. 31B shows an example of the EEPROM 854 shown in FIG. 30. In the EEPROM, the shading information according to the present invention is stored. This shading information is transmitted in serial communication to the main device in response to the demand signal (address signal) from the main device.

Figure 33:
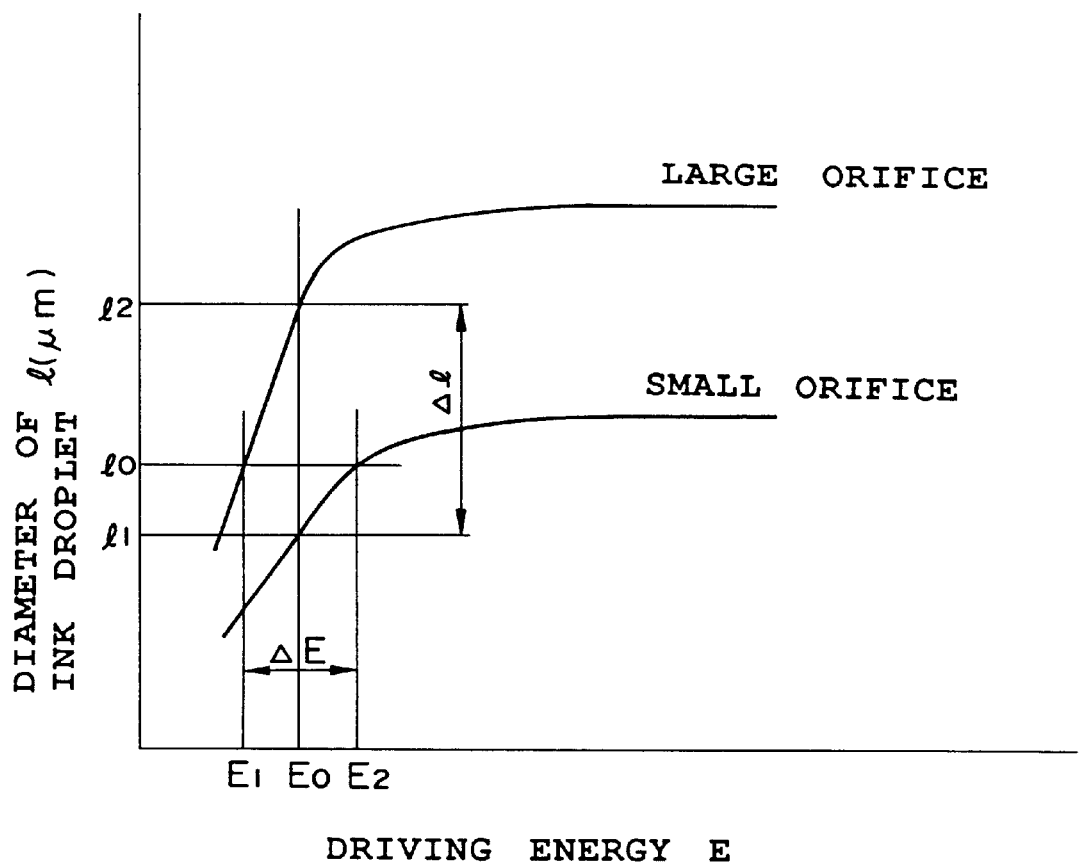
FIG. 33 is a graph illustrating relation between the diameter of an ink droplet to be ejected and driving energy applied to a heating element of the recording head for ejecting ink.

FIG. 33 is a diagrammatic view showing the relation between the diameter of an ink drop to be ejected and driving energy applied to a heating element 853 of the orifice of the recording head 232. As understood from the characteristic curve of FIG. 33, the diameter of the ink drop is increased as the energy is increased within a certain range of the driving energy. The increase in the diameter stops when the driving energy deviates from the range. However, it is to be understood that the diameter of the ink drop between a larger orifice and a smaller orifice is greatly different in the same driving energy.

Referring to FIG. 33, in order substantially to match the diameter the ink drops between orifices with different diameters, for example, in order to control the diameter of the ink drop to the identical value lo, driving energy E2 is supplied to the smaller orifice, while driving energy E1 (E2>E1) is supplied to the larger orifice. In such a manner, the suitable driving energy is determined according to the magnitude of the actual diameter of the ink drop, and the value of its driving energy, or the discrimination information corresponding to the driving energy is written in the non-volatile memory (EEPROM) 854 shown in FIG. 30. Thereby, only the shading due to the difference in the ink drop diameter between the orifices can be eliminated.

In addition, when the variable control of the driving energy of the respective orifice increases the scale of the circuit, for example, in the case that matrix-drive recording head as shown in FIG. 31A is used, each block is set to a minimum unit, the average value of the ink drop diameter of orifices in the block of minimum unit may be calculated, and the driving energy based on the average value is written in the non-volatile memory 854 in a manner similar to the above embodiment. Accordingly, it is possible to control the shading every block unit, thereby, the circuit is simplified. As the discrimination information described above, it is possible to use control pulse width, a driving voltage, a driving current and so on.

Next the countermeasure against another cause of the shading, the difference between the center positions of recorded dots will be explained below. The shading due to the cause is mainly reproduced by the deflection of the direction of ink-ejection, which is due to the limitation of accuracy of finishing. Accordingly, it is difficult to correct the deflection. And hence, in order to reduce the shading, the image density within a certain area which is recorded by this recording head is detect before shipping of its product. The control data based on the detected value is stored in the non-volatile memory 854, and the amount (number) of ink ejection to the area is controlled.

Figure 34A:
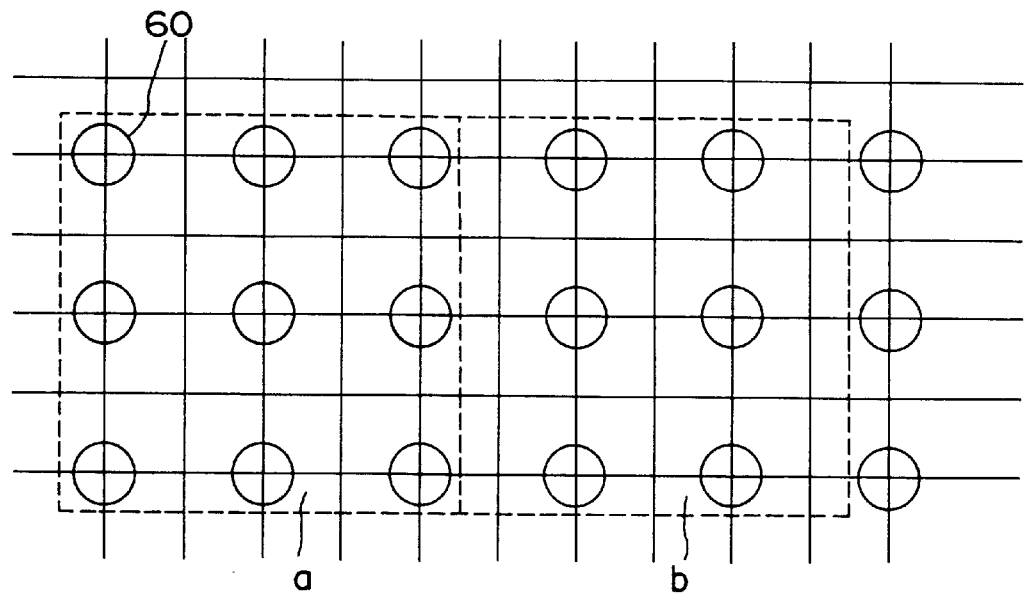
FIGS. 34A and 34B are a diagrammatic view illustrating the result of half-tone recording by an ideal recording head and a diagrammatic view illustrating that of half-tone recording by an actual recording head after the shading correcting for the actual head has been performed, respectively.
Figure 34B:
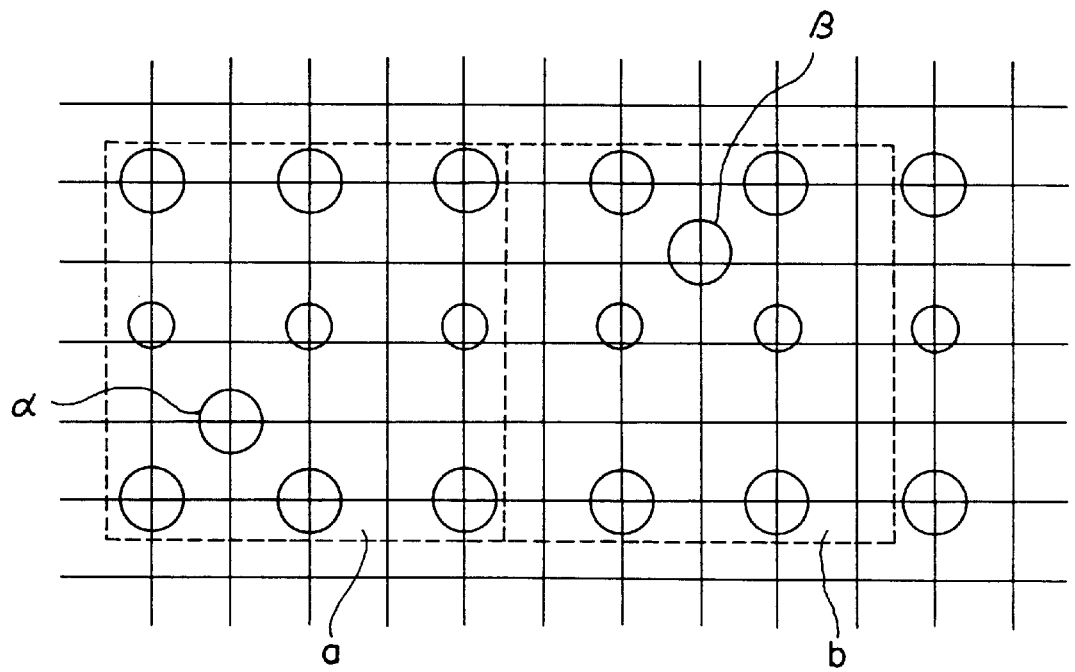

For example, in the case that the 50% half-tone recording by the ideal recording head as shown in FIG. 34A and is performed by using the reading head producing the shading due to the variation of the drop diameter, etc., the following processing is performed in order to reduce the shading. That is, the total dot area in the area enclosed with dotted line shown in FIG. 34B is drawn near that in the area shown in FIG. 34A. Thereby, the recording by the recording head with the characteristic as shown in FIG. 34B is not distinguishable from that of FIG. 34A.

As to the b area of FIG. 34B, by like processing, the shading is substantially eliminated. The density correction is controlled by the image processing in Roader part 24.

For the sake of brief description, the result of processing of the density correction control is expressed schematically by using blocks as shown in FIG. 34B, wherein α and β designate dots for correction. What is known as a general binarization method for image processing is a dither method, an error distribution method, a mean density reservation method and etc. as these methods are not subject matter of the present invention, explanation of the method is omitted in the specification.

Figure 35:
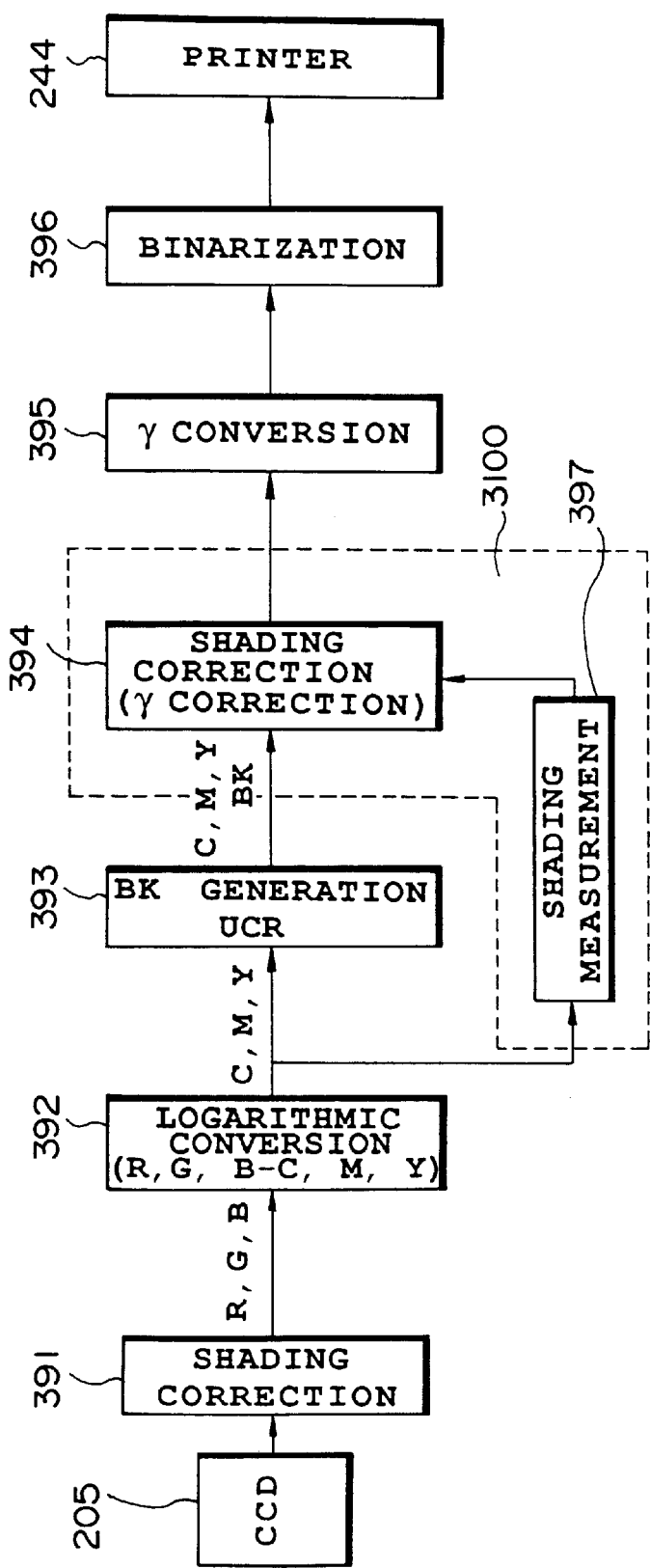
FIG. 35 is a block diagram showing the construction of an image processing circuit according to the present embodiment.

The density correction processing of the present embodiment can be processed as γ-correction control processing in the flow of the signal processing of reader part 224 as shown in FIG. 35.

In FIG. 35, an image signal is read from the CCD sensor 205, one of solid image pick-up element. The sensibility of the sensor is corrected in the shading correction circuit 391.

The corrected signal is transformed from the three primary colors of light, R(red), G(green) and B(blue) into that of recording color, C(cyan), M(magenta) and Y(yellow) by LOG conversion circuit 392. The Bk (black) portion of the C, M and Y signals is extracted as the common component, or a portion of the common component of those signal is extracted as a portion of black component. The extracted signal is input to a head shading circuit 394 as C, M, Y and Bk signals.

Figure 36:
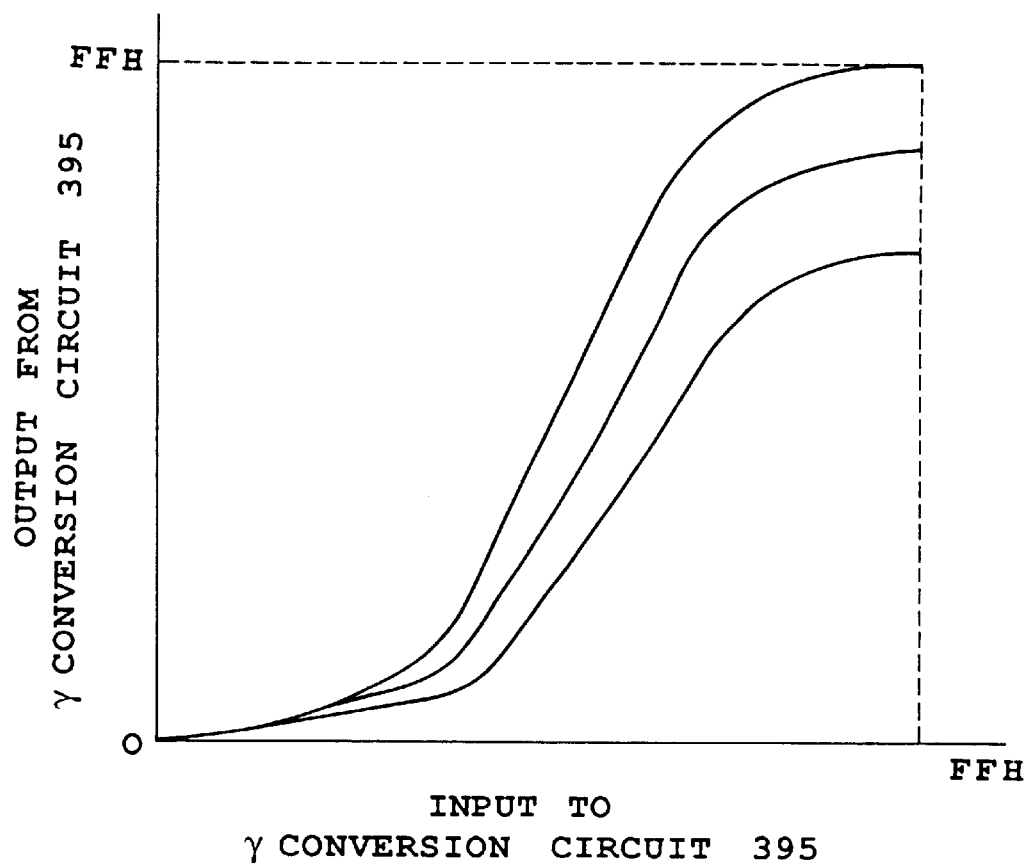
FIG. 36 is a graph illustrating relation between input and output signals of γ-transformation circuit shown in FIG. 35.

In the head shading circuit 394, γ-correction (density correction) is made to the image signal corresponding to each orifice according to the ejection characteristic of each orifice of recording heads. The γ-correction data is supplied to a γ-conversion circuit 395. The γ-conversion circuit 395 has a plurality of functions each of which corresponds to each step for calculating an output data out of input data as shown in FIG. 36, in which the relation between the input data and the output data can be selected in accordance with density balance of each color and color like of user. These functions are also determined according to characteristics of ink and that of reading paper. Further, the output signal from γ-conversion circuit 395 is sent to a binarizing circuit. In the present embodiment, a mean density reservation method (MD method) is used for the binarizing processing. The output of the binarizing circuit is sent the printer part 244, and forms a driving data for the recording head. In FIG. 35, the head shading circuit (γ-correction circuit) 394 is at the prestage of the γ-conversion circuit 395, and γ-conversion is performed after γ-correction. However, the reverse construction is also effective.

In FIG. 35, a reference numeral 397 designates a density shading measurement portion. In the present embodiment, the combination part 3100 of the head shading circuit (γ-correction circuit) 394 and the shading measurement portion 397 is similar in an electrical construction to that of FIG. 21 in embodiment 2. And the portion 3100 of FIG. 35 is similar in a detailed function to that of FIG. 35 is similar in a detailed function to that of FIG. 20 in embodiment 2. In addition, detail of the portion 3100 shown in FIG. 35 is similarly shown in FIG. 20.

Figure 37:
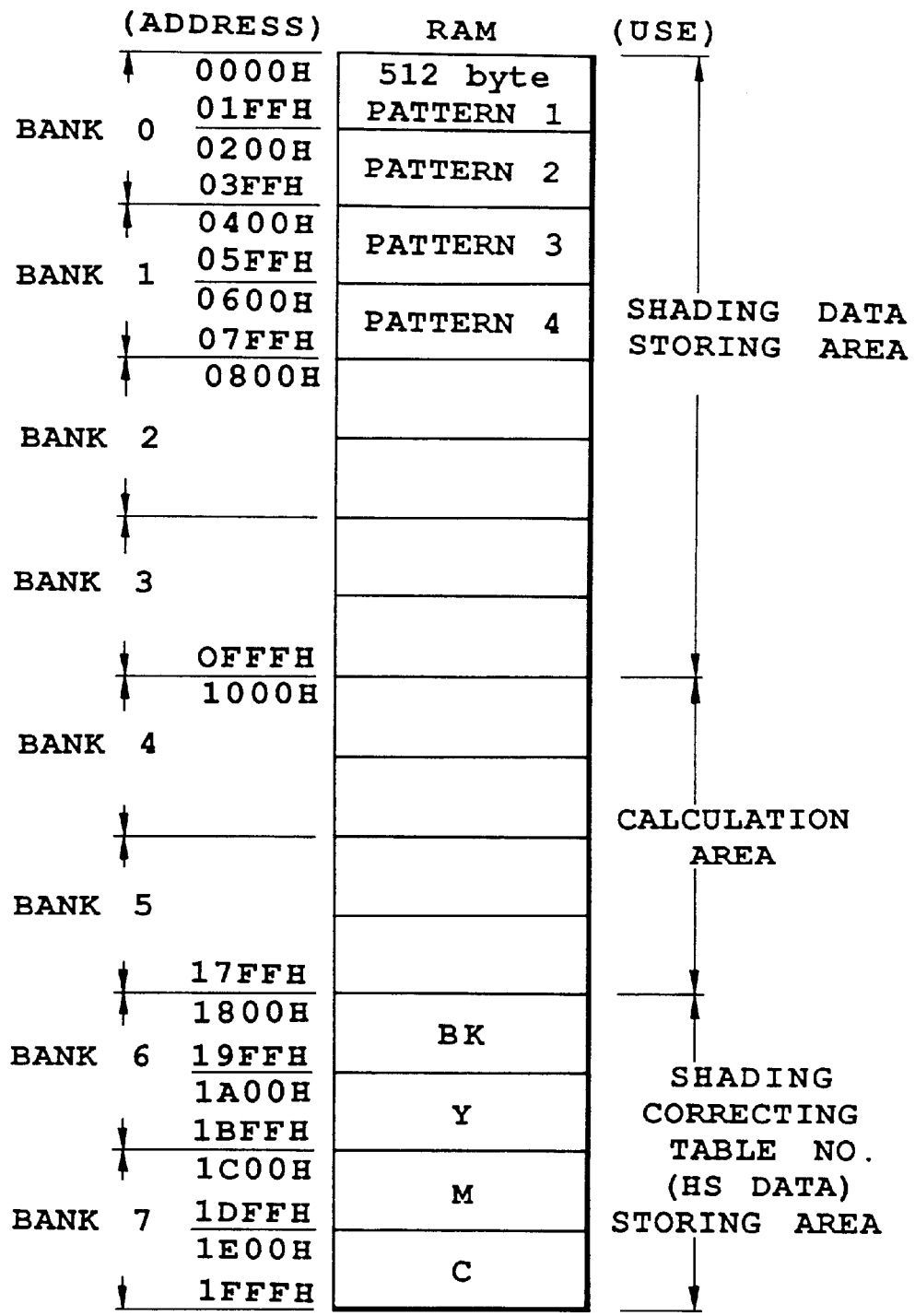
FIG. 37 is a diagram illustrating an internal assignment of a RAM according to the present embodiment.

In FIG. 20, the average density data of each orifices is calculated by an operational portion 2135 (CPU 151), and the correction tables shown in FIG. 37 are assigned to each of the orifices. The obtained correction table number is stored in a RAM 2136 for correction of FIG. 20.

As shown in FIG. 20, a memory 2134 for storing temporarily the read-out density data and a γ-correction memory are common to a RAM 2152. FIG. 37 illustrates the inside assignment.

Figure 38:
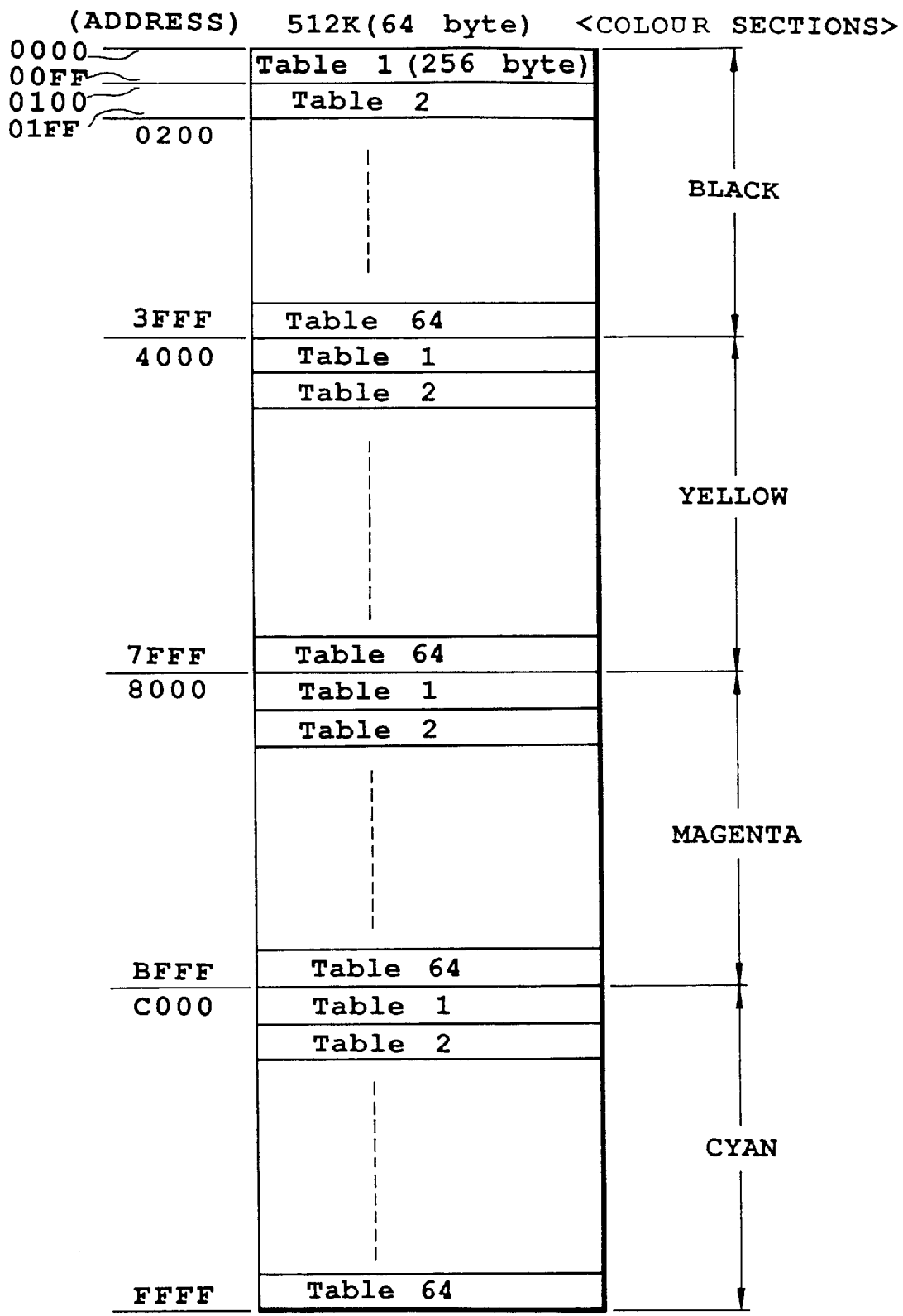
FIG. 38 is a diagram illustrating an internal assignment of a head shading table of the ROM according to the present embodiment.
Figure 39:
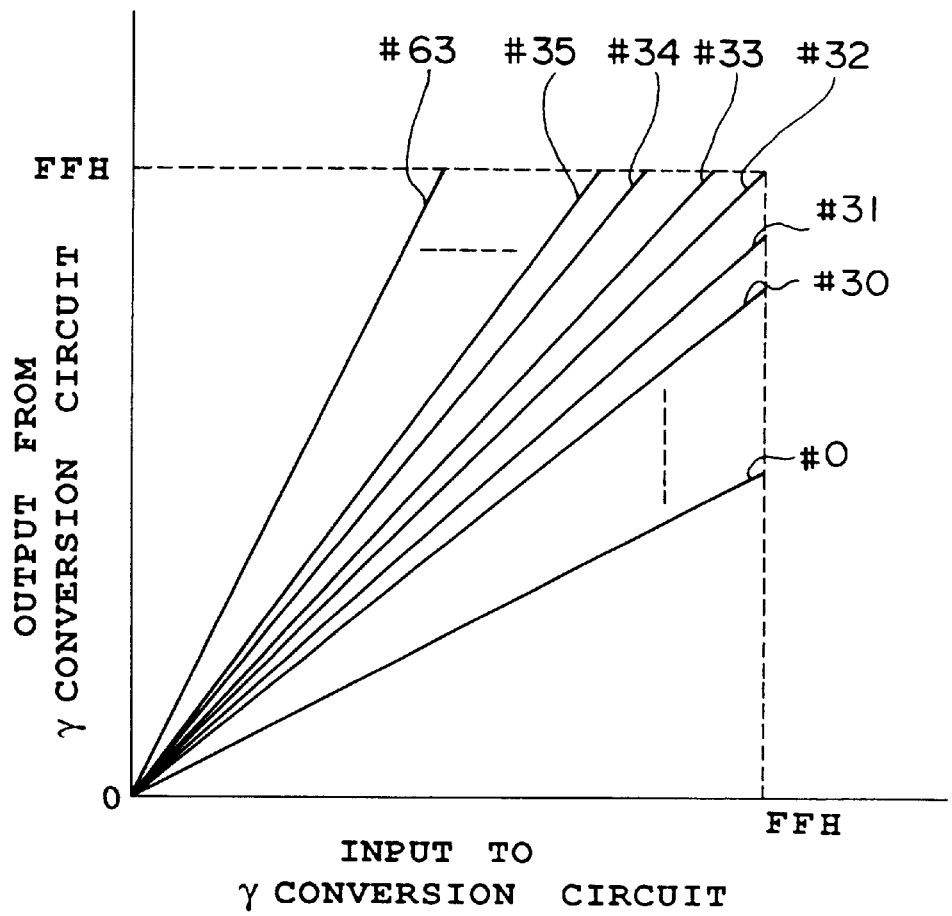
FIG. 39 is a graph illustrating relation between input and output signals of γ-correction circuit shown in FIG. 35.

In an EPROM 2126 shown in FIG. 21, 64 kind of γ-correction curves are stored in the layout of FIG. 38.

Next, γ-correction processing will be explained concretely. A γ-correction circuit 394 is provided with many correction function (in this case, 64 kinds of function, or #0 to #63). For example, the function #32 is a direct line at an angle of inclination of 45 degrees, an input is outputted as it is. In the function of which number is less than #31, the input multiplied the input signal by a constant less than 1 is output. When this function is caused to correspond to the high density portion of the recording head, the input image signal is corrected to lighter density than the actual density, while in the function of which number is more than #33, by multiplying the input signal by a constant more than 1, the input image signal is corrected to darker density than the actual density. In this case, therefore, that correction is effective for the orifices of recording head 32 recording relatively lighter image (pixel).

In addition, this correction table takes any one of the curves as shown in FIG. 22 according to the running of ink which depends on the relation between the ink and a paper and the binarization method, for example, the error distribution method or the density reserving method.

Generally speaking, the increasing ratio when the dots are formed on a white sheet is higher than that when the dots are formal again on the dot which has been already formal. In higher duty, the shading does not becomes so remarkable, because the dots is already superimposed. Accordingly, the correction ratio is the highest in the neighborhood of half-tone (80H), it become lower as gaining away from the half-tone. In addition, in lower duty, it is not necessary to correct, because the distance between dots is very large. If corrected, the difference between the ejection orifice and the non-ejection orifice increase, thereby the band becomes clearer.

In this embodiment, a function of a plurality of characteristics corresponds to one of the orifices of the recording heads 232, respectively. That is, the discrimination number of the correction function corresponding to respective orifice as shown in FIG. 22 is stored in advance in the non-volatile memory. By referring these discrimination number, the image signal is made a γ-correction in the γ-correction circuit 394, and the result of correction is sent to the binarization processing circuit 396 through a γ-conversion circuit 395. The binarization processing circuit 396 has the function for converting multiple valued information (8-bit in FIG. 22) into a binary value, "1" or "0", in which the binarization is performed by using dither method, error distribution method or average density reserving method as described previously. In the present embodiment, the average density reserving method is adopted, as a binary output, the output result as shown in FIG. 17A of embodiment 2 is obtained at the printer part 44.

Figure 40:
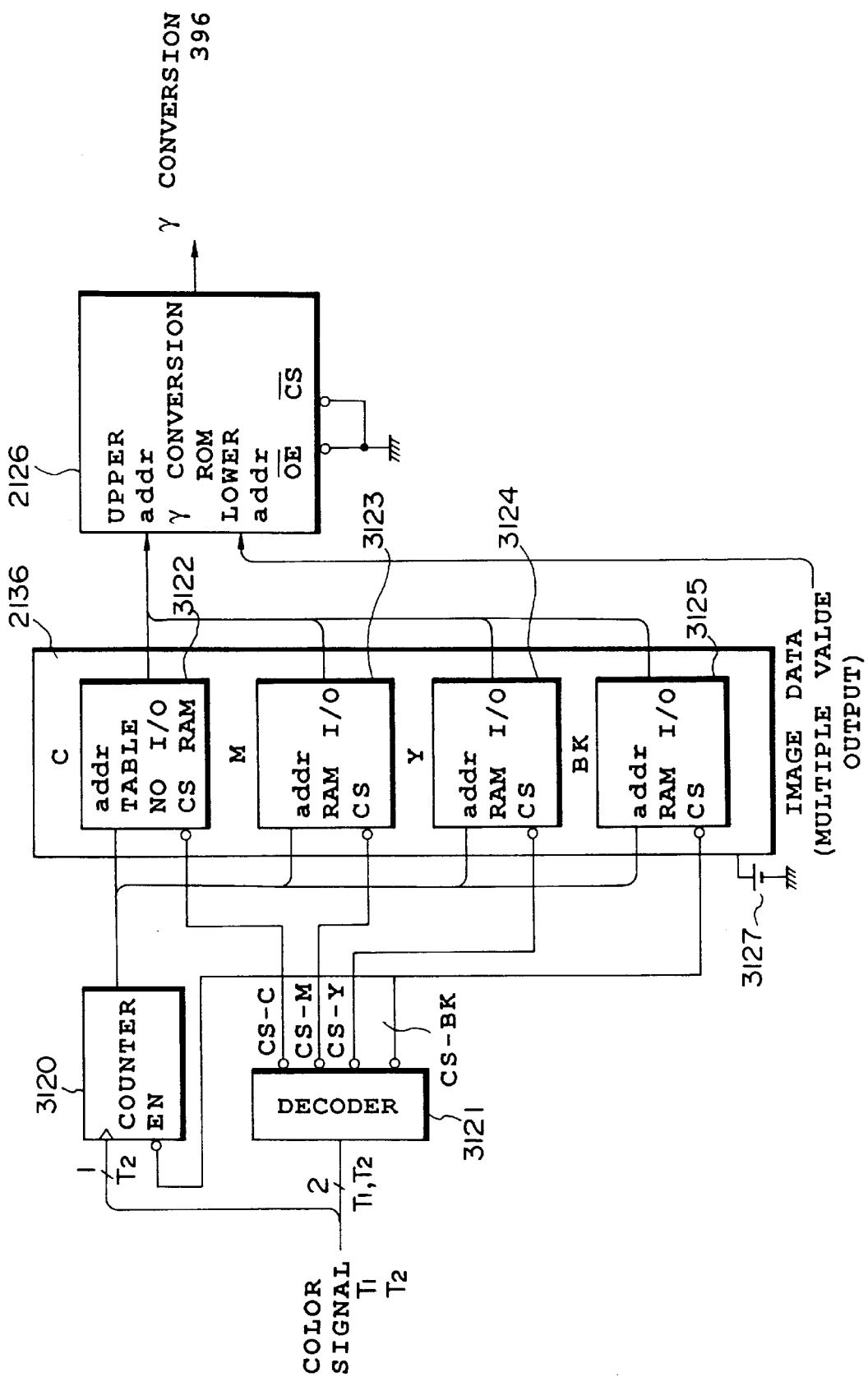
FIG. 40 is a block diagram showing the construction of γ-correction circuit shown in FIG. 35.

FIG. 40 is a block diagram showing in detail a circuit construction of the γ-correction circuit 394 shown in FIG. 35.

In FIG. 40, reference numeral 3120 designates a counter, and 3121 a decoder. Any one of RAMs 3122 through 3125 at the post-stage is selected by output of the decoder. These RAMs (Random Access Memories) store color conversion data corresponding each color. As shown in FIG. 20, γ-correction RAM (3122 to 3125) and density data temporary hold RAM 2134 are co-owned. 2126 γ-correction ROM (Read Only Memory) which stores γ-correction table data shown in FIG. 38.

The color signals T1, T2 supplied from Bk production/UCR circuit 393 of FIG. 35 are 2-bit signal each having any one of "00" "01" "10" and "11", and in order to discriminate colors, the contents of the above 2-bit corresponds to Y, M, C, and Bk, respectively. The counter 3120 to which the lower bit signal T2 of the 2-bit color signal is input, counts up at rising-up of the signal T2 when the output of the decoder is Bk(CS–EK). In other words, at the end of c signal, the counter 3120 is added by +1. Because a set of Y, M, C, and Bk means one pixel information, the counter 3120 is counted up every pixel unit. The output of the counter 3120 is applied to address input terminals of four RAM 3122 through 3125.

The content of a non-volatile memory 854 is transferred and is written in advance to the RAMs 3122 to 3125 via the CPU 151 (see FIG. 20). The output of the decoder 3121 designate and gain access the address of the RAM 3122 through 3125 in order, in synchronization with the color signals T1 and T2, as a result, the content of the RAM gained access is output selectively and is input as the upper address of the γ-correction ROM 2126.

That is, the output of the counter 3120 designate the orifice number of the recording head 232 corresponding to the image data at that time. The number (#0 to #63 of the characteristic curve of FIG. 22) of γ-correction curve of the orifice is recorded at the area pointed out the address which is the orifice number stored in the RAMs 3122 through 3125. Accordingly, the upper address of the γ-correction ROM 2126 points out the table number, and at its lower address, the image data which is output from the Bk production/UCR circuit 393 is input is it is. The input image data is corrected according to one function selected among the γ-correction curves of FIG. 22, and it sent to a γ-conversion circuit 395.

Next, the operation of the γ-conversion circuit at the varied magnification will be explained.

Figure 41:
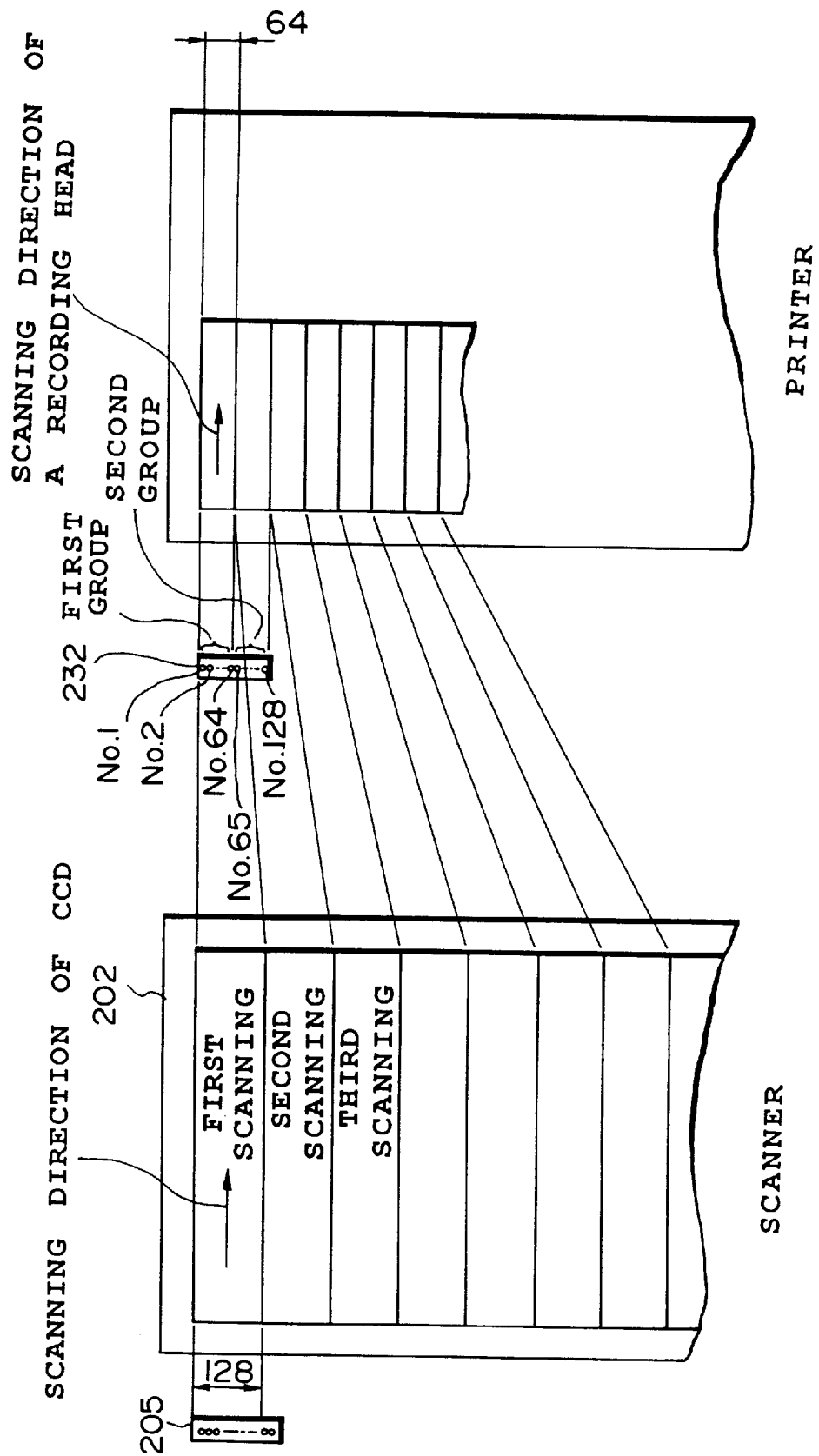
FIG. 41 is an explanatory diagram illustrating relation between the reading of a scanner part and the recording of a printer part in a reduction mode in the present embodiment.

FIG. 41 shows the relation between the read-out of the scanner and the recording of the printer in the reduction mode of the present embodiment. FIG. 41 shows 50% reduction record for the sake of simplification of description.

In this case, the information obtained by reading the manuscript by 128 sensors of the CCD 205 is carried out a thinning out by half, and is recorded by the 64 orifices of the recording head at the printer part. In the present embodiment, as shown in the same drawing, the printer part makes a recording by using a 1st orifice to a 65th orifice (a first group) in a first scanning of the CCD 205, and by using a 65th orifice to a 128th orifice (a second group) in a second scanning of the CCD 205. In a similar manner, the printer part makes a recording by using the first group in a third scanning, and by using the second group in a fourth scanning. That is, in the reduction mode, the recording head is used half by half. Therefore, in the printer part 44, the recording sheet is transported every 8.128 mm long even in the reduction mode, where the main scanning carriage 234 of the printer scans twice the same region (8.128 mm width) of the recording sheet. As seen from the above description, since in the reduction mode, the orifices to be used are alternately changed, the initial value of the counter 3120 in FIG. 40 is determined to be "0" in case of recording with the first group, and its initial value is determined to be "64" in case of recording with the second group, which is performed by CPU 2135 shown in FIG. 20. CCD 205 has 166 sensor elements. In case of an image processing by such a band processing as in this embodiment shown in FIG. 43, in an algorithm for the binary process, it is required to perform a connection processing between adjacent bands, the scan n and the scan (n+1). In order to do so, the image processing part of the scanner part actually image processing over 128+α pixels in an individual band. Such image processing includes procedures performed in the head shading circuit 394 in FIG. 38.

Figure 42:
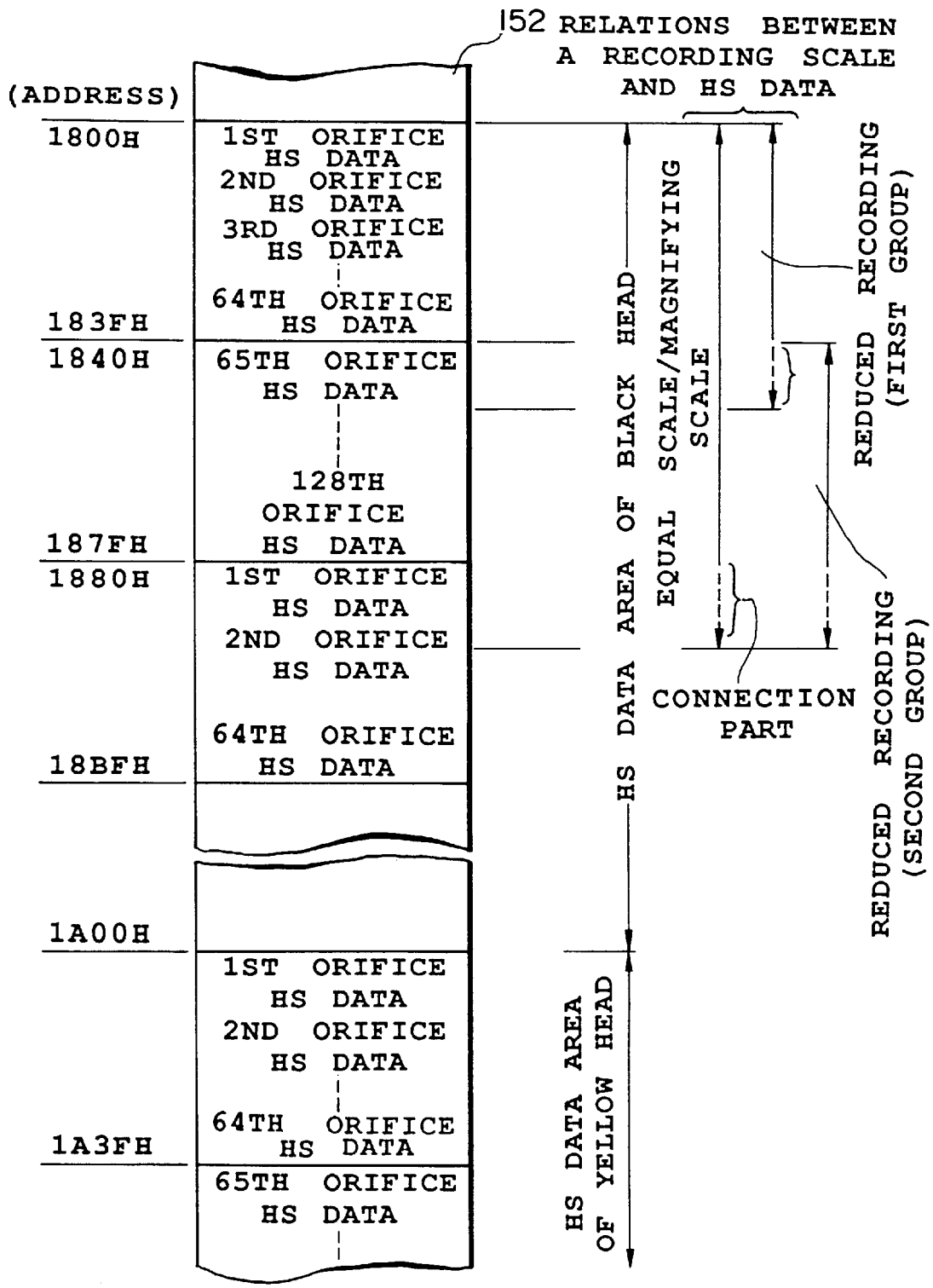
FIG. 42 is a diagram illustrating an HS data storing area and an available area when a magnification is changed shown in FIG. 37.

What is shown in FIG. 42 is a content of data stored in the storage area for HS data (density correction table numbers) in RAM 2152 in FIGS. 20 and 37 of this embodiment. HS data corresponding to orifices from 1 to 128 are stored in the address area starting from 1800H, and from 1880H, HS data corresponding to orifices from 1 to 128 are also stored. This is because HS data should be stored redundantly in order to cope with the connection processing between adjacent bands as shown in the right side of FIG. 42, in which HS data storage is determined on the bases that which orifices are used for recording a connection part shown by dotted arrows in the next main-scan displacement of the carriage 234.

Figure 43:
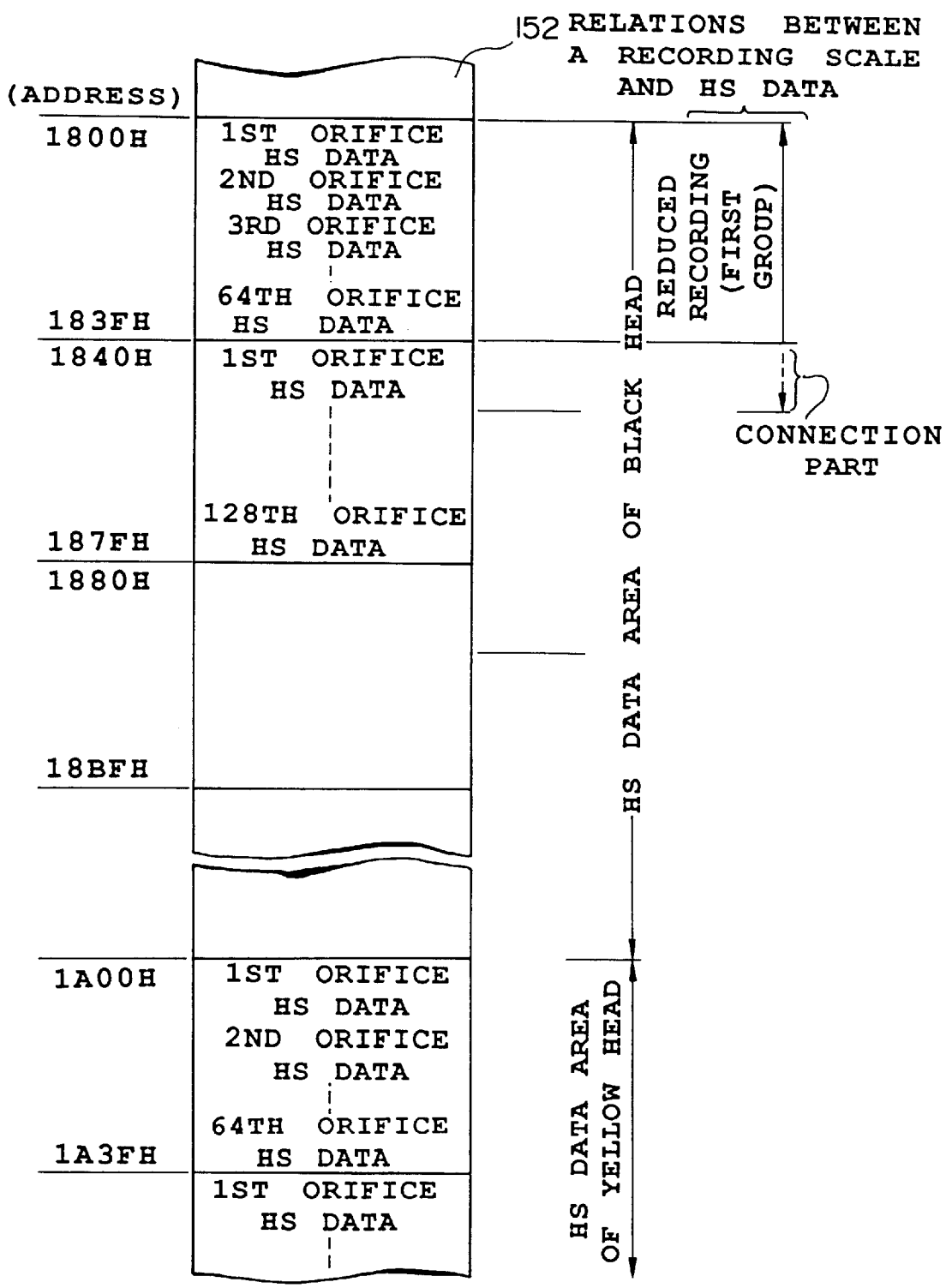
FIG. 43 is a diagram illustrating a method of storing the HS data in the case that only the orifices from No. 1 to No. 64 are used when a magnification is changed in the present embodiment.

As described in FIG. 41, in this embodiment, in recording operation, as the first group and the second group are selected alternately, a single set of table structure for HS data is eventually sufficient for both cases of reduction recording and magnification recording, which can be realized by modifying the access region as shown in the right side of FIG. 41. However, in case of only 64 orifices included in the first group, HS data table in RAM 2152 is reformed by storing HS data corresponding to orifices form 1 to 64 into the address are starting from 1840H. Therefore, in this case, it may be allowed that HS data area in RAM 2152 is selectively used as shown in FIGS. 42 and 43 in responsive to the magnification ratio. In this case, a memory area is prepared for storing temporarily contents of data shown in FIGS. 42 and 43. In addition, even in case of recording with an arbitrary number of orifices continuously adjacent to one another, it can be possible by modifying HD data in RAM 2152 in designated values.

In the above embodiment, what is shown is a case that, a copy machine is constructed by connecting an image reading apparatus and an ink jet recording apparatus and that the density correction process is performed in the image reading apparatus itself. The philosophy of the present invention is not limited within this embodiment but applicable to an ink jet recording apparatus which accepts image data in an RGB signal format from color VTR apparatus as well as applicable to a facsimile. In this case, the γ-correction circuit 394 for correcting the density shading is formed in the signal processing system in the ink jet recording apparatus.

Figure 44:
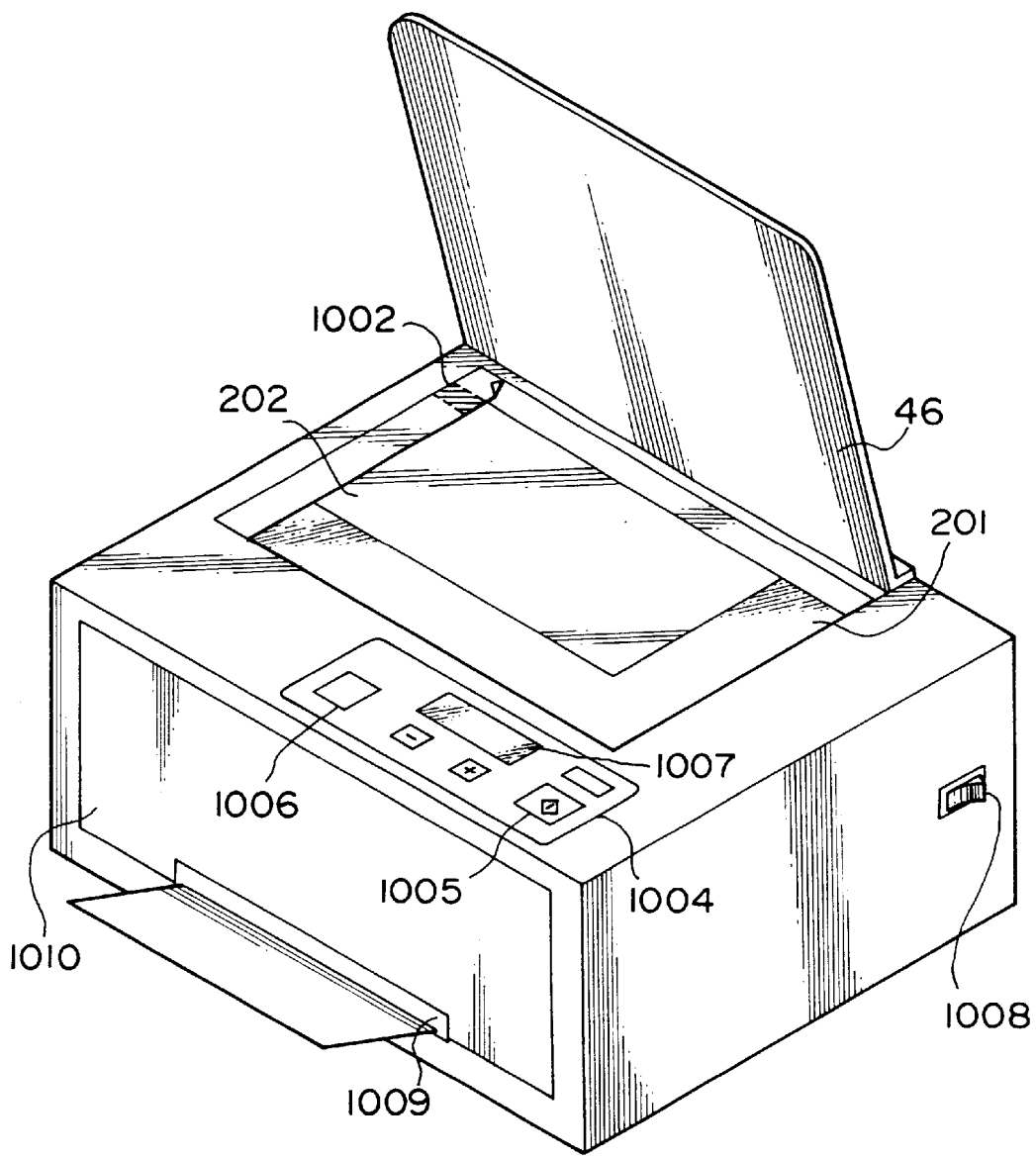
FIG. 44 is a schematic perspective view in an external appearance, showing the constriction of the color copy machine according to the present embodiment.
Figure 45:
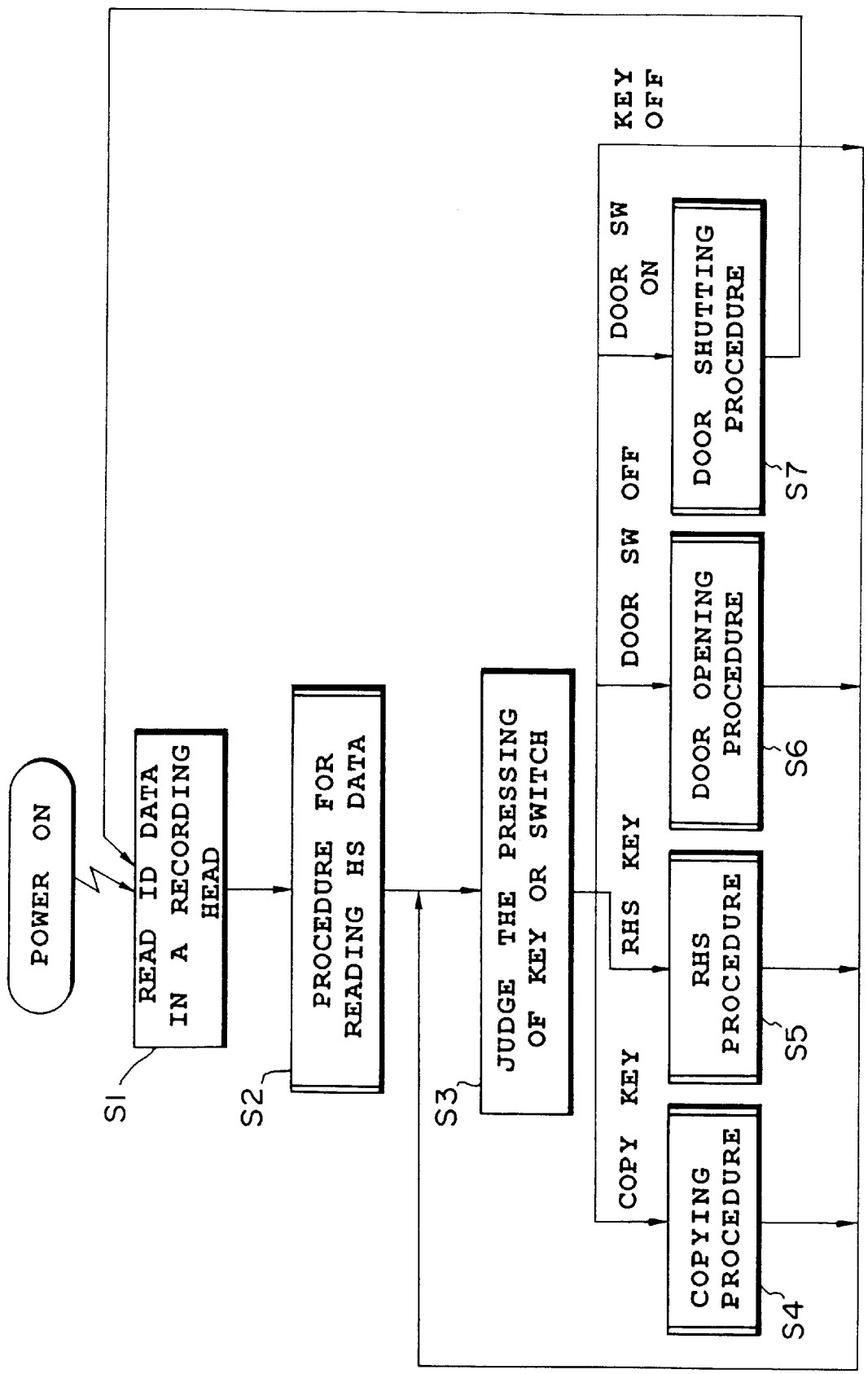
FIG. 45 is a flow chart illustrating briefly the whole procedure of control of the color copy machine.
Figure 46:
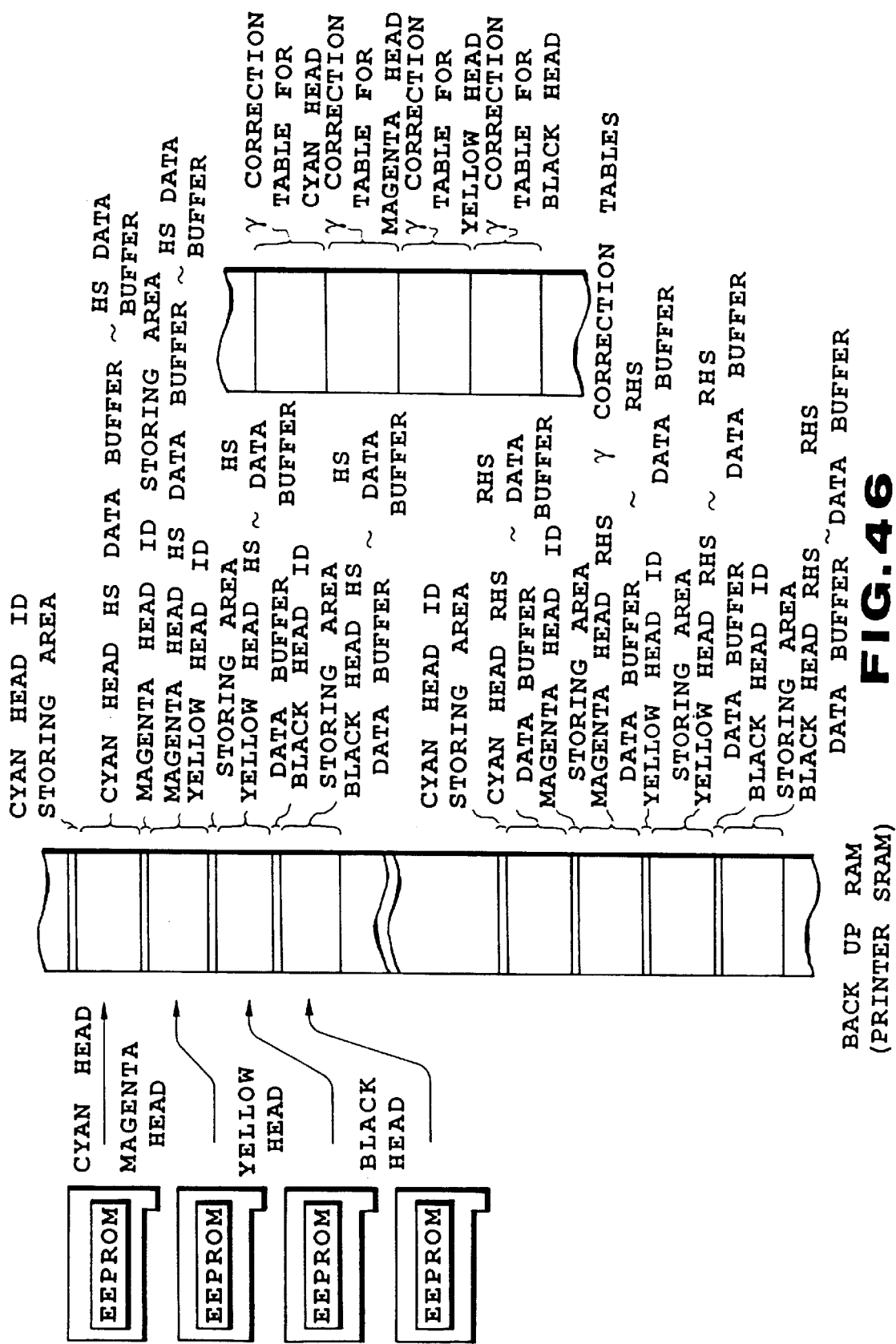
FIG. 46 is a diagram illustrating the HS data storing area according to the present embodiment.

Next, by referring to FIG. 44 illustrating an example of an external structure and shape of an apparatus of this embodiment, FIG. 45 showing a schematic control flow of the apparatus of this embodiment, FIG. 46 describing procedures in step S1 shown in FIG. 45, and also referring to FIGS. 47, 48, 49A and 49B showing procedures in steps S2, S4, S6 and S7, respectively, an overview of operational procedures of the apparatus of this embodiment.

In step S1 in FIG. 45, after the main electric power switch 1008 in FIG. 44 is turned on, a temperature control is started for maintaining the head temperature to be around 25° C. for preparing the recording operation, and next, data stored in a non-volatile memory of the recording head installed in the apparatus are coped to SRAM used as an HS buffer together with the head identification ID. The data stored in the non-volatile memory of the recording head include the head identification ID specific to the installed recording head and γ-correction table numbers, each corresponding to an individual orifice of the recording head. Procedures in step S1 are performed always in case that the recording head is replaced or exchanged due to user's requirement, for example, at the time when the electric power supply is turned on, or the door 1010 in FIG. 44 formed for service operations in exchanging the recording head is opened or closed.

In the SRAM of the printer part, the new HS data obtained in the latest RHS processing are stored and backed up by the batteries. The previously described RHS data buffer are also backed up by the batteries. As the HS data buffer and the RHS data buffer contain couples of the head identification ID's and the γ-correction table numbers, each couple corresponding to an individual orifice of the recording heads. These data buffers are prepared for an individual recording head, each corresponding to one of individual ink fluid colors, cyan, magenta, yellow and black.

Next, in step S2 HS data are transferred to the γ-correction memory, and at the same time, the following judgment is performed in order to used the latest HS data of the installed recording head.

Figure 47:
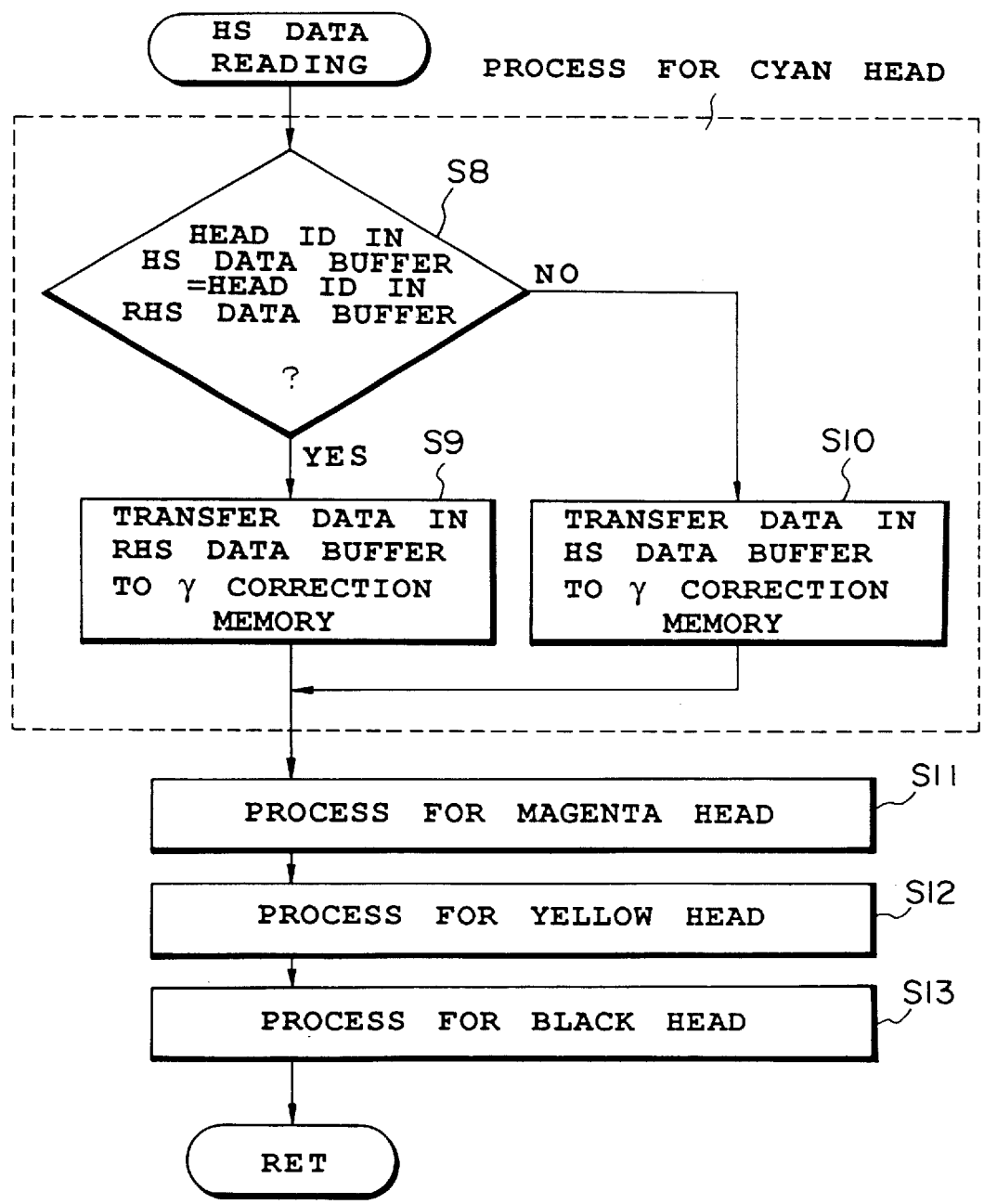
FIG. 47 is a flow chart illustrating an example of the procedure of reading of the HS data illustrated in FIG. 45.

If the ID of the recording head for cyan ink color which is copied at the electric power supply as shown in step S8 in FIG. 47 is turned on and the ID stored in the RHS data buffer are identical to each other, HS data to which RHS processing is applied are used for recording in step S9 as this comparison result means that RHS processing has been already applied to the recording head and that the result of RHS processing sill remains in RAM. As data stored in a non-volatile memory of the recording head are not revised again, RHS data to which RHS processing is applied are guaranteed so as to be newer than the initial HS data of the recording head.

If the ID of the recording head and the ID stored in the RHS data buffer are not identical to each other, as ID data store in the RHS data buffer are specific to another recording heads, there ID data cannot be applicable to the currently installed recording head. In this case, ID data stored in the HS data buffer of the recording head are transferred to the γ-correction memory in step S10. With respect to another recording heads for magenta, yellow and black ink colors, steps S11, S12 and S13 including procedures similar to steps S8, S9 and S10 are applied.

After transferring HS data corresponding to the currently installed recording head into the γ-correction memory, input judgment process for detecting input signals from keys such as COPY key 1005 used for prompting a request for a copy operation in step S4 in FIG. 45, which is a major objective of the apparatus, said keys being placed on the apparatus operation part 1004 in FIG. 44, and input signals from a door switch not shown but installed on the door used for service operation such as exchanging the recording head (step S3 in FIG. 45).

In the following, a schematic flow of the copy operation in step S4 in FIG. 45.

Figure 48:
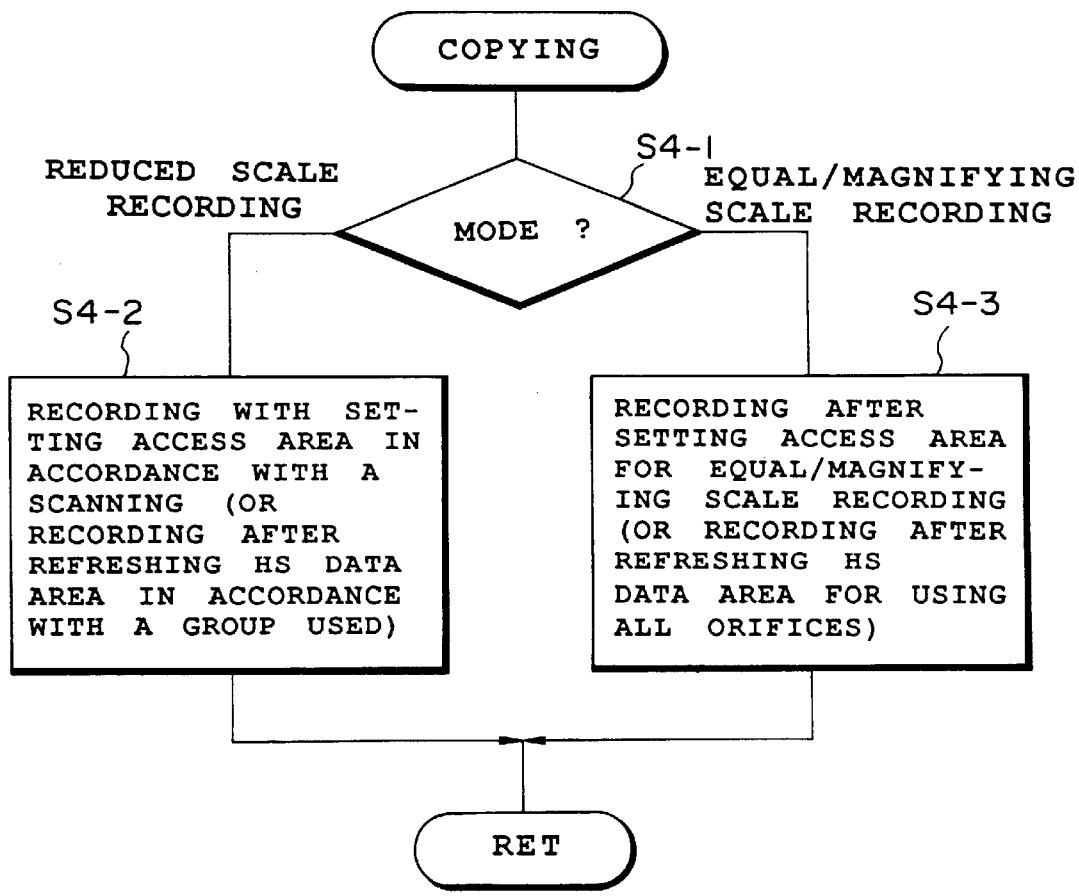
FIG. 48 is a flow chart illustrating an example of the procedure of copying operation illustrated in FIG. 45.

FIG. 48 is an example of procedures for the copy operation which is started in responsive to the operation of the COPY key 1005. At first, in step S4-1, what is judged is whether the recording mode is reduction mode or magnification mode. In case of reduction mode, step S4-2 is selected next in which, as described with FIG. 42, recording is performed as changing the access regions so that HS data (table numbers) corresponding to an individual group selected in a single scan operation may be selected. Alternately in step S4-2, as described with FIG. 43, recording is performed after HS data are revised so as to correspond to the currently used recording head, for example, HS data are transformed from those shown in FIG. 42 into those shown in FIG. 43. On the other hand, in case of magnification mode, as described with FIG. 42, after altering the access regions so that an access region corresponding to the current recording mode in order to assure that all the orifices are applied in a single scan operation, or after converting HS data into those shown in FIG. 42, recording is performed in step S4-3.

Figures 49A, 49B:
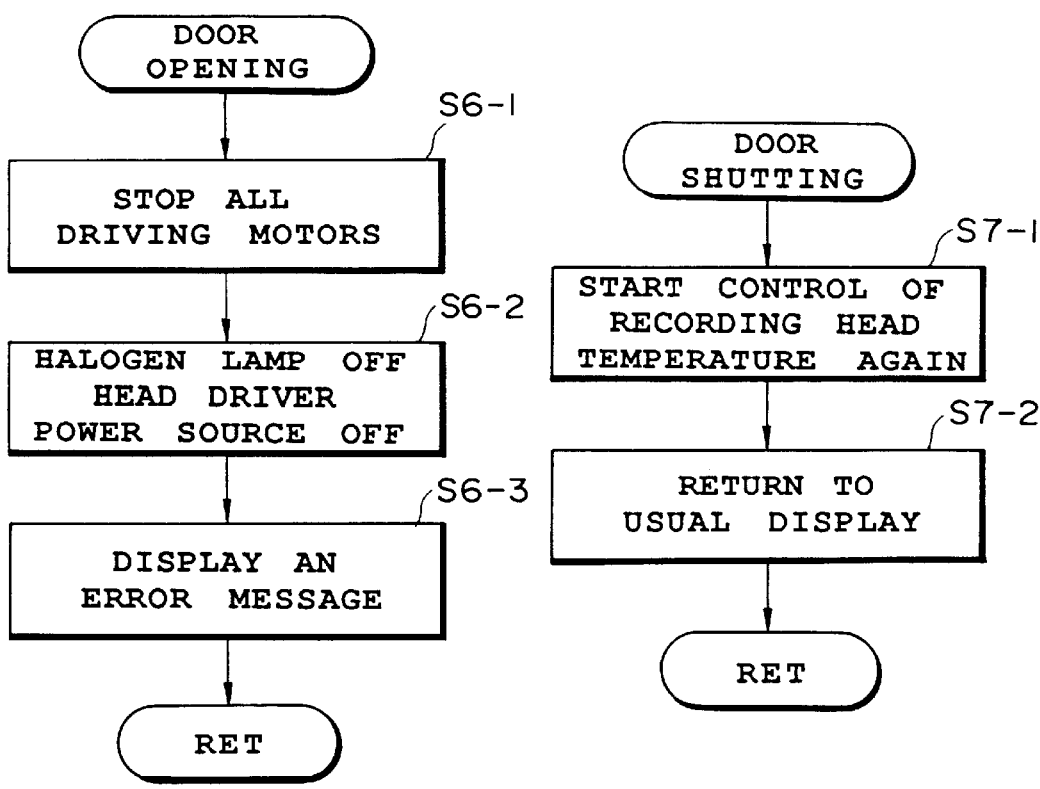
FIGS. 49A and 49B are flow charts illustrating an example of the procedure when a door is opened and illustrating that when the door is shut, respectively.

Next step is step S6 in FIG. 45 for processing in case that the door for service operation of an exchange of the recording head, which includes procedures shown in FIG. 49A. When the door is opened, the door switch is turned off which is detected in step S3, and then processors in step S6 are executed. As shown in FIG. 49A, these procedures include a process for shutdown of all the driving motor in the apparatus in step S6-1, a process for turning off the halogen lump in the read-out system and shutdown of the electric power supply for driving the recording head in step S6-2, and so on. A series of these procedures are aimed for protecting the user by shutting down currents in electric circuits and mechanical movement of components of the apparatus. After the door-open process is performed, input operations by another keys are prohibited until the door is closed again which is detected by the turning-on of the door switch in step S3 in FIG. 45, during which the LED display 1007 in FIG. 44 reports an error message in step S6-3 in order to announce to the user that the door is open.

When the door is closed, the door-shut process in step S7 is executed. By referring to FIG. 49B, if the door is detected to be closed, the head temperature is controlled to be a designated operational temperature for preparing the recording operation in step S7-1, and the LED display stops reporting an error message and displays ordinary operation conditions such as the number of copies sheets in step S7-2.

In the apparatus of the present embodiment, procedures corresponding to keys other than that installed on the operation part described already are also executed. These procedures are not mentioned and not described in detail specifically in FIG. 45, as they are not directly related to the present invention.

RHS (Reader Head Shading) operation of step S5 in FIG. 45 is one of the important operations in this embodiment, that is, a correction processing for shading using an apparatus read-out system described in embodiments 1 and 2. In the shading correction processing, by reading a recorded pattern by the apparatus read-out system and modifying HS data so as to compensating shading, can be corrected shading caused by aged deterioration of recording heads. This is the end of explanations of operations schemes of the apparatus of this embodiment.

In this embodiment, the apparatus itself has a means for correcting shading caused by aged deterioration of recording heads. This means that, at the generation shading, a test pattern shown in FIG. 50 is recorded at first in an operational procedure to be described later. This recorded test pattern is read-out by CCD 205 and used for shading measurement processing.

As shown in FIG. 50, what is prepared on the manuscript stock is a manuscript sheet on which a basic pattern for measuring shading, for example, 50% half-toned pattern, is formed so that the direction in which a one-dimensional array of orifices is defined may be vertical to the direction in which a one-dimensional array of CCD line sensor 205. This basic pattern formed on the manuscript sheet is scanned by the CCD line sensor 205. In the case that the resolution of the recording head 232 is equal to the resolution of the CCD line sensor 205, pixel density data of pixels the number of which is corresponding to the number of light receiving elements of the CCD 205 can be obtained. In the case that the resolution of CCD 205 is higher than the resolution of the recording head 232, it is necessary to calculate the pixel density of a recorded single pixel using pixel density data of a plurality of light receiving elements of CCD 205.

An average density of each orifice is calculated numerically by CPU 2135 and a correction table as shown in FIG. 22 assigned to each orifice is defined. Each correction table has its own ID number, which is newly stored in γ-correction RAM 2136 in FIG. 40 and its corresponding old correction table is revised. As described earlier, in this embodiment, RAM 2134 and RAM 2136 are embedded into a single RAM 2152.

Figure 51:
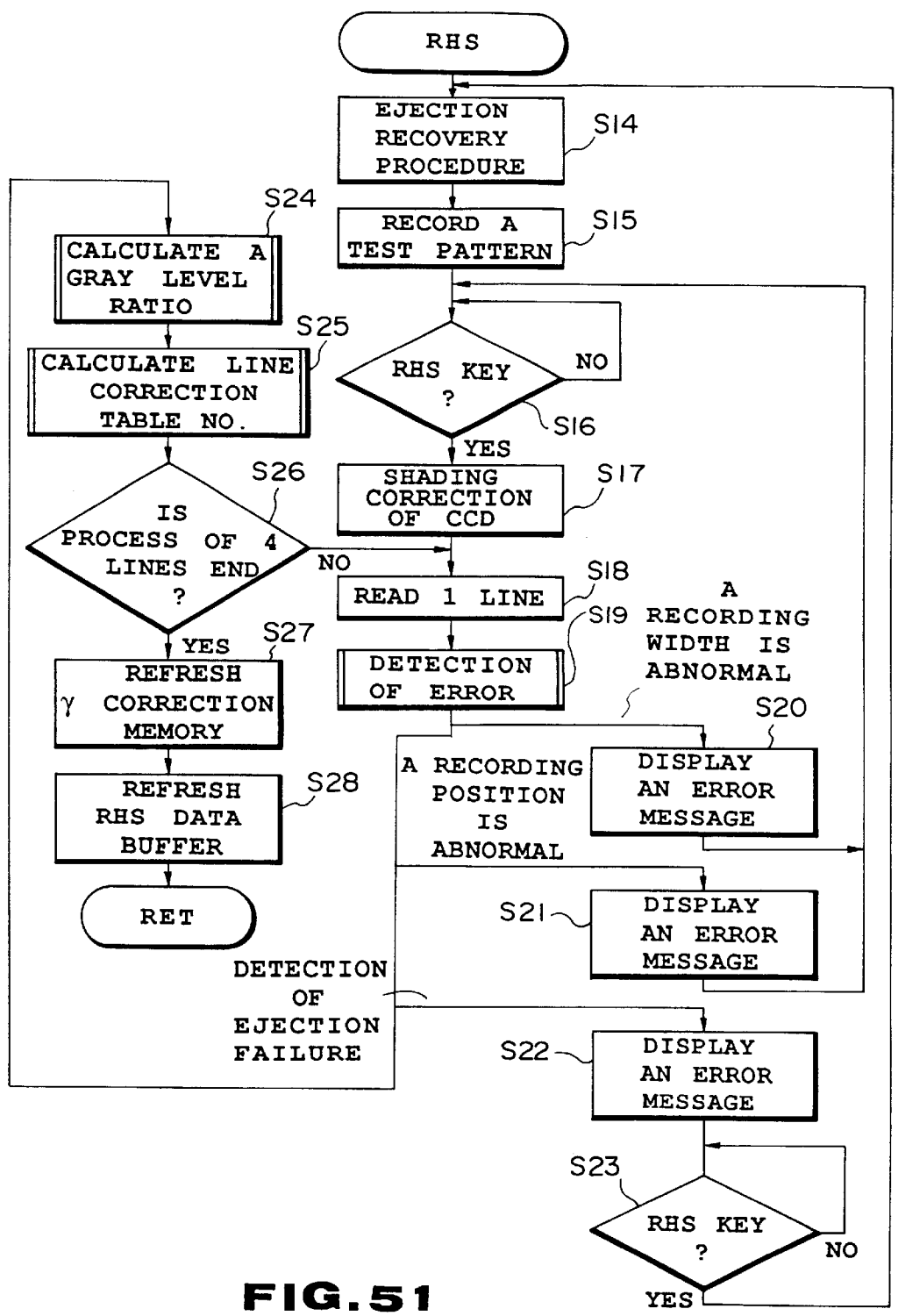
FIG. 51 is a flow chart illustrating the procedure of an RHS operation illustrated in FIG. 45.

Next, a specific control flow of RHS is described by using FIG. 51. Procedures in the control flow are categorized into two groups; procedures for recording test patterns and procedures for reading out the recorded patterns by the read-out system and for numerical calculation of HS data.

At first, in responsive to user's operation of pressing down RHS key 1006 in FIG. 44 on the operation part of the apparatus test patterns are recorded. This process is performed in step S14 for ejections restoration action and in step S15, both in FIG. 51. In step S14, sticky ink fluids are removed from the recording head, air voids are removed by sucking ink fluids from the orifice and the head heater is cooled, all of which are performed sequentially. Procedures in step S14 are preferable as preparatory actions for establishing good pre-conditions for recording test patterns used in RHS process.

In step S15, a test pattern shown in FIG. 50 is recorded. This test pattern contains 16 blocks, each 4 blocks corresponding to an individual ink color which are recorded in the vertical direction in FIG. 50 with their pattern density being 50% half-tone. Each block of the test pattern is recorded in a designated position on the recording sheet. This recorded position of blocks is determined so that error detection procedures in the test pattern read-out process to be described later may be easily established. Each block is recorded by scanning a single recording head three times, that is, each block is composed of three recorded lines. The first and third lines are formed by ejecting ink fluids from 16 orifices at the top end part of the recording head and 16 orifices at the bottom end part of the recording head, which means that 32 orifices out of overall 128 orifices of the recording head are used. The second line is formed by ejecting ink fluids from overall 128 orifices of the recording head. As a result, the width of each half-tone pattern block is equivalent to 160 pitches of orifices of the recording head. The reason why the width of each pattern block is 160 orifices pitch is described below.

Figure 52A:
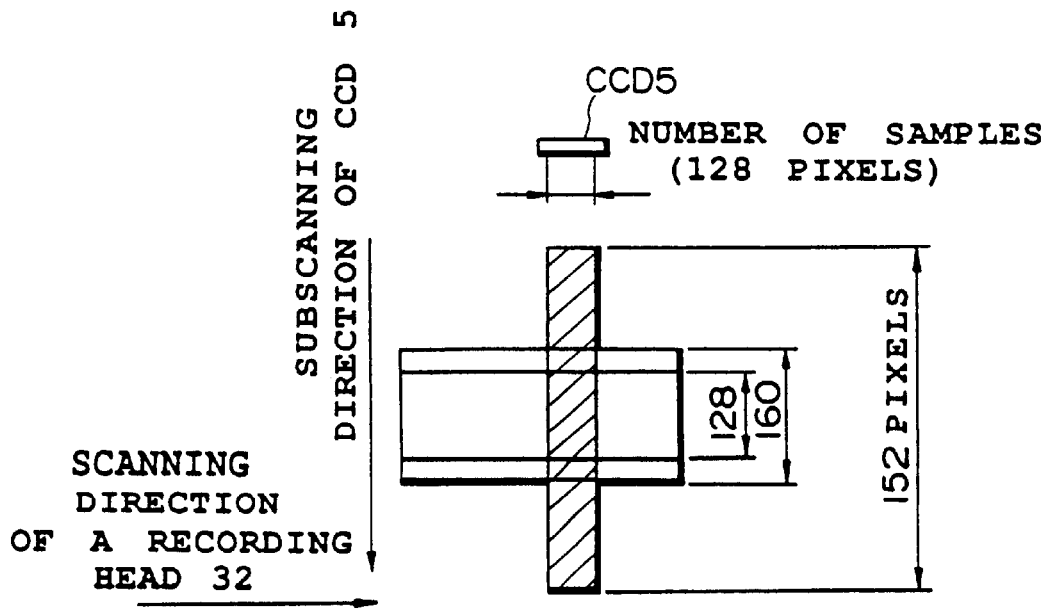
FIG. 52 is a diagram illustrating relation between the test pattern and the CCD line sensor in the present embodiment.
Figure 52B:
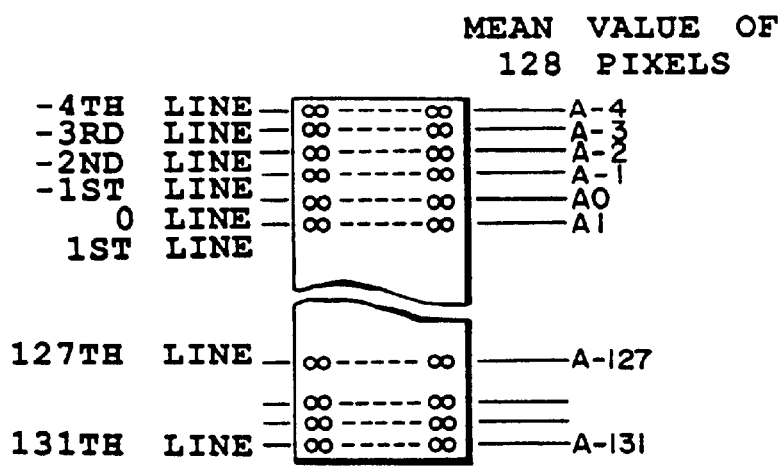

As shown in FIG. 52, in the case of using a recording head 232 having, for example, 128 orifices, in reading out of a test recorded by the recording head 232 by the CCD sensor 205, because the reading out is influenced by the color of ground of the recording paper, which is, for example white, the read-out density data An corresponding to dots formed by orifices at the top and bottom end parts of the recording head end to be less than the actual dot density. Therefore, if each block is formed only by 128 orifices, the reliability of the read-out density data for the edge part of the recorded block may not be established. In this embodiment, each block is recorded by 160 orifices, and by using the read-out density data which satisfy a certain threshold level as effective and reliable data and by defining a center orifice as to be an orifice located at the center of orifices all of which define effective and reliable read-out density data, a couple of dot density data at the dot positions apart from the center orifice by the half of the total number of orifices, for example, 64 orifices in this case, are assigned to the 1st orifice and the 128th orifice, respectively.

In addition, the reason why edge dots of each block are recorded by 16 orifices is that the storage area of RAM 2152 for storing temporarily shading data and that a test pattern formed repetitively as shown in FIG. 50 may be scanned by a scanner in case of using such a small-sized recording apparatus as an A4-size sheet recording apparatus.

After recording a read-out pattern, in step S16 in FIG. 51, whether or not RHS key 1006 is pressed down or not is judged. The user of the apparatus is expected to set the output sheet on which a read-out pattern is recorded on the manuscript stock with the face of the sheet being down so that the recorded test pattern may be scanned and that a set of four blocks recorded with an identical color ink may be arranged in the direction identical to the direction in which the CCD sensor 205 is scanned. At the time when the user presses RHS key 1006, step S17 in FIG. 51 is selected to be executed next.

Procedures from step S17 to step S28 are for reading out shading data and for calculating HS data. AT first, in step S17, a shading process of the CCD sensor 205 is performed by using a reference white board 1002 shown in FIG. 44, and next, in step S18, a test pattern is read-out. In step S18, "1 line" means a single scanning action of the CCD sensor by which a set of four blocks recorded with an identical color ink are read out at one time. So far, in step S18, test pattern data of a set of four black color black is are read out and store. As blocks are placed on the recording sheet in designated positions so that shading data may be stored in a designated area in the memory, the layout of data storage areas in the memory and the volume of these areas are established as shown in FIG. 50 in case that shading data are read out properly. In this embodiment, 1st set of shading data for one blocks occupy the data storage are between 0000H and 01FFH. Similarly, 2nd to 4th sets of shading data are stored between 0200H and 03FFH, between 0400H and 05FFH, and between 0600H and 07FFH, respectively.

Next, in step S19, what is executed is an error detection of shading data stored in that memory areas. In this embodiment of RHS, as the user is required to put a recording sheet, on which a test pattern is recorded is recorded, precisely on the manuscript stock for reading the recording sheet, it is necessary to consider improper cases in which the user fails to put the recording sheet precisely on the manuscript stock. In order to avoid such cases, user's manual operations should be checked as strictly as possible. In addition, even if user's operations may seem to be correct, it is further necessary to verify the correctness of read-out data so that improper correction processing for shading may be avoided and that dot pattern shading may not be enhanced further. In this embodiment, RHS is properly established by error detection procedures in step S19 for read-out data.

Figure 53C:
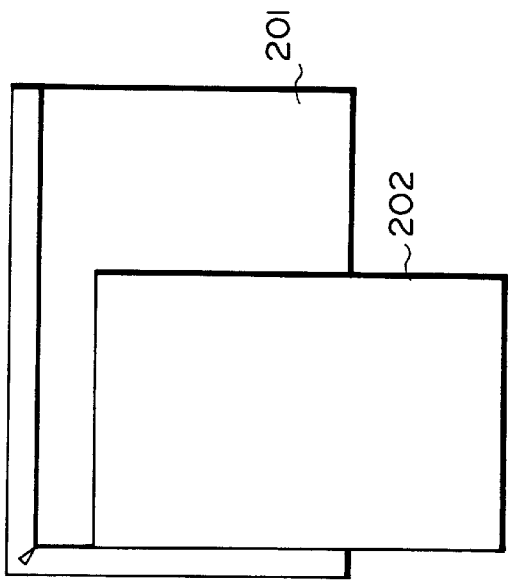
FIGS. 53A, 53B, 53C and 53D are schematic views showing various states of the loading of a recording paper to a reader, to the recording paper the test pattern of the present embodiment being recorded.
Figure 53D:
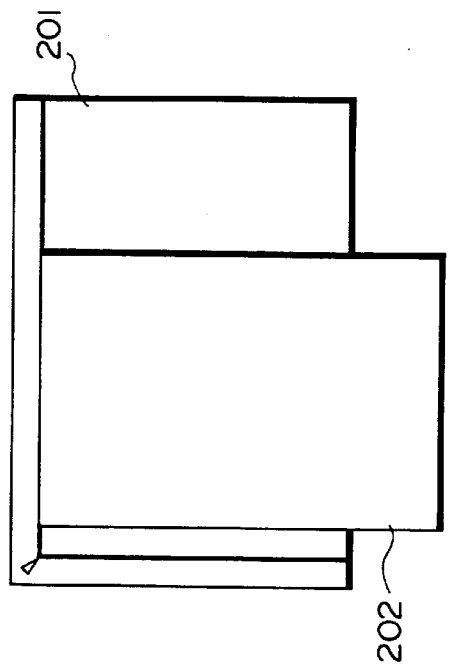
Figure 53A:
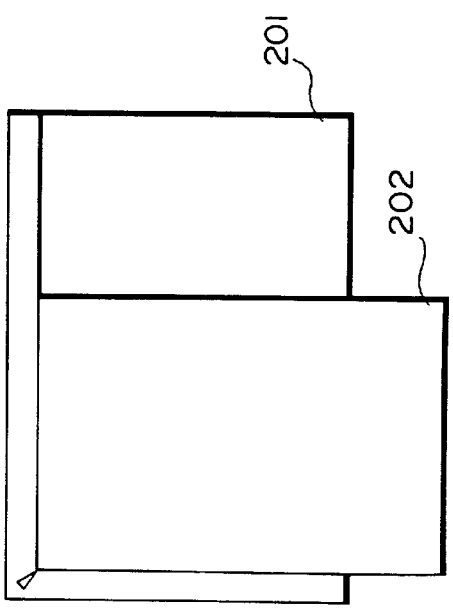
Figure 53B:
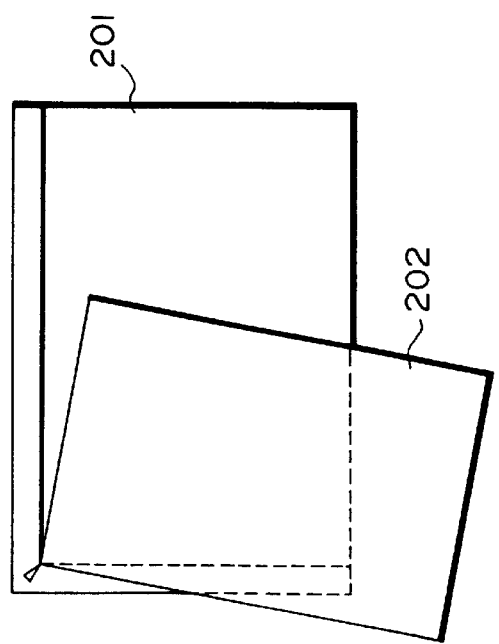
Figure 54A:
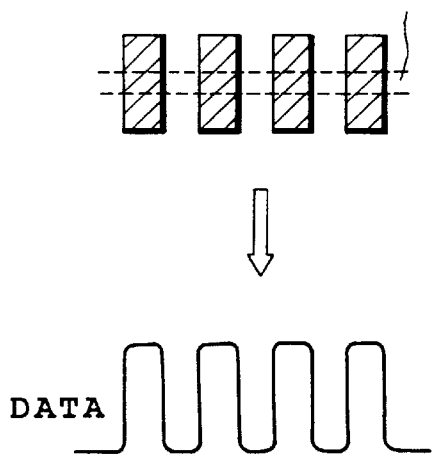
FIGS. 54A, 54B, 54C and 54D are illustrations showing the states of the reading of the test patterns which correspond to the loading states of FIGS. 53A, 53B, 53C and 53D and the content of the read density data, respectively.
Figure 54B:
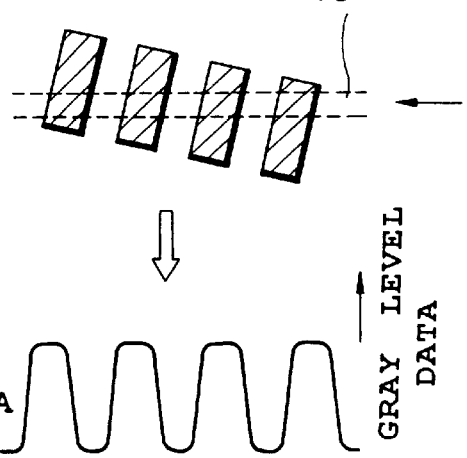
Figure 54C:
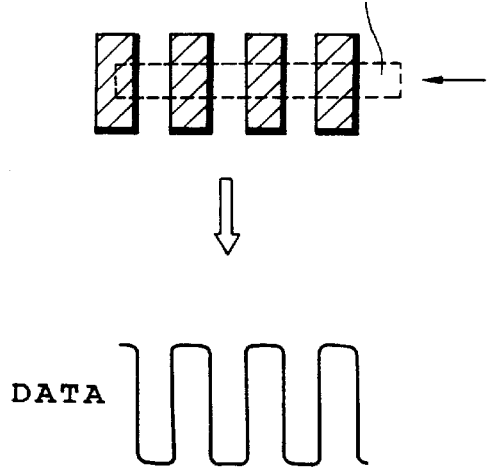
Figure 54D:
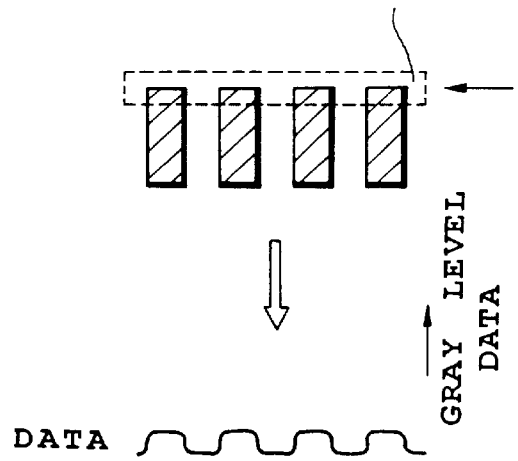

At first, what is assumed is a case that a chart including a recorded test pattern is not fixed in a proper position for read-out process, that is, the user puts the chart in a position displaced from a designated position in which the read-out process requires the user to put the chart. For example, although the chart shown in FIG. 50 should be placed on the manuscript stock 201 as shown in FIG. 53A, in case that the user put the chart in an improper position displaced from the proper position in the direction in which the CCD reader is scanned, read-out data corresponding to one block may be lost or incomplete as shown in FIG. 54C. In case that the chart is placed in an improper position displaced from the proper position in the direction in which the elements of CCD are arranged in one dimensional array, null ("0") data are read-out which may be interpreted as lower density data and even as density data corresponding to unexpected ink fluid colors as shown in FIG. 54D. And furthermore, in case that the chart is tilted as shown in FIG. 53B, an area assigned to a specified orifice may be occupied by some orifices adjacent to the specified orifice as shown in FIG. 54B. In either case described above, a precise correction process cannot be performed without error detection of read-out data.

In order to perform error detection, in this embodiment, an error is assumed to be detected only if data for a recording area including dot density greater than a certain threshold level is not stored in a designated memory address after the reader is scanned once. A recording area means an area in which dot density of an individual ink color is maintained to be greater than a certain value. If a white sheet without any pattern recorded is read and null ("0") data may be contained in read-out data, a recording area cannot be defined. As for the other error detection method, the width of a recording area is used for judging whether the width is greater than a certain threshold level, in which the chart is considered to be placed in a tilted position and hence an error is identified as that the chart is not placed in a proper read-out position.

In the above method for error detection, incorrect data for RHS caused by improper placement of the chart can be prevented from being stored in the memory. The kind of error detection can be valid for improper placement of the chart manipulated by the user him/herself, especially not only for the case of vertical or horizontal translating displacement but also for rotational or reversed displacement of the chart. In such erroneous cases, the read-out operation of the chart may be repeated again by placing the chart in a proper position and pressing down the RHS button.

Figure 55A:
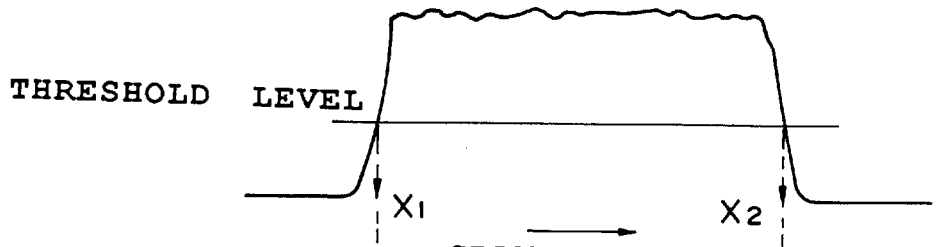
FIGS. 55A, 55B and 55C are diagrams for explaining means for detecting any errors from the density data read by the reader.
Figure 55B:
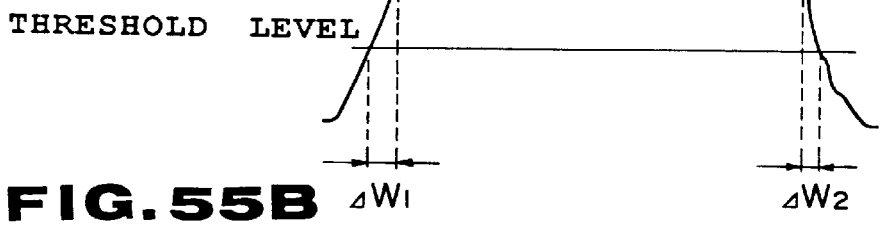
Figure 55C:
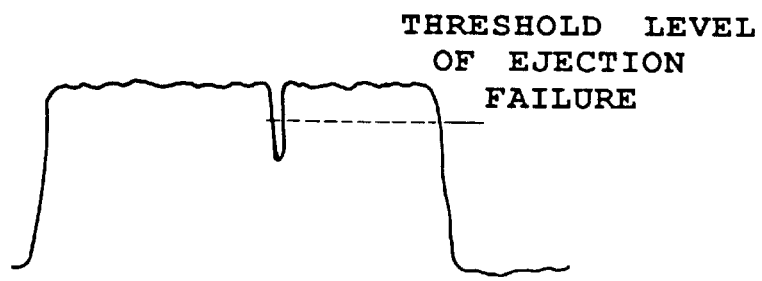

However, even if the user places that chart in a proper position, in case that the ejection condition of the recording head is not established to be stable, ink fluids may not be accidentally ejected from orifices. A chart recorded by such a recording head including non-ejection orifices should be detected as an improper one before performing the read-out operation. Even if a recording head includes only one non-ejection orifice as shown in FIG. 55C, dot density of its corresponding recording area is not lowered to the ground density of the white sheet area. In this embodiment, an additive threshold level used for detecting non-ejection orifices is defined, and if read-out dot density data contain dot density less than this threshold level, it can be judged that non-ejection occurs. If non-ejection occurs in all the four sets of blocks in the test pattern shown in FIG. 50, this can be interpreted as a complete non-ejection. If non-ejection does not occur in the three set of blocks in the above case of four sets of blocks, RHS correction calculation may be allowed by using these three sets of blocks in which non-ejection does not occur or RHS error is reported so as to ask the user to record a test pattern again. Even in case that non-ejection occurs in all the four sets of blocks, if recording is performed by using orifices at edge parts of the recording head, RHS calculation may be further proceeded or it may be allowed that recording operation with respect to a specific ink color is not performed and SRAM data for another ink colors may be revised. In addition, without defining an additive threshold level for detection non-ejection orifices, by shifting the threshold level for detecting placement error for recording areas to a little higher value, non-ejection error and chart-displacement error can be simultaneously detected. In either cases described above, detecting non-ejection orifices is strongly desirable for RHS calculations.

With this embodiment, it will be appreciated that correct and proper data can be stored in SRAM by preventing from writing erroneous density data by error detecting operations described above.

Figure 56:
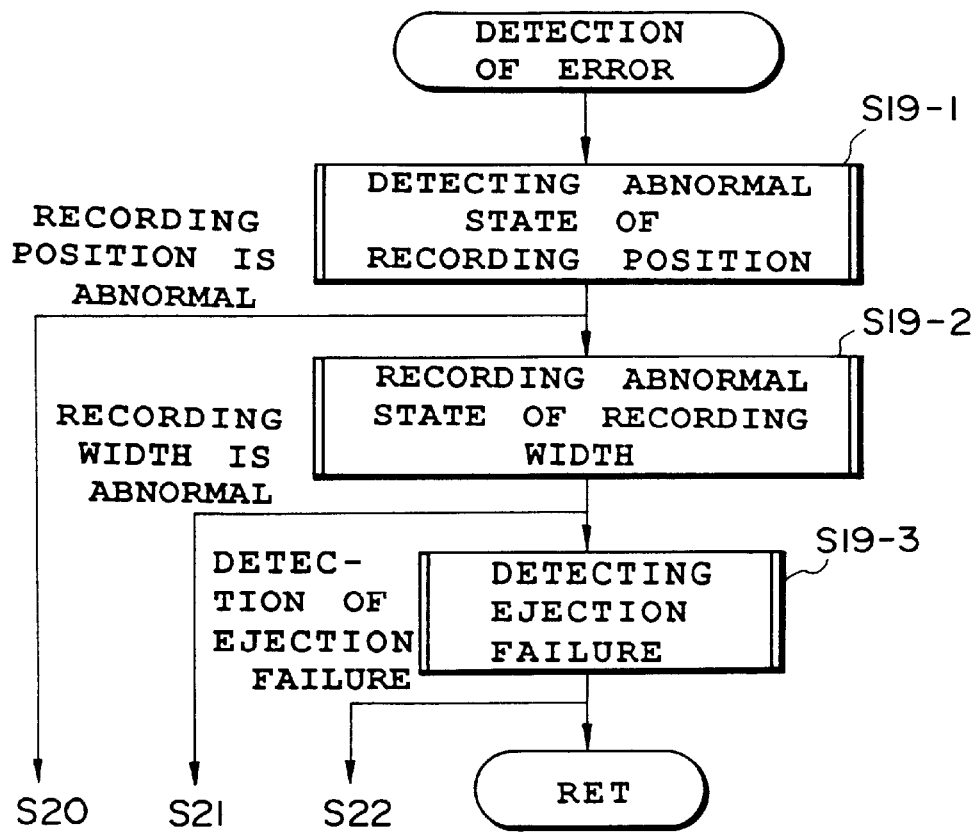
FIG. 56 is a flow chart illustrating an example of the procedures of the error detecting processing in FIG. 51.

Next, referring to FIG. 56, orders of error detection process described in detail. These procedures in FIG. 56 are included in step S19 in FIG. 51. In step S19-1, density data of one block with a single ink color are read out and processed for recording position error detection in which displacement of a block in main-scan direction and sub-scan direction is detected. The shape of density data is ordinarily found to be shown in FIG. 55A. In FIG. 55A, the horizontal axis represents addresses of the reader and the vertical axis represents the gray level (density) of dots. As described earlier, a recording area is defined to be an area in which its, corresponding dot density is greater than a certain threshold level. In this embodiment, by observing dot density from the bottom address and marking the address to be X1 at which the dot density comes to be greater than a certain threshold level for the first time, what is judged is whether the marked address X1 is located within an allowable area. Assuming that the position from which recording starts is an address X relatively measured from the beginning of read-out of the reader, checked is whether X1 is located between X−Δx and X+ΔX. If the density data does not satisfy this condition, a recording position error is identified and error messages are displayed in step S20 in FIG. 51, and step S16 is next selected. The user is requested to place the chart again on the manuscript stock and push down the RHS button in order to start the read-out operation.

If the error detection for the recording position error does not report any error, step S19-2 is next selected for recording width error detection, that is, tilted chart detection. As each block of the test pattern has a constant width, in case of recording a test pattern by using overall 160 orifices as in this embodiment, the dot density should decrease below a certain threshold level at the address between X1+160−Δx and X1+160+Δx at X2. In case that the density data does not satisfy this condition, what is judged as an error is tat the chart may be placed in a tilted position. In such a case, a recording width error is identified and error messages are displayed in step S21 in FIG. 51, and step S16 is next selected. In the similar manner to the recovery from the recording position error, the user is requested to place the chart again on the manuscript stock and push down the RHS button in order to start the read-out operation.

The density data which do not contain the recording position error and the recording width error ar next checked in step S19-3 for non-ejection error detection. In this step, density data from addresses X1 and X2 which are judged to be an effective recording area are checked in a pixel-by-pixel manner by comparing each density at the pixel with a threshold level for jading a non-ejection condition. If only one pixel is judged to be non-ejection, a non-ejection error is identified and error messages are displayed in step S22 in FIG. 51. As this error case refers to an error caused in the recording process of the test pattern, at the time when pressing the RHS button again in step S23 in FIG. 51, step S14 is next selected and RHS correction calculations are restarted from initialization.

As a result of error detection procedures, the density data without including any erroneous data are inputted to the calculation circuit as shown in FIG. 51. As shown in FIG. 51, the calculation procedures are composed of a density ratio calculation process (step S24) and a line correction table number calculation process (step S25). In the density ratio calculation process, the ratio of the dot density recorded by each orifice to the average dot density is obtained. In the line correction table number calculation process, with respect to each of orifice to which an individual density ratio defined in the above manner is assigned, what is determined is which 64 correction tables priorly defined is assigned to the orifice. As described earlier, in each correction table, revised output signals are stored with respect to each input signal. That is, with respect to an orifice gibing a lower density, assigned is a correction table with which any input signal is converted to a higher output signal. In contrast, with respect to an orifice giving a higher density, assigned is a correction table with which any input signal is converted to a lower output signal.

Figure 57:
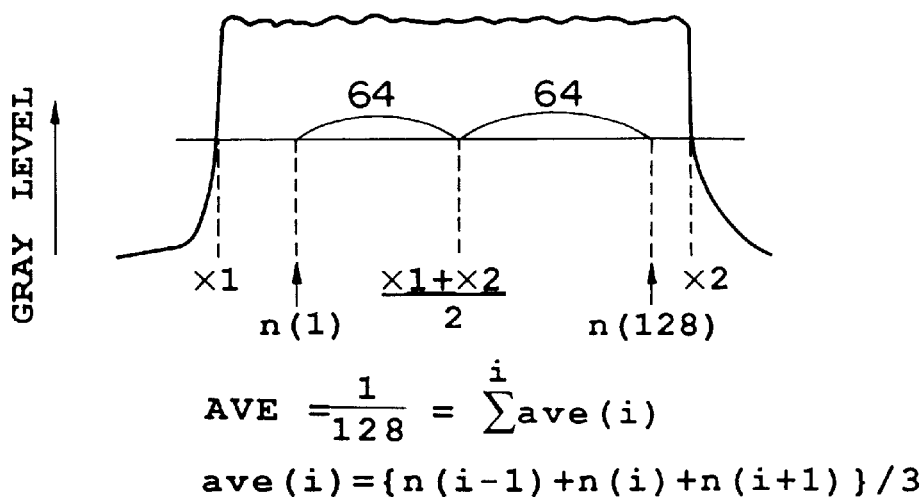
FIG. 57 is an explanatory diagram illustrating the assignment of the density data read by the reader to each orifice.
Figure 58:
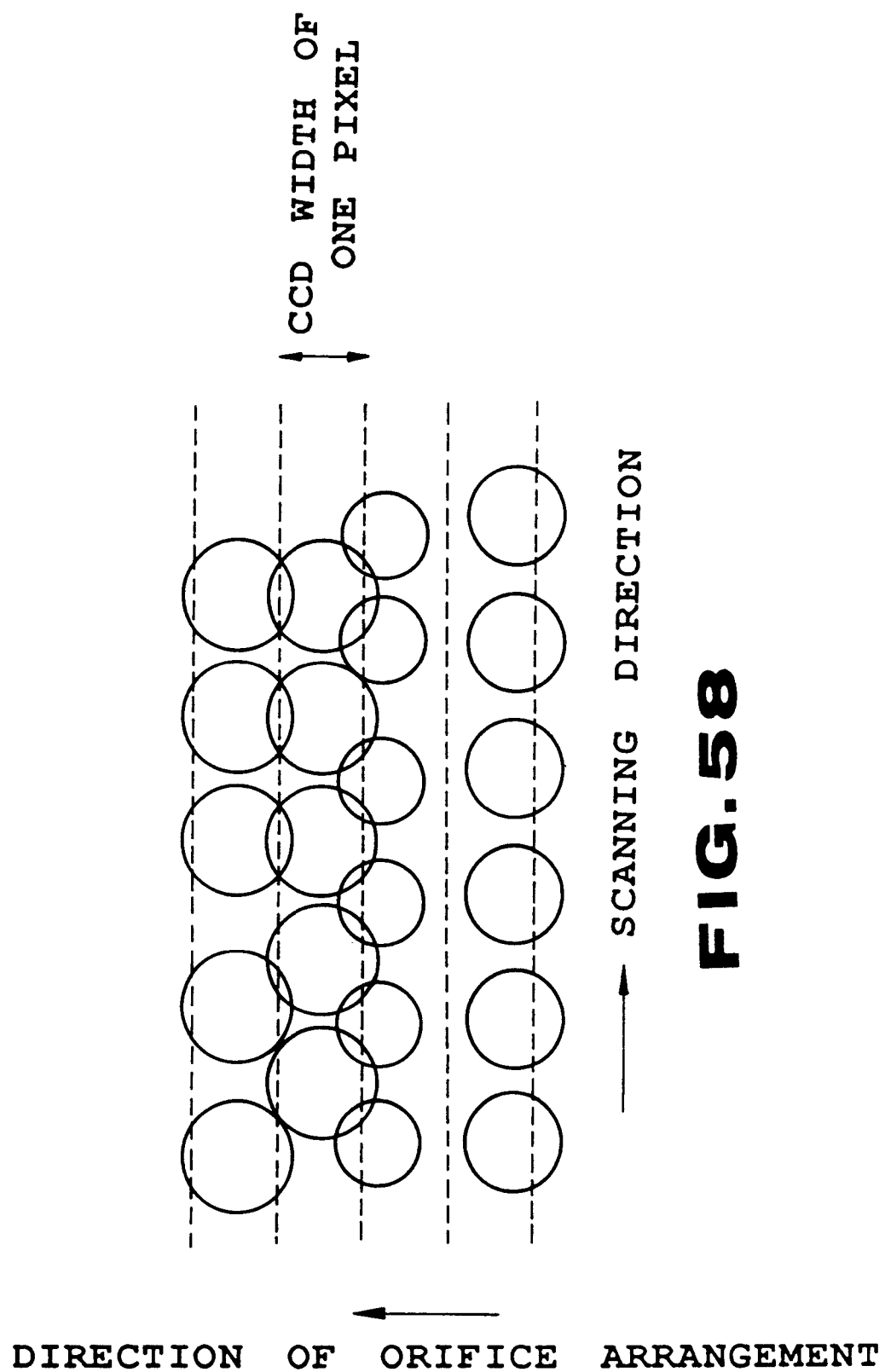
FIG. 58 is a schematic diagram illustrating the state of forming of dots in the test pattern.

Assuming that data shown in FIG. 55A are supplied from the error detection process, an exemplary correction calculation is explained by using FIG. 57. At first, the central address of the recording area is obtained by averaging the addresses X1 and X2 where dot density goes up and down at the both end parts in the address area. For example, the central address is density of the 1st orifice is taken to be the dot density of the orifice 64-orifice down from the central address and the dot density of the 128th orifice is taken to be the dot density of the orifice 64-orifice up from the central address. Thus, individual recording density data n(i), where i is from 1 to 128, are established with respect to individual orifices. However, it is not reliable to used directly and explicitly these estimated recording density data n(i), each corresponding to a single pixel as actual individual density data for individual orifices. This is because this density data of an individual pixel to be read may include the density of dots ejected from adjacent orifices, and orifices may not precisely placed in designated positions and/or the direction of ink fluids ejected from orifices is not established uniformly, and even because do shading of a specific pixel position may be affected by its adjacent pixels dot patterns. Therefore, in this embodiment, in estimating a dot density of each orifice, the average of three dot density data ($A_{i-1}$, $A_i$, $A_{i+1}$) at the specified pixel and its adjacent pixels is used as the orifice density ave(i).

The average density of overall 128 orifices, AVE, is obtained by averaging data from ave(1) to ave(128). Next, the ratio of the individual orifice density to the average density AVE is calculated. It should be noted that the ratio d(i) is defined by AVE/ave(i). In order to correct lower density data, it is required to increase the density, and in order to correct higher density data, it is required to decrease the density. In order to facilitate numerical calculations to be described later, the ratio d(i) is thus defined as a reciprocal of the original meaning. So far, dot ratio data d(i) with respect to each of 128 orifices obtained in step S24 are supplied to a line correction table number calculation process in step S25 in FIG. 51.

At first in step S25, a multiplication of current density ratio data d(i) and previous density ratio data D(i) is obtained as revised density ratio data D(i), that is, D(i)=d(i)×D(i). In every correction calculation, past d(i)'s are incorporated by as multiplication to the previous density ratio data D(i). As dot shading property changes gradually, the past history of density ratio data are effective to estimating the current correction data. Next, according to the following formulae, a desirable table the number of which is defined to be T(i) is selected; T(i)=(D(i)−1)×100+32. As described before, 64 correction tables are prepared for selection and the gradient of density is increased and decreased from the 34th correction tables.

By referring to FIG. 22, the relationship between the correction table and the above formulae is described in detail. In FIG. 22, the correction curve in the table #32 is a straight line with its gradient being 1, with which an output value is always equivalent to an input value. This table (#32) should be used by an orifice which gives a dot density equivalent to the average density over 128 orifices. The gradient of correction curves in the correction tables from #33 upto #64 increases by 1%. The gradient of correction curves in the correction tables from #32 downto #1 decreases by 1%. T(i) obtained by the above formulae is so transformed that it may be matched with the density ratio at the input signal of 50% half-tone pattern (80H). So far, 128T(i)'s are obtained in step S25.

After steps S24 and S25, in which a test pattern corresponding to a single line, that is, a single ink color is scanned to read out density data, and HS data (γ-correction table number) are calculated after performing shading correction of read-out density data, in step S26, judged is whether or not all the four lines corresponding to individual four ink colors and their recording heads are treated. If HS data on all the four lines are calculated, step S27 is next selected in order to revise γ-correction memories. The HS data (γ-correction table number) after the previous RHS calculation process are stored in the γ-correction memories and hence, the γ-correction memories are revised with the current HS data obtained in steps S24 and S25. Consequently, in step S28, the old HS data stored in the RHS data buffer in the back up memory of the printer part are substituted by the current HS data. This is the end of the explanation of the control flow of RHS procedures.

As being apparent from the above description, in this embodiment, at the time when a new recording head is installed, the HS data (γ-correction data) stored in FEPROM of the recording head are transferred into SRAM 2136, and in case that the recording head is aged, in responsive to the operational conditions, according to the procedures described above, the HS data stored in SRAM 2136 are revised. In order to prevent the revised HS data from being lost when the electric power supply is turned off, in this embodiment, the current HS data are transferred to the RAM installed in the printer controller part, which is not shown in the figures, and the RAM is backed up by the batteries.

Figure 59:
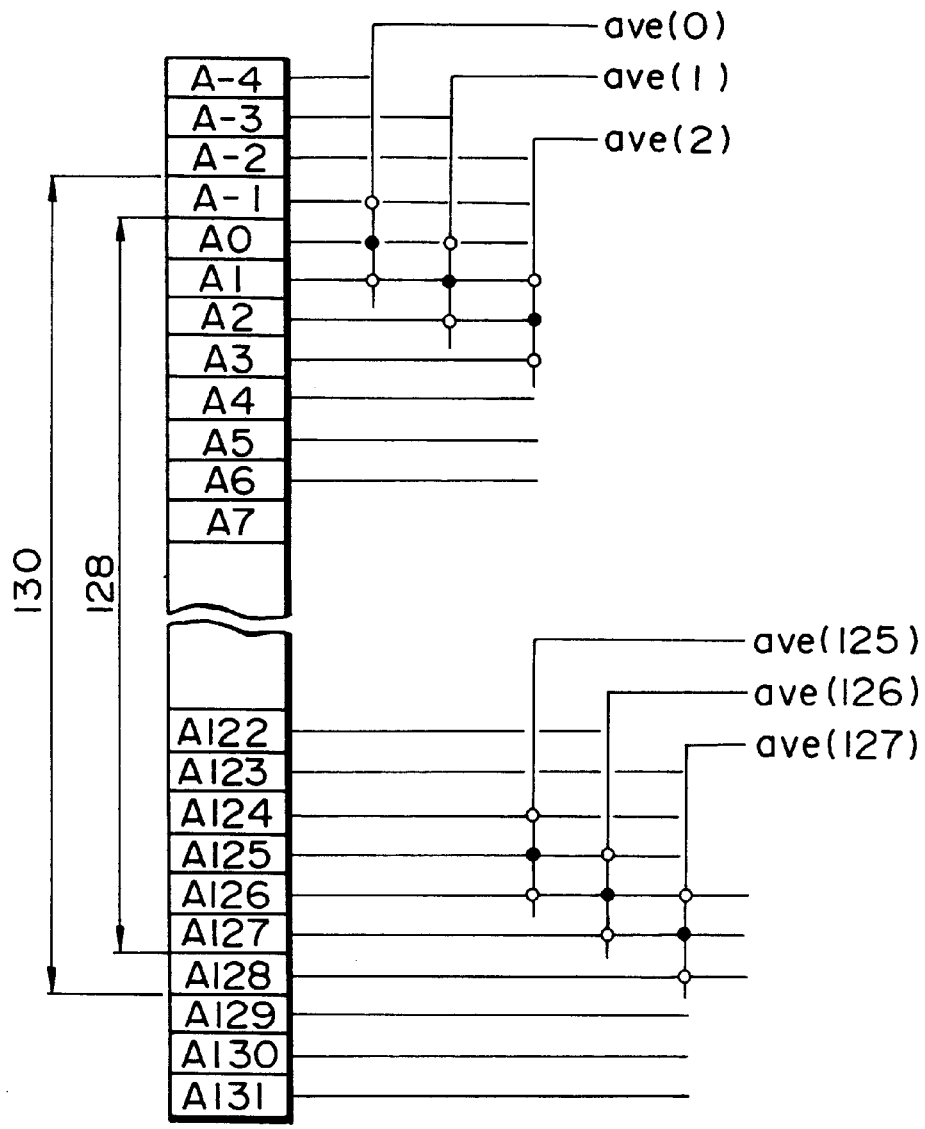
FIG. 59 is a diagram illustrating a shift mean value operation for obtaining the density data of every orifice.

As for density ratio calculation in step S24, in stead of calculating the shift mean value of densities over the adjacent three pixels as shown in FIG. 59, the following method can be applicable.

Figure 60:
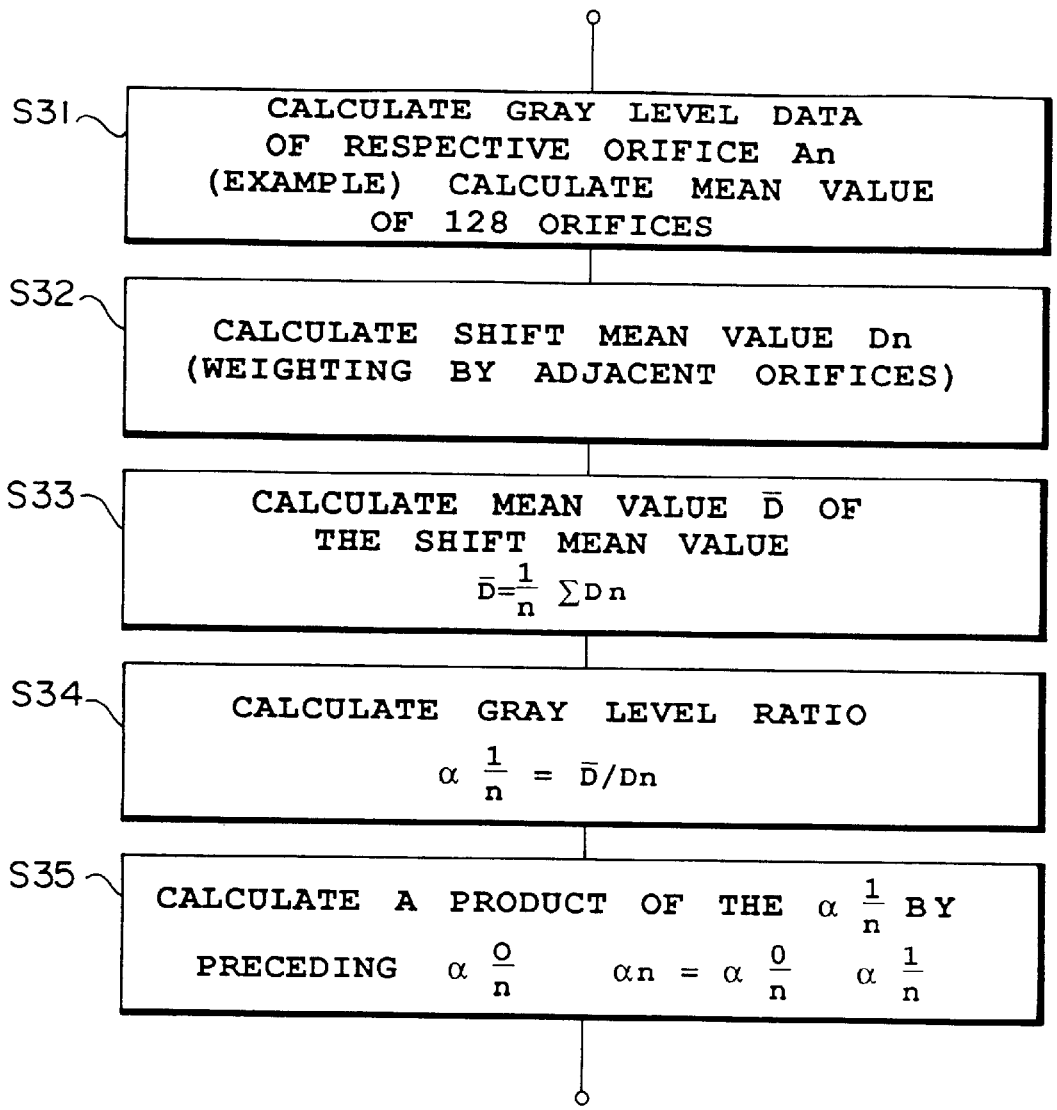
FIG. 60 is a flow chart illustrating a further example of density ratio operation processing in FIG. 51.

FIG. 60 shows another procedures for density ratio calculation in another embodiment, where procedures in step S31 are realized by the adder 2132 and the average circuit 2133.

Figures 61A, 61B:
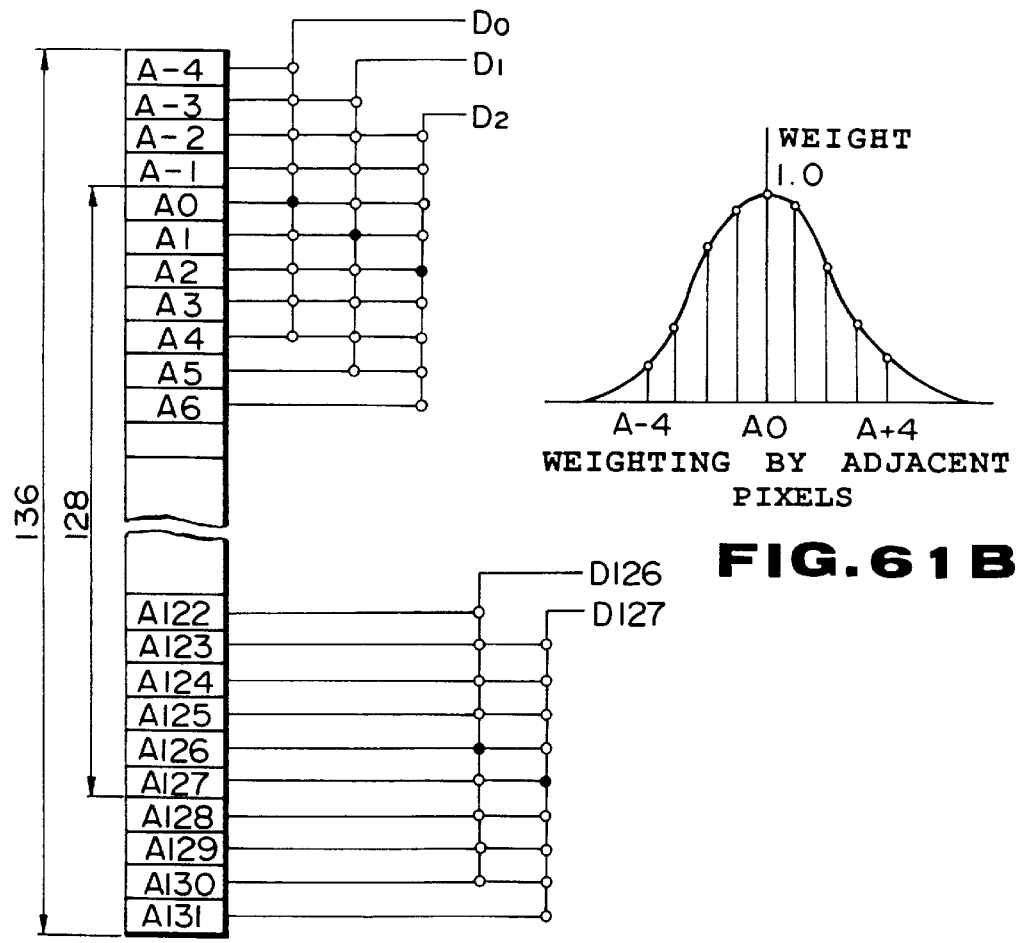
FIGS. 61A and 61B are diagrams for explaining the shift mean value operation illustrated in FIG. 60.
Figure 62:
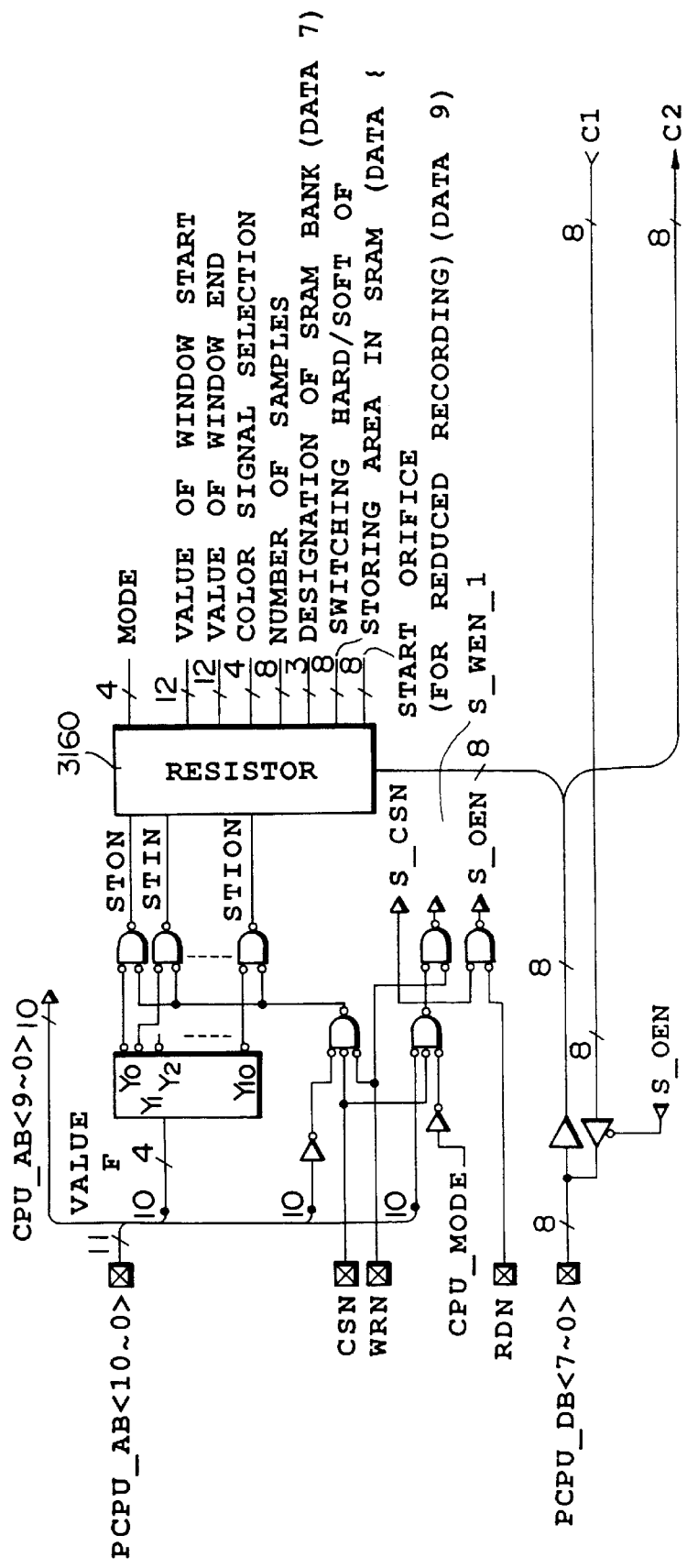
FIG. 62 is a block diagram showing in detail an example of the construction of the control part according to the present embodiment.
Figure 63:
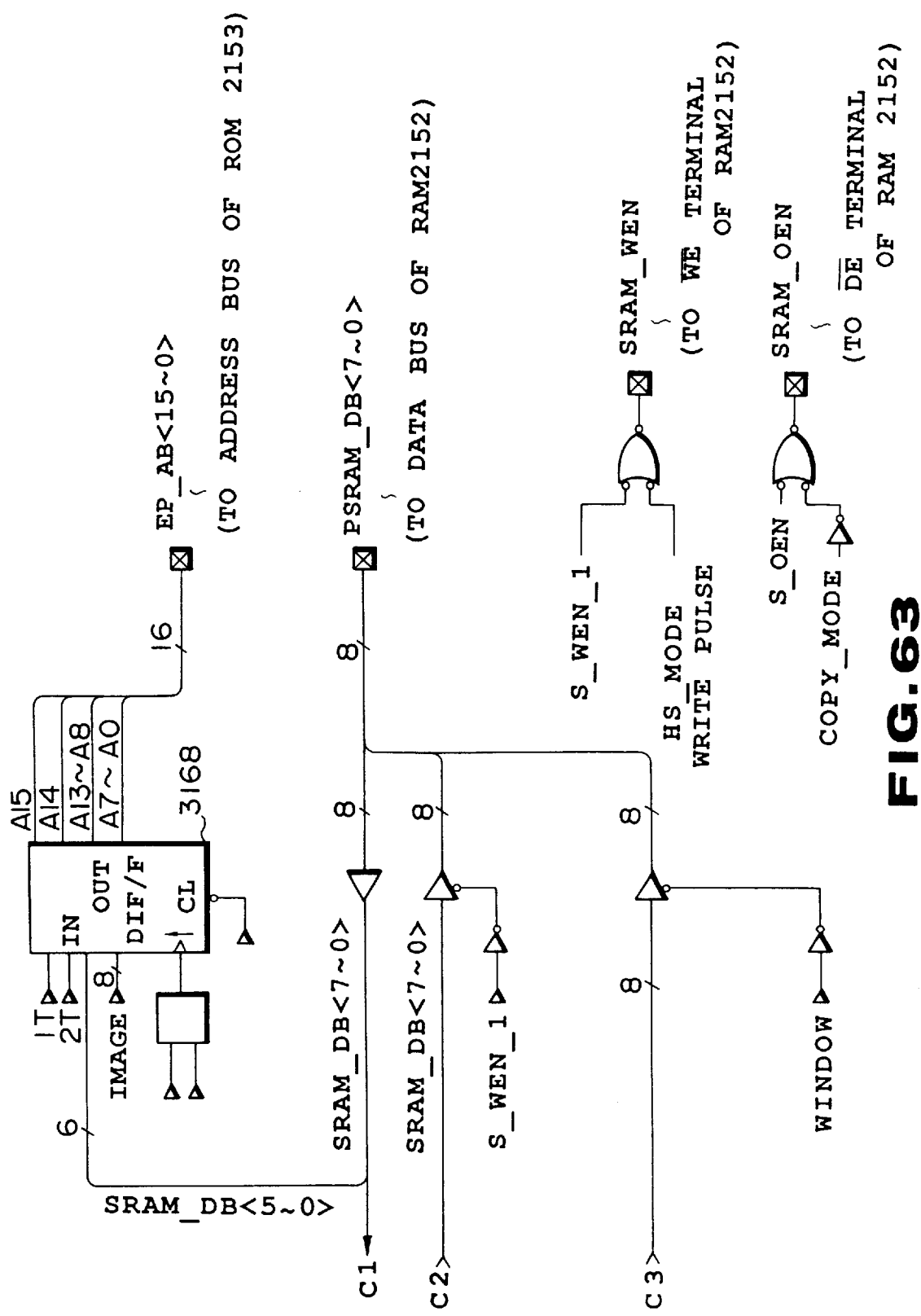
FIG. 63 is a block diagram showing in detail an example of the construction of the control part according to the present embodiment.

The average data obtained in step S31 are used for obtaining the shift mean value over the adjacent orifices in step S32. In this embodiment, as shown in FIGS. 61A and 61B, by weighting values are assigned to density data of the adjacent orifices, the average density value of the recorded image is obtained. For example in case of obtaining the density of pixel data corresponding to the pixel A0 in FIG. 61A, the density data of its adjacent pixels ($A_{-4}$~$A_4$) are averaged with weighing values as shown in FIG. 61B. The objective of this process if to consider the effect of dot density of adjacent pixels around the specific pixel in the human sight recognition of patterns. Using the shift mean value Dn, where n is the orifice number, for an individual orifice obtained in the above manner, the average $\overline{D}$ of overall the orifice is obtained instep S33. Next in step S34, what is obtained is the reciprocal of the density ratio of an individual density Dn to the average density $\overline{D}$, $1/\alpha_n^1(=D_n/\overline{D})$. The reason why the reciprocal is defined is that, with respect to orifices with density lower than the average $\overline{D}$, that is, orifices satisfying ($D_n/\overline{D}$)<1, what is selected is the correction curve having ($D_n/\overline{D}$)>1 shown in FIG. 22, which leads to multiply its input value to the γ-correction circuit 394 in FIG. 35, by $\overline{D}/D_n$ times in-order to obtain its out value greater than its actual density.

On the other hand, with respect to orifices with density higher than the average $\overline{D}$, the correction curve is selected so as to multiply its input value by $\overline{D}/D_n$ times, which is less than 1, in order to obtain its out put value less than its actual density.

Next, in step S35 in FIG. 60, a multiplication $\alpha_n$ of the previous multiplication $\alpha_n^0$ and the current $\alpha_n^1$ obtained as a reciprocal of the density ratio by the measurement of the present shading. This means that, the previous correction coefficient $\alpha_n^0$ was established for the basic pattern for shading measurement and, in the present correction processing, the density ratio is given by $D_n/\overline{D}(=1/\alpha_n^1)$ and hence, the current correction coefficient $\alpha_n^1$ is necessary to be multiplied to the previous correction coefficient as the aged deterioration proceeds, if a plurality of correction processings are consequently applied, the effective correction coefficient an is given as to be $$\alpha_n = \alpha_n^1 \cdot \alpha_n^2 \cdot \alpha_n^3 \cdot \alpha_n^4 \ldots$$

According to $\alpha_n$ obtained in the above manner, in step S25 in FIG. 51, the correction table can be selected to obtain an appropriate correction curve.

One of the characteristics of the present embodiment is that RAMs 3122 to 3125 for storing γ-correction table numbers corresponding to γ-correction circuits shown in FIG. 40 and RAM 2134 used for storing temporarily shading data in the shading measurement block in FIG. 20 are implemented in a single RAM device. The memory assignment in RAM 2134 is shown in FIG. 37. The electric structure of the shading processing circuit 3100 shown in FIG. 35 is shown in FIG. 21, in which its control part 2150 is formed as a gate array.

FIGS. 62 to 65 are block diagrams of the control part 2150, in which symbols C1 to C4 are identical connecters between different figures.

There are three operation modes in the control part 2150; CPU mode for allowing CPU to access SRAM, copy mode for head shading operation and head shading (HS) mode for measuring shading characteristics of recording heads.

At first, HS mode is described below. As described earlier, in order to measure the shading in the present operational condition, a test pattern shown in FIG. 50 is recorded on a sample sheet by inputting half-tone data from binary data processing circuit 396 to the printer part 244, and the recorded sample sheet is scanned by the CCD line sensor 205 for sampling density data. In this case, in order to reduce the memory area of RAM 2152 shown in FIG. 21, a modified three-line recording is performed, in which the central line is recorded by all the 128 orifices and the top and bottom edge parts are recorded only by 16 orifices. This makes it possible to data for a single pattern can be stored within a 512 byte memory area. In the right side of FIG. 50, each block pattern are shown. This picture may be understood by referring to FIG. 37.

Figure 64:
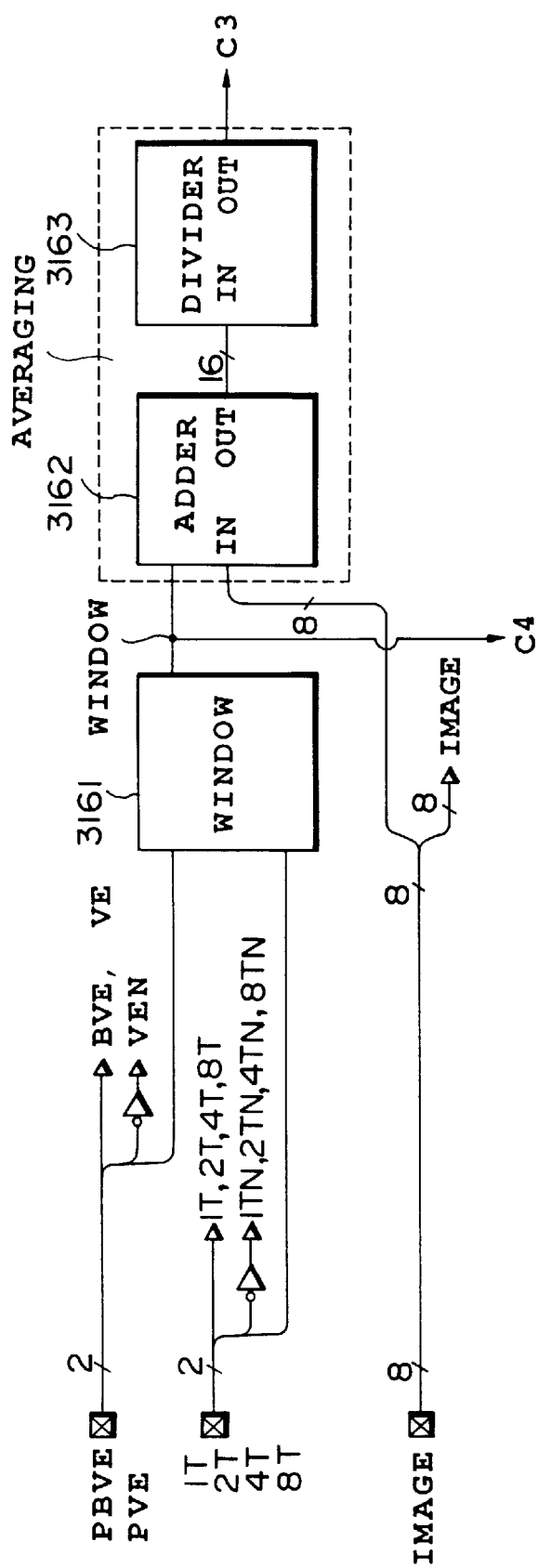
FIG. 64 is a block diagram showing in detail an example of the construction of the control part according to the present embodiment.

In FIG. 64, WINDOW 3161, ADDR 3162 and DIVIDER 3163 are parts of the average circuit connected to SRAM for supplying calculation data. In order to estimate the dot density developed by a certain orifice, the average circuit obtains the average value of 128 dot density data as shown in FIG. 52. The sampling number, 128 in this example, can be altered by changing the preset value stored in the register corresponding to the sampling number, which is one of the registers 3160 shown in FIG. 62. This average value is an average of sampling data during a time period in which VE (video enable) signal is activated, that is, a single scan period of CCD 205. WINDOW circuit 3161 specifies the data fetch region with respect to the data input range (VBE signal; block video enable) of CCD 205 as shown in FIG. 64. The average density data corresponding to individual orifice are stored temporarily in RAM with their address specified as shown in FIG. 37. These specific addresses are generated by the selector 3167 in FIG. 65 selecting HS mode. The average density data obtained in the above manner are verified for judging whether they can be used for shading calculations. For example, in case that individual color ink blocks of the test pattern contains any non-ejection part, specific blocks are considered not to be used for shading calculations. The average density data verified in the above manner are referred by CPU for numerical computations in such a procedural manner as shown in FIG. 51, and finally, individual density correction table numbers, each corresponding to each orifice, are obtained. Next, CPU writes the obtained table numbers into SRAM 2152. At this time, CPU changes the control part into CPU mode. In this embodiment, as shown in FIG. 37, the density correction table numbers are stored in the bottom address region of SRAM.

Figure 65:
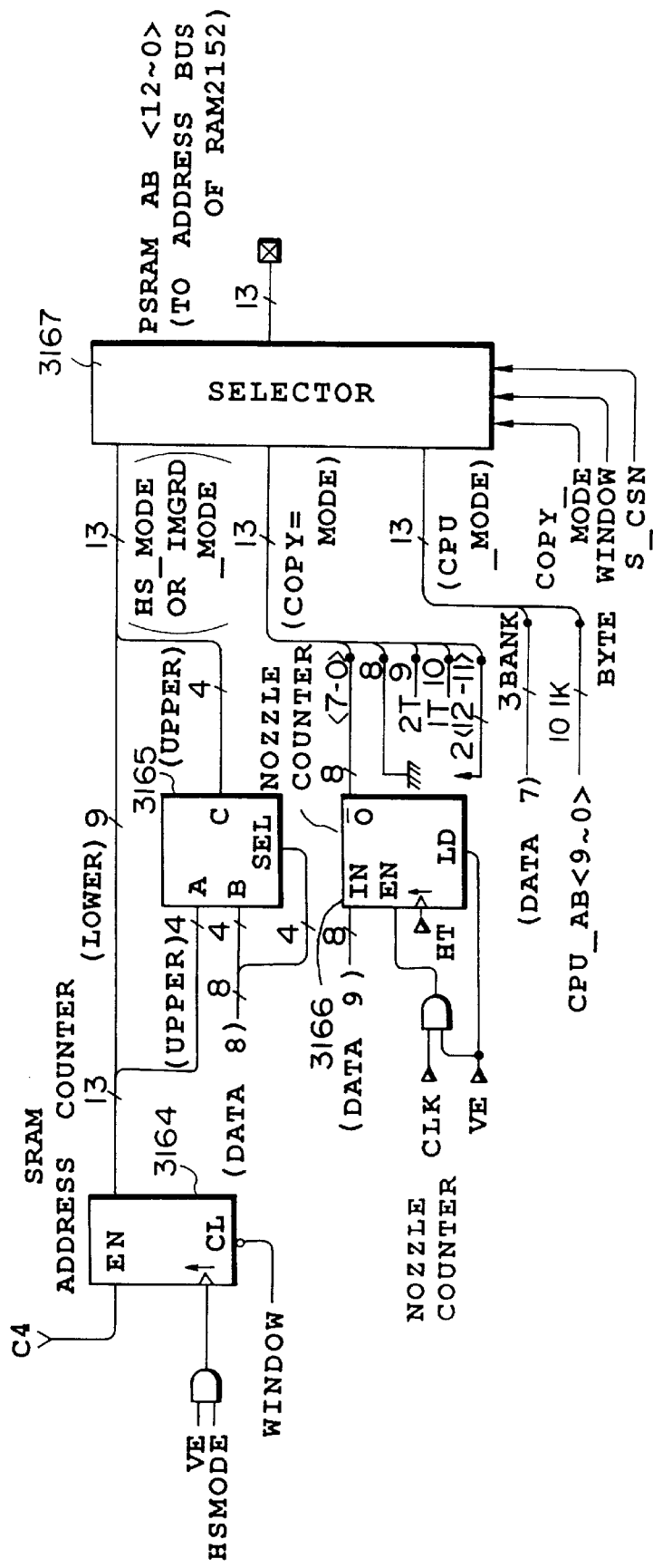
FIG. 65 is a block diagram showing in detail an example of the construction of the control part according to the present embodiment.

Next, CPU mode is described below. In FIG. 65, at CPU mode, by selector 3167, the lower 10 bits of the address bus of SRAM 2152 are connected to the address bus of CPU. The upper 3 bits are given by the register in the control part. The data bus of SRAM 2152 is controlled by CPU via signals S_WEN_1 and S_OEN in FIG. 63, generated by a write signal WRN for the write operation and a read signal RDN for the read operation.

Finally, Copy mode is described. In Copy mode, the address bus of SRAM 2152 is connected by the selector 3167 to the counter 3166 corresponding to an individual orifice, and the address is count up synchronously in responsive to the scanned pixel signal of CCD 205 in order to access the memory area storing density correction table numbers shown in FIG. 37. The upper addresses 1T and 2T in FIG. 64 are ink color identification codes for the recording head. SRAM 2152 outputs an individual density correction table number corresponding to each orifice, which is stored in the table ROM 2126 used for the upper address in FIG. 21. The contents of the table ROM include 64 table corresponding to individual ink colors as shown in FIG. 38. This means that the output from SRAM 2152 specifies the table number. In addition, the 8-bit image signal from data stored in the lower address of table ROM 2126 which is used as the horizontal axis data in FIG. 22. As a result, these data are supplied to the data bus of table ROM 2126. The output from table ROM 2126 is supplied to the binary data processing circuit shown in FIG. 35.

The structure of the address bus of SRAM 2152 in each mode described above is summarized in FIGS. 66A to 66C.

In this embodiment, the control part 2150 shown in FIG. 21 is formed by a gate array. As it is necessary to store the density correction table numbers in SRAM 2152 even if the electric power supply to the apparatus is turned off, in this embodiment, STRAM is backed up by the batteries, and in another embodiment, it is allowed that the density correction table numbers stored in EEPROM 854 shown in FIG. 30 may be revised every time when HS mode is selected. In the latter case, specifically, in case that a plurality of recording heads are installed and prepared for continuous operations in a single apparatus, as every recording head has always contains the current HS data, even if the operation temperature of the recording head reaches an extremely high level, it will be appreciated that recorded images without density shading can be continuously obtained only by exchanging damaged recording head by prepared recording heads.

In addition, it will be appreciated that recorded images without shading can be established in case that recording heads are installed in separated recording apparatus.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording apparatus for performing recording using a set of pixels comprising:

a recording head having a plurality of arrayed recording elements for forming said pixels;

test pattern recording means for recording a test pattern by using said recording head, said means recording a test pattern by using only a part of said plurality of arrayed recording elements, said part of said plurality of arrayed recording elements being continuously arrayed and being used for said recording; and shading correction means for correcting a characteristic of each of said plurality of arrayed recording elements of said recording head in forming said pixel based on the test pattern recorded by said test pattern recording means.

2. A recording apparatus as claimed in claim 1, wherein said test pattern recording means records a test pattern so that a pixel defined by one end part in said plurality of arrayed recording elements used for said recording may be adjacent to a pixel defined by the other end part of said plurality of arrayed recording elements.

3. A recording apparatus as claimed in claim 2, wherein said shading correction means corrects said characteristic on the basis of a read result of a reading means for reading out said test pattern.

4. A recording apparatus as claimed in claim 3, wherein each of said recording elements has
an orifice for ejecting ink fluid and
a thermal energy generation element for generating thermal energy for ejecting the ink fluid from said orifice, generates a bubble by said thermal energy, and
ejects the ink fluid accompanied by generation of said bubble.

5. A recording apparatus for performing recording by using a recording head having a plurality of recording elements with a plurality of recording colors comprising:
reading means for reading out image data recorded by said recording head to obtain density data corresponding to each of the plurality of recording elements;
density changing means for changing a reference data to chance a density level of the density data obtained by said reading means, said reference data being a reference data used for a process done on the read image data upon converting the data read out by said reading means into a recording data for said recording head and corresponding to each of the plurality of recording colors; and
shading correction means for correcting a density recorded by each of said plurality of recording elements of said recording head in accordance with the density data whose density level is changed by said density changing means and which corresponds to each of the plurality of recording elements.

6. A recording apparatus as claimed in claim 5, wherein said density changing means has a CPU, said CPU changing a reference data of an A/D conversion circuit for converting said read data into a digital signal.

7. A recording apparatus as claimed in claim 5, wherein said density changing means changes black data in applying a black correction process to said read data.

8. A recording apparatus as claimed in claim 7, wherein said density changing means changes black data by changing a black shading plate read for sampling black data in responsive to the recording color.

9. A recording apparatus as claimed in claim 5, wherein each of said recording elements has
an orifice for ejecting ink fluid and
a thermal energy generation element for generating thermal energy for ejecting the ink fluid from said orifice, generates a bubble by said thermal energy, and
ejects the ink fluid accompanied by generation of said bubble.

10. A recording apparatus forming an image by using a recording head having a plurality of recording elements, said recording apparatus having a correction means for preventing shading in said formed image by correcting at least one image processing condition of said plurality of recording elements, said apparatus comprising:
a forming means for forming a designated test pattern on a recording medium by said recording head;
a reading means for reading said test pattern;
a shading correction data making means for making data for said correction by using said read result; and
a judging means for judging whether said recording medium on which said test pattern is formed is placed in a proper read position with respect to said reading means in making said correction data.

11. A recording apparatus as claimed in claim 10, wherein said judging means judges that said read position is not correct in case that the displacement between a position of an edge part of said test pattern detected by said reading means and a position of an edge part of said test pattern at a time when forming said test pattern is greater than a designated value.

12. A recording apparatus as claimed in claim 11, further comprising a memory means for storing said made shading correction data, wherein said shading correction data making means revises a content of said memory means every time when said shading correction making means making a shading correction data.

13. A recording apparatus as claimed in claim 12, wherein
said test pattern is formed repetitively a plurality of times on the recording medium; and
said density shading correction data making means determines the density or the density ratio for each of said plurality of recording elements with respect to each of said plurality of read test patterns, and determines an average value of said density or said density ratio over said plurality of test patterns as a density or a density ratio for each of said plurality or recording elements.

14. A recording apparatus as claimed in claim 13, wherein each of said recording elements has
an orifice for ejecting ink fluid and
a thermal energy generation element for generating thermal energy for ejecting the ink fluid from said orifice, generates a bubble by said thermal energy, and
ejects the ink fluid accompanied by generation of said bubble.

15. A recording apparatus as claimed in claim 10, wherein said judging means judges that said read position is not correct in case that the difference between a width of said test pattern detected by said reading means and an actual width of said test pattern.

16. A recording apparatus forming a image by using a recording head having a plurality of recording elements, said recording apparatus having a correction means for preventing shading in said formed image by correcting at least one image processing condition of said plurality of recording elements, said apparatus comprising:
forming means for forming a designated test pattern on a recording medium by said recording head;
reading means for reading said test pattern;
shading correction data making means for making data for said correction by using said read result;
judging means for judging whether said test pattern is formed in a proper state or not from said read result; and
control means for controlling said correction data making means not to make data for said correction by using said read result when said judging means judges that said test pattern is not formed in a proper state.

17. A recording apparatus as claimed in claim 16, wherein said judging means judges that said test pattern is not formed in said proper state in case that said test pattern read out by said reading means contains a part with its density being lower than a designate absolute density value.

18. A recording apparatus as claimed in claim 17, further comprising a memory means for storing said made shading correction data, wherein said shading correction data making means revises a content of said memory means every time when said shading correction making means making a shading correction data.

19. A recording apparatus as claimed in claim 18, wherein said test pattern is formed repetitively a plurality of times on the recording medium; and said density shading correction data making means determines the density or the density ratio for each of said plurality of recording elements with respect to each of said plurality of read test patterns, and determines an average value of said density or said density ratio over said plurality of test patterns as a density or a density ratio for each of said plurality of recording elements.

20. A recording apparatus as claimed in claim 19, wherein each of said recording elements has an orifice for ejecting ink fluid and a thermal energy generation element for generating thermal energy for ejecting the ink fluid from said orifice, generates a bubble by said thermal energy, and ejects the ink fluid accompanied by generation of said bubble.

21. A recording apparatus for performing recording using a set of pixels, said apparatus being able to perform reduction recording, comprising:

a recording head having a plurality of arrayed recording elements for forming said pixels;

test pattern recording means for recording a test pattern by using said recording head, said means recording a test pattern by using only a part of said plurality of arrayed recording elements, said part of said plurality of arrayed recording elements consisting of a plurality of recording elements which are continuously arrayed and being used for said reduction recording;

reading means for reading out said test pattern recorded by said test pattern recording means; and shading correction means for correcting a characteristic of each of said plurality of arrayed recording elements of said recording head in forming said pixel based on said test pattern.

22. A recording apparatus as claimed in claim 21, wherein said test pattern recording means records a test pattern so that a pixel defined by one end part in said part of said plurality of arrayed recording elements used for said reduction recording may be adjacent to a pixel defined by the other end part of said plurality of arrayed recording elements.

23. A recording apparatus as claimed in claim 22, wherein each of said recording elements has an orifice for ejecting ink fluid and a thermal energy generation element for generating thermal energy for ejecting the ink fluid from said orifice, generates a bubble by said thermal energy, and ejects the ink fluid accompanied by generation of said bubble.

24. A recording apparatus as claimed in claim 21, further comprising:

an original reading means for reading an original; and a signal processing means for performing reduction processing of said read original and for supplying the result of said reduction processing to said part of said plurality of arrayed recording elements.

25. A recording apparatus as claimed in claim 24, wherein said original reading means and said reading means use a portion of said recording apparatus in common.

26. A reduction recording method in a recording method for performing recording using a set of pixels, comprising the steps of:

providing a recording head having a plurality of arrayed recording elements for forming said pixels;

recording a test pattern by using said recording head, said recording of a test pattern being performed by using only a part of said plurality of arrayed recording elements, said part of said plurality of arrayed recording elements consisting of a plurality of recording elements which are continuously arrayed and being used for reduction recording;

reading out said recorded test pattern; and correcting a characteristic of each of said plurality of arrayed recording elements of said recording head in forming said pixel based on said read out test pattern.

* * * * *

UNITED STATES PATENT AND TRADEMARK OFFICE
CERTIFICATE OF CORRECTION

PATENT NO. : 6,247,780 B1
DATED : June 19, 2001
INVENTOR(S) : Miyuki Matsubara et al.

It is certified that error appears in the above-identified patent and that said Letters Patent is hereby corrected as shown below:

Drawings,
Sheet 50, Figure 51, "LINES END" should read -- LINES ENDED --.

Column 2,
Line 31, "responsive" should read -- response --; and
Line 55, "n" should read -- in --.

Column 3,
Line 4, "above described" should read -- above-described --;
Line 38, "responsive" should read -- response --;
Line 54, "angles" should read -- angle --; and
Line 56, "responsive" should read -- response --.

Column 4,
Line 5, "above described" should read -- above-described --;
Line 9, "affected" should read -- affected by --;
Line 21, "be" should read -- occur --; and
Line 67, "resolved." should read -- be resolved. --.

Column 5,
Line 2, "procedures" should read -- procedure --;
Line 44, "provided" should read -- is provided --;
Line 56, "responsive" should read -- response --; and
Line 59, "provided" should read -- is provided --.

Column 6,
Line 21, "provided" should read -- is provided --;
Line 43, "responsive" should read -- response --;
Line 44, "provided" should read -- is provided --; and
Line 54, "being" should be deleted.

Column 7,
Line 8, "to" should be deleted;
Line 12, "to" should be deleted;
Line 18, "during" should read -- while --;
Line 31, "in" should be deleted; and
Line 41, "provided" should read -- is provided --.

UNITED STATES PATENT AND TRADEMARK OFFICE
CERTIFICATE OF CORRECTION

PATENT NO. : 6,247,780 B1
DATED : June 19, 2001
INVENTOR(S) : Miyuki Matsubara et al.

It is certified that error appears in the above-identified patent and that said Letters Patent is hereby corrected as shown below:

Column 8,
Line 16, "provided" should read -- is provided --;
Line 33, "designate" should read -- designated --;
Line 38, "making" should read -- makes --;
Line 44, "patters," should read -- patterns, --;
Line 48, "pro-" should read -- is pro- --; and
Line 51, "an" should be deleted.

Column 9,
Line 2, "to" should be deleted;
Line 5, "to" should be deleted;
Line 6, "pro-" should read -- is pro- --;
Line 14, "recording" should read -- is recording --;
Line 16, "responsive" should read -- response --;
Line 23, "provided" should read -- is provided --; and
Line 55, "provided" should read -- is provided --.

Column 10,
Line 1, "the part" should read -- of the parts --; and
Line 40, "recording" should read -- recordings --.

Column 11,
Line 66, "constriction" should read -- construction --.

Column 13,
Line 29, "to" should be deleted;
Line 31, "is" should read -- are --; and
Line 35, "percents" should read -- percent --.

Column 14,
Line 1, "a" should be deleted;
Line 8, "which" should read -- on which --;
Line 16, "equalized can be" should be deleted;
Line 18, "head." should read -- head can be equalized. --;
Line 53, "as" should be deleted;
Line 55, "as" should be deleted; and
Line 56, "density" should read -- densities --.

UNITED STATES PATENT AND TRADEMARK OFFICE
CERTIFICATE OF CORRECTION

PATENT NO. : 6,247,780 B1
DATED : June 19, 2001
INVENTOR(S) : Miyuki Matsubara et al.

It is certified that error appears in the above-identified patent and that said Letters Patent is hereby corrected as shown below:

Column 15,
Line 12, "ratio" should read -- ratios --;
Line 30, "interval" should read -- intervals --;
Line 32, "number" should read -- numbers --;
Line 39, "multiplied" should read -- multiplied by --;
Line 54, "is" should read -- are --;
Line 57, "is corresponding" should read -- corresponds --;
Line 60, "recording" should read -- recordings --; and
Line 64, "processing" should read -- processings --.

Column 16,
Line 7, "table" should read -- tables --;
Line 29, "processing." should read -- processings. --;
Line 37, "about" should read -- in regards to --; and
Line 61, "member" should read -- members --.

Column 17,
Line 5, "repeated is" should be deleted; and
Line 6, "operation" should read -- operation is repeated --.

Column 18,
Line 36, "is" should read -- are --; and
Line 53, "become" should read -- becomes --.

Column 19,
Line 14, "As to such" should read -- Regarding --;
Line 22, "A reference" should read -- Reference --;
Line 50, "stored" should read -- is stored --; and
Line 52, "function" should read -- functions --.

Column 20,
Line 33, "to" should be deleted;
Line 49, "to" should read -- for --; and
Line 65, "sampling" should read -- samplings --.

UNITED STATES PATENT AND TRADEMARK OFFICE
CERTIFICATE OF CORRECTION

PATENT NO. : 6,247,780 B1
DATED : June 19, 2001
INVENTOR(S) : Miyuki Matsubara et al.

It is certified that error appears in the above-identified patent and that said Letters Patent is hereby corrected as shown below:

Column 21,
Line 2, "every" should read -- for every --;
Line 8, "value" should read -- values--;
Line 34, "is" should read -- be --; and
Line 60, "outputs" should read -- output --.

Column 22,
Line 33, "rad" should read -- read --; and
Line 45, "to" should read -- in --.

Column 23,
Line 16, "referred these three cells" should read -- these three cells are referred --;
Line 17, "pixel" should read -- pixels --; and
Line 26, "compressed" should read -- composed --.

Column 24,
Line 26, "shading" should read -- shading of --; and
Line 38, "detect" should read -- detected --.

Column 25,
Line 9, "signal" should read -- signals --;
Line 28, "sent" should read -- sent to --;
Line 44, "orifices" should read -- orifice --;
Line 53, "kind" should read -- kinds --; and
Line 57, "function" should read -- functions -- (both occurrences).

Column 26,
Line 12, "becomes" should read -- become --;
Line 13, "is" should read -- are --;
Line 15, "become" should read -- becomes --;
Line 19, "become" should read -- becomes --;
Line 26, "referring" should read -- referring to -- and "number," should read
-- numbers, --;
Line 27, "is made" should read -- makes --;
Line 46, "corresponding" should read -- corresponding to --;
Line 48, "co-owned" should read -- co-owned by --;
Line 52, "signal" should read -- signals --; and
Line 67, "designate and gain" should read -- designates and gains to--.

UNITED STATES PATENT AND TRADEMARK OFFICE
CERTIFICATE OF CORRECTION

PATENT NO. : 6,247,780 B1
DATED : June 19, 2001
INVENTOR(S) : Miyuki Matsubara et al.

It is certified that error appears in the above-identified patent and that said Letters Patent is hereby corrected as shown below:

Column 27,
Line 4, "designate" should read -- designates --;
Line 8, "pointed" should read -- pointing --;
Line 13, "input is it is." should read -- input. --;
Line 15, "sent" should read -- is sent --;
Line 23, "is carried" should read -- carries --;
Line 50, "actually" should read -- is actually --; and
Line 63, "bases that which" should read -- basis that --.

Column 28,
Line 6, "form" should read -- from --;
Line 7, "are" should be deleted;
Line 9, "responsive" should read -- response --;
Line 40, "coped to" should read -- copied to --; and
Line 64, "used" should read -- use --.

Column 29,
Line 6, "sill" should read -- still --;
Line 13, "store" should read -- stored --;
Line 14, "heads, there" should read -- head, their --;
Line 17, "another" should read -- other --;
Line 34, "responsive" should read -- response --;
Line 59, "motor" should read -- motors --;
Line 61, "lump" should read -- lamp --; and
Line 67, "another" should read -- other --.

Column 30,
Line 11, "copies" should read -- copy --;
Line 13, "that" should read -- those --;
Line 24, "compensating" should read -- compensate -- and "be corrected" should read -- correct --;
Line 39, "in" should read -- of --;
Line 40, "which" should be deleted;
Line 64, "responsive" should read -- response --; and
Line 67, "ejections" should read -- ejection --.

UNITED STATES PATENT AND TRADEMARK OFFICE
CERTIFICATE OF CORRECTION

PATENT NO.    : 6,247,780 B1
DATED         : June 19, 2001
INVENTOR(S)   : Miyuki Matsubara et al.

It is certified that error appears in the above-identified patent and that said Letters Patent is hereby corrected as shown below:

Column 31,
Line 67, "AT" should read -- At --.

Column 32,
Line 7, "black color black is" should read -- black color blocks --;
Line 8, "store." should read -- stored. --;
Line 14, "blocks occupy" should read -- block occupies --;
Line 21, "recorded is recorded," should read -- recorded, --; and
Line 40, "put" should read -- puts --.

Column 33,
Line 29, "set" should read -- sets --;
Line 44, "cases" should read -- case --;
Line 51, "described" should read -- are described --; and
Line 60, "its," should read -- its --.

Column 34,
Line 17, "tat" should read -- that --;
Line 26, "ar" should read -- are --;
Line 48, "of" should be deleted;
Line 50, "which" should read -- which one of --; and
Line 54, "gibing" should read -- giving --.

Column 35,
Line 4, "used" should read -- use --;
Line 10, "placed" should read -- be placed --;
Line 13, "pixels" should read -- pixel --;
Line 52, "upto" should read -- up to --; and
Line 53, "downto" should read -- down to --.

UNITED STATES PATENT AND TRADEMARK OFFICE
CERTIFICATE OF CORRECTION

PATENT NO. : 6,247,780 B1
DATED : June 19, 2001
INVENTOR(S) : Miyuki Matsubara et al.

It is certified that error appears in the above-identified patent and that said Letters Patent is hereby corrected as shown below:

Column 36,
Line 12, "responsive" should read -- response --;
Line 20, "in stead" should read -- instead --;
Line 24, "procedures" should read -- procedure --;
Line 31, "weighting values are assigned" should read -- assigning weighting values --;
Line 42, "overall the" should read -- the overall -- and "instep" should read -- in step --;
Line 50, "in-order" should read -- in order -- and "put" should read -- output --; and
Line 55, "out put" should read -- output --.

Column 37,
Line 2, "an" should read -- α n --;
Line 36, "can" should read -- to --;
Line 38, "are" should read -- is --; and
Line 54, "orifice" should read -- orifices --.

Column 38,
Line 16, "count" should read -- counted --;
Line 17, "sive" should read -- se --;
Line 24, "table" should read -- tables --;
Line 45, "has" should be deleted; and
Line 50, "head by" should read -- heads with --.

Column 39,
Line 41, "consists" should read -- consist --.

Signed and Sealed this

Thirteenth Day of August, 2002

*Attest:*

JAMES E. ROGAN
*Attesting Officer*      *Director of the United States Patent and Trademark Office*